(12) United States Patent
Ackley et al.

(10) Patent No.: US 10,803,264 B2
(45) Date of Patent: Oct. 13, 2020

(54) METHOD, APPARATUS, AND SYSTEM FOR CHARACTERIZING AN OPTICAL SYSTEM

(71) Applicant: Datamax-O'Neil Corporation, Altamonte Springs, FL (US)

(72) Inventors: H Sprague Ackley, Seattle, WA (US); Si Qian, Jiangsu (CN); Thomas Axel Jonas Celinder, Singapore (CN); Sebastien d'Armancourt, Singapore (SG)

(73) Assignee: DATAMAX-O'NEIL CORPORATION, Altamonte Springs, FL (US)

( * ) Notice: Subject to any disclaimer, the term of this patent is extended or adjusted under 35 U.S.C. 154(b) by 47 days.

(21) Appl. No.: 16/240,295

(22) Filed: Jan. 4, 2019

(65) Prior Publication Data

US 2019/0213369 A1   Jul. 11, 2019

Related U.S. Application Data

(60) Provisional application No. 62/614,089, filed on Jan. 5, 2018.

(51) Int. Cl.
| | | |
|---|---|---|
| G06K 7/10 | (2006.01) | |
| H04N 1/00 | (2006.01) | |
| G06K 5/00 | (2006.01) | |
| G06K 7/14 | (2006.01) | |
| G06K 19/06 | (2006.01) | |

(52) U.S. Cl.
CPC .......... *G06K 7/10673* (2013.01); *G06K 5/00* (2013.01); *G06K 7/10851* (2013.01); *G06K 7/14* (2013.01); *G06K 19/06009* (2013.01); *H04N 1/00045* (2013.01); *H04N 1/00334* (2013.01); *H04N 1/00363* (2013.01)

(58) Field of Classification Search
CPC ...................... G06K 7/10851; H04N 1/00045
USPC .................................................... 235/462.01
See application file for complete search history.

(56) References Cited

U.S. PATENT DOCUMENTS

| | | | |
|---|---|---|---|
| 5,051,567 A | 9/1991 | Tedesco | |
| 5,218,190 A | 6/1993 | Hardesty et al. | |
| 5,272,322 A | 12/1993 | Nishida et al. | |
| 5,318,938 A | 6/1994 | Hampl et al. | |

(Continued)

FOREIGN PATENT DOCUMENTS

| | | |
|---|---|---|
| EP | 2270746 | 1/2011 |
| EP | 3336770 | 6/2018 |

(Continued)

OTHER PUBLICATIONS

US 8,548,242 B1, 10/2013, Longacre (withdrawn)

(Continued)

*Primary Examiner* — Toan C Ly
(74) *Attorney, Agent, or Firm* — Alston & Bird LLP

(57) ABSTRACT

Techniques for characterizing an optical system (for example, a printer verifier) are provided. In this regard, the optical system may be characterized for scanning a printed image. The characterization of the optical system includes determining an effective aperture size of the optical system, and correspondingly an effective resolution at which the optical system can be configured to scan a portion of the printed image according to verification requirements.

20 Claims, 36 Drawing Sheets

(56) References Cited

U.S. PATENT DOCUMENTS

| | | | |
|---|---|---|---|
| 5,488,223 | A | 1/1996 | Austin et al. |
| 5,488,233 | A | 1/1996 | Ishikawa et al. |
| 5,564,841 | A | 10/1996 | Austin et al. |
| 5,761,336 | A | 6/1998 | Xu et al. |
| 5,914,474 | A | 6/1999 | Spitz |
| 6,036,091 | A | 3/2000 | Spitz |
| 6,323,949 | B1 * | 11/2001 | Lading .............. G01P 3/366 356/28.5 |
| 6,511,141 | B1 | 1/2003 | Hasegawa et al. |
| 6,535,299 | B1 | 3/2003 | Scherz |
| 6,567,530 | B1 | 5/2003 | Keronen et al. |
| 6,741,727 | B1 | 5/2004 | Hirasawa |
| 6,832,725 | B2 | 12/2004 | Gardiner et al. |
| 6,997,627 | B2 | 2/2006 | Chiu |
| 7,128,266 | B2 | 10/2006 | Zhu et al. |
| 7,159,783 | B2 | 1/2007 | Walczyk et al. |
| 7,413,127 | B2 | 8/2008 | Ehrhart et al. |
| 7,440,123 | B2 | 10/2008 | Chodagiri et al. |
| 7,471,331 | B2 | 12/2008 | Kaneda |
| 7,570,788 | B2 | 8/2009 | Tsukamoto et al. |
| 7,600,687 | B2 | 10/2009 | Biss et al. |
| 7,726,575 | B2 | 6/2010 | Wang et al. |
| 7,877,004 | B2 | 1/2011 | Maruyama et al. |
| 7,920,283 | B2 | 4/2011 | Shimazaki |
| 8,269,836 | B2 | 9/2012 | Zandifar et al. |
| 8,294,945 | B2 | 10/2012 | Natori |
| 8,294,969 | B2 | 10/2012 | Plesko |
| 8,317,105 | B2 | 11/2012 | Kotlarsky et al. |
| 8,322,622 | B2 | 12/2012 | Liu |
| 8,366,005 | B2 | 2/2013 | Kotlarsky et al. |
| 8,371,507 | B2 | 2/2013 | Haggerty et al. |
| 8,376,233 | B2 | 2/2013 | Horn et al. |
| 8,381,979 | B2 | 2/2013 | Franz |
| 8,390,909 | B2 | 3/2013 | Plesko |
| 8,408,464 | B2 | 4/2013 | Zhu et al. |
| 8,408,468 | B2 | 4/2013 | Van et al. |
| 8,408,469 | B2 | 4/2013 | Good |
| 8,424,768 | B2 | 4/2013 | Rueblinger et al. |
| 8,448,863 | B2 | 5/2013 | Xian et al. |
| 8,457,013 | B2 | 6/2013 | Essinger et al. |
| 8,459,557 | B2 | 6/2013 | Havens et al. |
| 8,469,272 | B2 | 6/2013 | Kearney |
| 8,474,712 | B2 | 7/2013 | Kearney et al. |
| 8,479,992 | B2 | 7/2013 | Kotlarsky et al. |
| 8,482,809 | B2 | 7/2013 | Mikami |
| 8,488,181 | B2 | 7/2013 | Wu et al. |
| 8,490,877 | B2 | 7/2013 | Kearney |
| 8,517,271 | B2 | 8/2013 | Kotlarsky et al. |
| 8,523,076 | B2 | 9/2013 | Good |
| 8,528,818 | B2 | 9/2013 | Ehrhart et al. |
| 8,544,737 | B2 | 10/2013 | Gomez et al. |
| 8,548,420 | B2 | 10/2013 | Grunow et al. |
| 8,550,335 | B2 | 10/2013 | Samek et al. |
| 8,550,354 | B2 | 10/2013 | Gannon et al. |
| 8,550,357 | B2 | 10/2013 | Kearney |
| 8,556,174 | B2 | 10/2013 | Kosecki et al. |
| 8,556,176 | B2 | 10/2013 | Van et al. |
| 8,556,177 | B2 | 10/2013 | Hussey et al. |
| 8,559,767 | B2 | 10/2013 | Barber et al. |
| 8,561,895 | B2 | 10/2013 | Gomez et al. |
| 8,561,903 | B2 | 10/2013 | Sauerwein, Jr. |
| 8,561,905 | B2 | 10/2013 | Edmonds et al. |
| 8,565,107 | B2 | 10/2013 | Pease et al. |
| 8,571,307 | B2 | 10/2013 | Li et al. |
| 8,579,200 | B2 | 11/2013 | Samek et al. |
| 8,583,924 | B2 | 11/2013 | Caballero et al. |
| 8,584,945 | B2 | 11/2013 | Wang et al. |
| 8,587,595 | B2 | 11/2013 | Wang |
| 8,587,697 | B2 | 11/2013 | Hussey et al. |
| 8,588,869 | B2 | 11/2013 | Sauerwein et al. |
| 8,590,789 | B2 | 11/2013 | Nahill et al. |
| 8,596,539 | B2 | 12/2013 | Havens et al. |
| 8,596,542 | B2 | 12/2013 | Havens et al. |
| 8,596,543 | B2 | 12/2013 | Havens et al. |
| 8,599,271 | B2 | 12/2013 | Havens et al. |
| 8,599,957 | B2 | 12/2013 | Peake et al. |
| 8,600,158 | B2 | 12/2013 | Li et al. |
| 8,600,167 | B2 | 12/2013 | Showering |
| 8,602,309 | B2 | 12/2013 | Longacre et al. |
| 8,608,053 | B2 | 12/2013 | Meier et al. |
| 8,608,071 | B2 | 12/2013 | Liu et al. |
| 8,611,309 | B2 | 12/2013 | Wang et al. |
| 8,615,487 | B2 | 12/2013 | Gomez et al. |
| 8,621,123 | B2 | 12/2013 | Caballero |
| 8,622,303 | B2 | 1/2014 | Meier et al. |
| 8,628,013 | B2 | 1/2014 | Ding |
| 8,628,015 | B2 | 1/2014 | Wang et al. |
| 8,628,016 | B2 | 1/2014 | Winegar |
| 8,629,926 | B2 | 1/2014 | Wang |
| 8,630,491 | B2 | 1/2014 | Longacre et al. |
| 8,635,309 | B2 | 1/2014 | Berthiaume et al. |
| 8,636,200 | B2 | 1/2014 | Kearney |
| 8,636,212 | B2 | 1/2014 | Nahill et al. |
| 8,636,215 | B2 | 1/2014 | Ding et al. |
| 8,636,224 | B2 | 1/2014 | Wang |
| 8,638,806 | B2 | 1/2014 | Wang et al. |
| 8,640,958 | B2 | 2/2014 | Lu et al. |
| 8,640,960 | B2 | 2/2014 | Wang et al. |
| 8,643,717 | B2 | 2/2014 | Li et al. |
| 8,646,692 | B2 | 2/2014 | Meier et al. |
| 8,646,694 | B2 | 2/2014 | Wang et al. |
| 8,657,200 | B2 | 2/2014 | Ren et al. |
| 8,659,397 | B2 | 2/2014 | Vargo et al. |
| 8,668,149 | B2 | 3/2014 | Good |
| 8,675,266 | B2 | 3/2014 | Watts |
| 8,678,285 | B2 | 3/2014 | Kearney |
| 8,678,286 | B2 | 3/2014 | Smith et al. |
| 8,682,077 | B1 | 3/2014 | Longacre, Jr. |
| D702,237 | S | 4/2014 | Oberpriller et al. |
| 8,687,282 | B2 | 4/2014 | Feng et al. |
| 8,692,927 | B2 | 4/2014 | Pease et al. |
| 8,695,880 | B2 | 4/2014 | Bremer et al. |
| 8,698,949 | B2 | 4/2014 | Grunow et al. |
| 8,717,494 | B2 | 5/2014 | Gannon |
| 8,720,783 | B2 | 5/2014 | Biss et al. |
| 8,723,804 | B2 | 5/2014 | Fletcher et al. |
| 8,723,904 | B2 | 5/2014 | Marty et al. |
| 8,727,223 | B2 | 5/2014 | Wang |
| 8,736,914 | B2 | 5/2014 | French |
| 8,740,082 | B2 | 6/2014 | Wilz, Sr. |
| 8,740,085 | B2 | 6/2014 | Furlong et al. |
| 8,746,563 | B2 | 6/2014 | Hennick et al. |
| 8,750,445 | B2 | 6/2014 | Peake et al. |
| 8,752,766 | B2 | 6/2014 | Xian et al. |
| 8,756,059 | B2 | 6/2014 | Braho et al. |
| 8,757,495 | B2 | 6/2014 | Qu et al. |
| 8,760,563 | B2 | 6/2014 | Koziol et al. |
| 8,763,909 | B2 | 7/2014 | Reed et al. |
| 8,768,102 | B1 | 7/2014 | Ng et al. |
| 8,777,108 | B2 | 7/2014 | Coyle |
| 8,777,109 | B2 | 7/2014 | Oberpriller et al. |
| 8,779,898 | B2 | 7/2014 | Havens et al. |
| 8,781,520 | B2 | 7/2014 | Payne et al. |
| 8,783,573 | B2 | 7/2014 | Havens et al. |
| 8,789,757 | B2 | 7/2014 | Barten |
| 8,789,758 | B2 | 7/2014 | Hawley et al. |
| 8,789,759 | B2 | 7/2014 | Xian et al. |
| 8,794,520 | B2 | 8/2014 | Wang et al. |
| 8,794,522 | B2 | 8/2014 | Ehrhart |
| 8,794,525 | B2 | 8/2014 | Amundsen et al. |
| 8,794,526 | B2 | 8/2014 | Wang et al. |
| 8,798,367 | B2 | 8/2014 | Ellis |
| 8,807,431 | B2 | 8/2014 | Wang et al. |
| 8,807,432 | B2 | 8/2014 | Van et al. |
| 8,820,630 | B2 | 9/2014 | Qu et al. |
| 8,822,848 | B2 | 9/2014 | Meagher |
| 8,824,692 | B2 | 9/2014 | Sheerin et al. |
| 8,824,696 | B2 | 9/2014 | Braho |
| 8,842,849 | B2 | 9/2014 | Wahl et al. |
| 8,844,822 | B2 | 9/2014 | Kotlarsky et al. |
| 8,844,823 | B2 | 9/2014 | Fritz et al. |
| 8,849,019 | B2 | 9/2014 | Li et al. |
| D716,285 | S | 10/2014 | Chaney et al. |
| 8,851,383 | B2 | 10/2014 | Yeakley et al. |

(56) References Cited

U.S. PATENT DOCUMENTS

| | | |
|---|---|---|
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,085 B2 | 11/2014 | Vandemark et al. |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,037 B1 | 5/2015 | Rudin et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,053,055 B2 | 6/2015 | Caballero |
| 9,053,378 B1 | 6/2015 | Hou et al. |
| 9,053,380 B2 | 6/2015 | Xian et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,171,539 B2 | 10/2015 | Funyak et al. |
| 9,174,457 B1 | 11/2015 | Aihara et al. |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,662 B2 | 2/2016 | Chen et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey et al. |
| 9,342,827 B2 | 5/2016 | Smith |
| 9,355,294 B2 | 5/2016 | Smith et al. |
| 9,367,722 B2 | 6/2016 | Xian et al. |
| 9,373,018 B2 | 6/2016 | Colavito et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,405,011 B2 | 8/2016 | Showering |
| 9,407,840 B2 | 8/2016 | Wang |
| 9,412,242 B2 | 8/2016 | Van et al. |
| 9,418,252 B2 | 8/2016 | Nahill et al. |
| D766,244 S | 9/2016 | Zhou et al. |
| 9,443,123 B2 | 9/2016 | Hejl |
| 9,443,222 B2 | 9/2016 | Singel et al. |
| 9,448,610 B2 | 9/2016 | Davis et al. |
| 9,478,113 B2 | 10/2016 | Xie et al. |
| D771,631 S | 11/2016 | Fitch et al. |
| 9,507,974 B1 | 11/2016 | Todeschini |
| D777,166 S | 1/2017 | Bidwell et al. |
| 9,557,166 B2 | 1/2017 | Thuries et al. |
| 9,564,035 B2 | 2/2017 | Ackley et al. |
| 9,569,837 B2 | 2/2017 | Madden et al. |
| 9,582,696 B2 | 2/2017 | Barber et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| 9,641,700 B2 | 5/2017 | Schumann et al. |
| 9,646,200 B2 | 5/2017 | Archibald et al. |
| 9,659,183 B2 | 5/2017 | Zhu et al. |
| 9,659,670 B2 | 5/2017 | Choi et al. |
| 9,665,757 B2 | 5/2017 | Feng et al. |
| D790,505 S | 6/2017 | Vargo et al. |
| D790,546 S | 6/2017 | Zhou et al. |
| D790,553 S | 6/2017 | Fitch et al. |
| 9,712,758 B2 | 7/2017 | Noda |
| 9,715,614 B2 | 7/2017 | Todeschini et al. |
| 9,734,493 B2 | 8/2017 | Gomez et al. |
| 9,752,864 B2 | 9/2017 | Laffargue et al. |
| 9,762,793 B2 | 9/2017 | Ackley et al. |
| 9,767,581 B2 | 9/2017 | Todeschini |
| 9,786,101 B2 | 10/2017 | Ackley |
| 9,794,392 B2 | 10/2017 | Hejl |
| 9,823,059 B2 | 11/2017 | Li et al. |
| 9,852,102 B2 | 12/2017 | Kohtz et al. |
| 9,857,167 B2 | 1/2018 | Jovanovski et al. |
| 9,861,182 B2 | 1/2018 | Oberpriller et al. |

(56) References Cited

U.S. PATENT DOCUMENTS

| | | |
|---|---|---|
| 9,891,612 B2 | 2/2018 | Charpentier et al. |
| 9,892,876 B2 | 2/2018 | Bandringa |
| 9,897,434 B2 | 2/2018 | Ackley et al. |
| 9,898,814 B2 | 2/2018 | Kitai et al. |
| 9,924,006 B2 | 3/2018 | Schoon et al. |
| 9,930,050 B2 | 3/2018 | Yeakley et al. |
| 9,954,871 B2 | 4/2018 | Hussey et al. |
| 9,978,088 B2 | 5/2018 | Pape |
| 9,984,685 B2 | 5/2018 | Braho et al. |
| 10,007,112 B2 | 6/2018 | Fitch et al. |
| 10,019,334 B2 | 7/2018 | Caballero et al. |
| 10,021,043 B2 | 7/2018 | Sevier |
| 10,038,716 B2 | 7/2018 | Todeschini et al. |
| 10,060,729 B2 | 8/2018 | Laffargue et al. |
| 10,066,982 B2 | 9/2018 | Ackley et al. |
| 10,121,466 B2 | 11/2018 | Pecorari |
| 10,139,495 B2 | 11/2018 | Payne |
| 10,195,880 B2 | 2/2019 | D'Armancourt |
| 10,269,342 B2 | 4/2019 | Braho et al. |
| 10,427,424 B2 | 10/2019 | Creencia et al. |
| 10,546,160 B2 | 1/2020 | Sprague et al. |
| 10,628,723 B2 | 4/2020 | D'Armancourt et al. |
| 10,672,588 B1 | 6/2020 | Pathangi et al. |
| 2001/0016054 A1 | 8/2001 | Banker et al. |
| 2001/0035971 A1 | 11/2001 | Koakutsu et al. |
| 2004/0029068 A1 | 2/2004 | Sachdeva et al. |
| 2004/0033098 A1 | 2/2004 | Chiu |
| 2004/0036089 A1 | 2/2004 | Chen |
| 2004/0057768 A1 | 3/2004 | Oshino et al. |
| 2004/0120569 A1 | 6/2004 | Hung et al. |
| 2005/0105104 A1 | 5/2005 | Sakai et al. |
| 2006/0039690 A1 | 2/2006 | Steinberg et al. |
| 2006/0197795 A1 | 9/2006 | Takatsuka et al. |
| 2007/0146755 A1 | 6/2007 | Mindler et al. |
| 2007/0195337 A1 | 8/2007 | Takayama et al. |
| 2008/0185432 A1 | 8/2008 | Caballero et al. |
| 2008/0218551 A1 | 9/2008 | Inaba |
| 2009/0058348 A1 | 3/2009 | Ryu |
| 2009/0085952 A1 | 4/2009 | Yamazaki |
| 2009/0087022 A1 | 4/2009 | Fukuda et al. |
| 2009/0134221 A1 | 5/2009 | Zhu et al. |
| 2009/0316161 A1 | 12/2009 | Yamaguchi et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0188714 A1 | 7/2010 | Yamakawa |
| 2010/0265880 A1 | 10/2010 | Rautiola et al. |
| 2011/0102850 A1 | 5/2011 | Watanabe |
| 2011/0202554 A1 | 8/2011 | Powilleit et al. |
| 2012/0111946 A1 | 5/2012 | Golant |
| 2012/0168511 A1 | 7/2012 | Kotlarsky et al. |
| 2012/0168512 A1 | 7/2012 | Kotlarsky et al. |
| 2012/0182374 A1 | 7/2012 | Matsuda et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2012/0263483 A1 | 10/2012 | Suzuki |
| 2012/0330447 A1 | 12/2012 | Gerlach et al. |
| 2013/0038670 A1 | 2/2013 | Chen |
| 2013/0043312 A1 | 2/2013 | Van Horn |
| 2013/0082104 A1 | 4/2013 | Kearney et al. |
| 2013/0148987 A1 | 6/2013 | Arakawa |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0258368 A1 | 10/2013 | Shigemoto et al. |
| 2013/0259301 A1 | 10/2013 | Chen et al. |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002842 A1 | 1/2014 | Ito |
| 2014/0008439 A1 | 1/2014 | Wang |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078345 A1 | 3/2014 | Showering |
| 2014/0079292 A1 | 3/2014 | Kaneko et al. |
| 2014/0097249 A1 | 4/2014 | Gomez et al. |
| 2014/0098792 A1 | 4/2014 | Wang et al. |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166759 A1 | 6/2014 | Liu et al. |
| 2014/0168709 A1 | 6/2014 | Tokumaru |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |

(56) References Cited

U.S. PATENT DOCUMENTS

| | | |
|---|---|---|
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | Digregorio |
| 2014/0278391 A1 | 9/2014 | Braho et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0060544 A1 | 3/2015 | Feng et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0078627 A1 | 3/2015 | Fukase |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0193644 A1 | 7/2015 | Kearney et al. |
| 2015/0221077 A1 | 8/2015 | Kawabata et al. |
| 2015/0312780 A1 | 10/2015 | Wang et al. |
| 2015/0324623 A1 | 11/2015 | Powilleit |
| 2015/0327012 A1 | 11/2015 | Bian et al. |
| 2016/0042241 A1 | 2/2016 | Todeschini |
| 2016/0057230 A1 | 2/2016 | Todeschini et al. |
| 2016/0125217 A1 | 5/2016 | Todeschini |
| 2016/0125342 A1 | 5/2016 | Miller et al. |
| 2016/0178479 A1 | 6/2016 | Goldsmith |
| 2016/0189087 A1 | 6/2016 | Morton et al. |
| 2016/0255241 A1 | 9/2016 | Harashima et al. |
| 2016/0282807 A1 | 9/2016 | Kinoshita et al. |
| 2016/0292477 A1 | 10/2016 | Bidwell |
| 2016/0314276 A1 | 10/2016 | Wilz et al. |
| 2016/0314294 A1 | 10/2016 | Kubler et al. |
| 2016/0327614 A1 | 11/2016 | Young et al. |
| 2016/0343163 A1 | 11/2016 | Venkatesha et al. |
| 2016/0377414 A1 | 12/2016 | Thuries et al. |
| 2017/0060494 A1 | 3/2017 | Palmen et al. |
| 2017/0083734 A1 | 3/2017 | Henning et al. |
| 2017/0182819 A1 | 6/2017 | Gonzalez et al. |
| 2017/0206643 A1 | 7/2017 | Weiss et al. |
| 2017/0309011 A1 | 10/2017 | Hori et al. |
| 2018/0131815 A1 | 5/2018 | Spivakovsky et al. |
| 2018/0198937 A1 | 7/2018 | Yoshizawa |
| 2018/0227463 A1 | 8/2018 | Fukase |
| 2018/0268534 A1 | 9/2018 | Kaneko |
| 2019/0116275 A1 | 4/2019 | Edwards et al. |
| 2020/0145546 A1 | 5/2020 | Alaganchetty et al. |

FOREIGN PATENT DOCUMENTS

| | | |
|---|---|---|
| JP | 09-027049 A | 1/1997 |
| JP | 2002-281287 A | 9/2002 |
| JP | 4644283 B2 | 3/2011 |
| JP | 2011-110777 A | 6/2011 |
| JP | 2013-151126 A | 8/2013 |
| KR | 10-0767433 B1 | 10/2007 |
| WO | 20131163789 | 11/2013 |
| WO | 20131173985 | 11/2013 |
| WO | 20141019130 | 2/2014 |
| WO | 2014/110495 | 7/2014 |

OTHER PUBLICATIONS

US 8,616,454 B2, 12/2013, Havens et al. (withdrawn)
Office Action for U.S. Appl. No. 16/240,067, dated Jan. 10, 2020, 28 pages.
Communication pursuant to Rules 70(2) and 70a(2) for European Application No. 19150493.5, dated Jul. 15, 2019, 2 pages.
Communication pursuant to Rules 70(2) and 70a(2) for European Application No. 19150494.3, dated Jul. 15, 2019, 2 pages.
Communication pursuant to Rules 70(2) and 70a(2) for European Application No. 19150495.0, dated Jul. 15, 2019, 2 pages.
Notice of Allowance for U.S. Appl. No. 16/240,109, dated Aug. 14, 2019, 10 pages.
Notice of Allowance for U.S. Appl. No. 16/240,140, dated Nov. 6, 2019, 9 pages.
Examiner initiated interview summary (PTOL-413B) dated Apr. 16, 2020 for U.S. Appl. No. 16/240,067.
Notice of Allowance and Fees Due (PTOL-85) dated Apr. 16, 2020 for U.S. Appl. No. 16/240,067.
Non-Final Rejection dated Mar. 12, 2020 for U.S. Appl. No. 16/240,140.

(56) References Cited

OTHER PUBLICATIONS

"Detecting Barcodes in Images with Python and OpenCV" [online] [retrieved on May 27, 2019] Retrieved from the Internet: <https://www.pyimagesearch.com/2014/11/24/detecting-barcodes-images-python-opencv/> dated Nov. 24, 2014.

Anonymous: "How can I quantify difference between two images?—Stack Overflow", [online] [retrieved on May 27, 2019] Retrieved from the Internet:URL:https://stackoverflow.com/questions/189943/how-can-i-quantify-difference-between-two-images> dated Apr. 21, 2015, pp. 1-5.

Basic Image Enhancement and Analysis Techniques, 4 pages, [online], [retrieved on Oct. 3, 2016]. Retrieved from the Internet <URL:https://in.mathworks.com/help/images/image-enhancement-and-analysis.html>.

Extended European Search Report for European Application No. 19150493.5 dated May 24, 2019.

Extended European Search Report for European Application No. 19150494.3 dated Jun. 6, 2019.

Extended European Search Report for European Application No. 19150495.0 dated Jun. 4, 2019.

Faulty Barcode Detection, 11 pages, [online], [retrieved on Oct. 24, 2016]. Retrieved from the Internet <URL:http://tewson.com/sites/default/files/barcode.pdf>.

Find Image Rotation and Scale Using Automated Feature Matching, 7 pages, [online], [retrieved on Oct. 3, 2016] Retrieved from the Internet <URL: hhttps://www.mathworks.com/examples/matlab-computer-vision/mw/vision_product-visionrecovertform-find-image-rotation-and-scale-using-automated-feature-matching>.

Image Analysis, 1 page, [online], [retrieved on Nov. 7, 2016]. Retrieved from the Internet <URL: http://in.mathworks.com/help/images/image-analysis.html>.

Image Enhancement, 1 page, [online], [retrieved on Oct. 3, 2016]. Retrieved from the Internet <URL: http://in.mathworks.com/help/images/image-enhancement-and-restoration.html>.

Imshowpair—compare differences between images, 6 pages, [online], [retrieved on Nov. 7, 2016]. Retrieved from the Internet <URL: http://in.mathworks.com/help/images/ref/imshowpair.html?requestedDomain=in.mathworks.com#bta3zrg>.

Non-Final Rejection dated Jul. 11, 2019 for U.S. Appl. No. 16/240,067.

Non-Final Rejection dated Jun. 26, 2019 for U.S. Appl. No. 16/240,140.

Non-Final Rejection dated May 2, 2019 for U.S. Appl. No. 16/240,109.

Notice of Allowance and Fees Due (PTOL-85) dated Jun. 12, 2019 for U.S. Appl. No. 16/240,109.

Office Action for U.S. Appl. No. 14/824,455 dated Nov. 30, 2018, 17 pages.

U.S. Appl. No. 13/367,978 for a Laser Scanning Module Employing an Elastomeric U-Hinge Based Laser Scanning Assembly, filed Feb. 7, 2012, Feng et al.

U.S. Appl. No. 14/277,337 for Multipurpose Optical Reader, filed May 14, 2014, Jovanovski et al.

U.S. Appl. No. 14/283,282 for Terminal Having Illumination and Focus Control filed May 21, 2014, Liu et al.

U.S. Appl. No. 14/446,391 for Multifunction Point of Sale Apparatus With Optical Signature Capture filed Jul. 30, 2014, Good et al.

Unpublished U.S. Appl. No. 14/676,109.

Notice of Allowance and Fees Due (PTOL-85) dated Jun 24, 2020 for U.S. Appl. No. 16/240,067.

Connected Notice of Allowability dated Aug. 7, 2020 for U.S. Appl. No. 16/240,140.

Non-Final Rejection dated Aug. 25, 2020 for U.S. Appl. No. 16/790,417.

Notice of Allowance and Fees Due (PTOL-85) dated Jul. 28, 2020 for U.S. Appl. No. 16/240,140.

* cited by examiner

1702

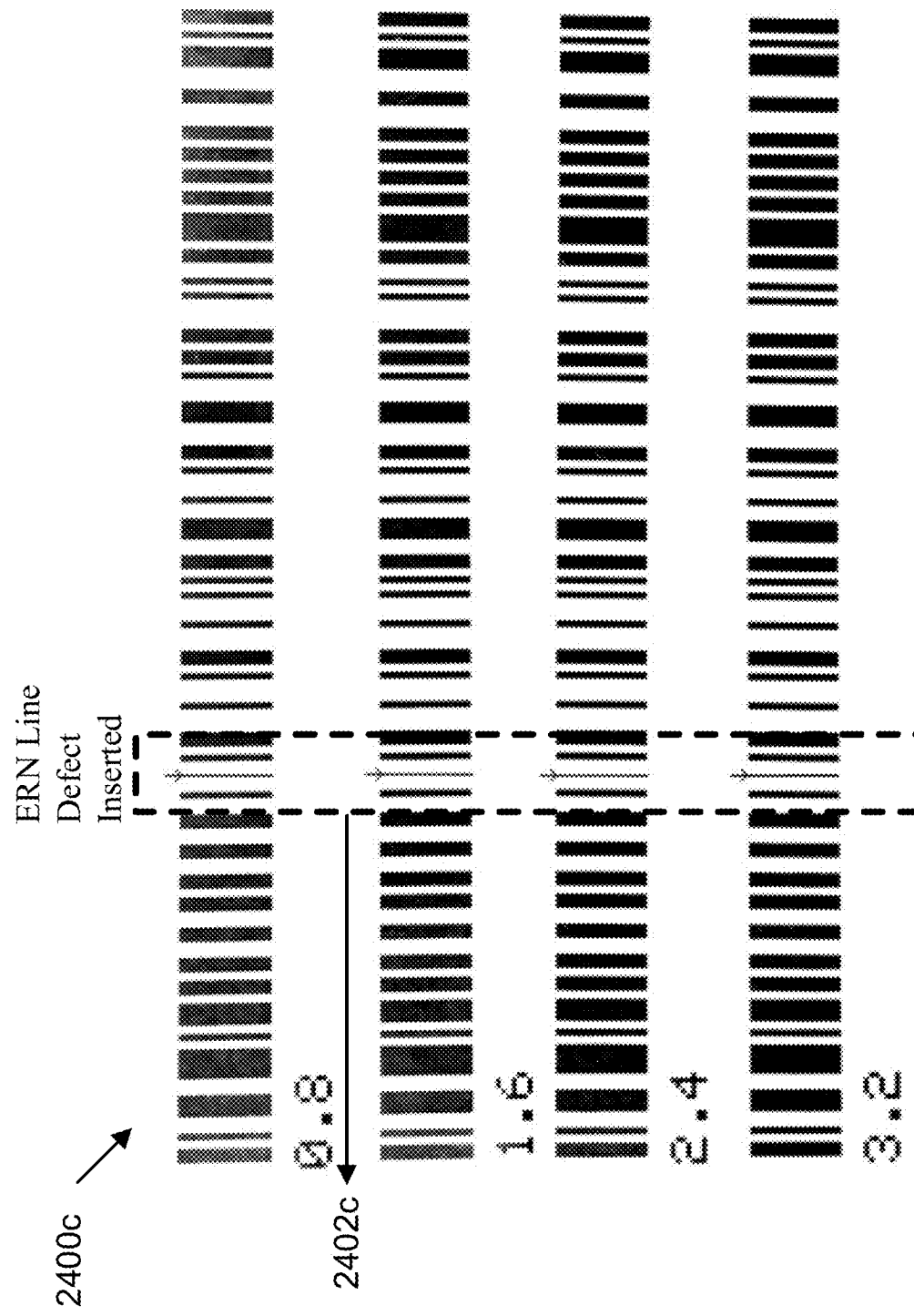

| Resolution | 300 dpi | 600 dpi | 1200 dpi |
|---|---|---|---|
| Aperture Size | 8.8-mil | 4.7-mil | 2.4-mil |

Table 1

3400

US 10,803,264 B2

METHOD, APPARATUS, AND SYSTEM FOR CHARACTERIZING AN OPTICAL SYSTEM

CROSS-REFERENCE TO RELATED APPLICATIONS

This non-provisional application claims the benefit of U.S. Provisional Patent Application No. 62/614,089, filed Jan. 5, 2018, the entire contents of which are incorporated herein by reference.

TECHNOLOGICAL FIELD

Embodiments of the present disclosure relate generally to printers and, more particularly, to systems and methods for characterizing an optical system such as, but not limited to, a verifier adapted to perform print image verification and print quality control for printers.

BACKGROUND

Notwithstanding revolution in digital communications and digital transmission/viewing of documents, hardcopy printed media, printing onto tangible sheets of paper or labels, remains essential for many purposes. Hardcopy printing may be accomplished via multiple types of devices, including thermal printers, label printers, inkjet printers, and laser printers. For all hardcopy media and printing methods, an important objective is a high level of visual clarity of the final printed output. When a document is intended for narrative text or images to be read/viewed by a person, visual clarity ensures the document is both readable and aesthetically appealing.

Applicant has identified a number of deficiencies and problems associated with conventional printers. Through applied effort, ingenuity, and innovation, many of these identified problems have been solved by developing solutions that are included in embodiments of the present disclosure, many examples of which are described in detail herein.

BRIEF SUMMARY

Various example embodiments described herein relate to a system for calculating and calibrating an effective aperture size of an optical sensor. The system includes the optical sensor configured to scan a test pattern to generate a scan reflectance profile (SRP). The test pattern includes at least one test element. The system further includes a processor in electronic communication with the optical sensor. In this aspect, the processor is configured to calculate an element-reflectance value from the SRP. In this regard, the element-reflectance value is being calculated with respect to the at least one test element of the test pattern. The processor is also configured to receive a reference graph associated with the test pattern. Herein, the reference graph indicates one or more of reference SRPs generated by a one or more of reference optical sensors scanning the test pattern, where the one or more of reference optical sensors have one or more known aperture sizes. Further, the processor is also configured to calculate the effective aperture size of the optical sensor based at least on interpolating the element-reflectance value on the reference graph.

In an aspect, in accordance with said example embodiments, the reference graph further indicates one or more of reference element-reflectance values from the one or more of reference optical sensors. In this aspect, the one or more of reference element-reflectance values are being calculated with respect to the at least one test element of the test pattern.

In some example embodiments, the system further includes a printer, where the optical sensor and the processor are integrated parts of the printer. In this regard, the printer is configured to (a) print a first test pattern comprising bars and spaces of defined specifications; (b) scan the first test pattern; (c) analyze the scanned first test pattern to validate the scanned first test pattern according to a pre-defined acceptance criterion; (d) record thermal management settings of the printer based on the validation of the first test pattern; (e) print a second test pattern at the recorded thermal management settings; and (d) calibrate the optical sensor using the effective aperture size of the optical sensor determined based on analyzing the second test pattern.

In another aspect, in accordance with said example embodiments, where the defined specifications of the bars and spaces includes narrow elements and wide elements, to analyze the scanned first test pattern, the printer is configured to: (f) generate a SRP of the first test pattern; (g) measure a narrow element center position indicative of a median reflectance value of the narrow elements in the SRP; (h) measure a wide element center position indicative of a median reflectance value of the wide elements in the SRP; (i) compare the narrow element center position with the wide element center position; and (k) in response to determining that the narrow element center position is equal to the wide element center position, validate the scanned first test pattern.

In another aspect, to analyze the scanned first test pattern, the printer is further configured to: (l) determine a first width of at least one space in the first test pattern; (m) determine a second width of at least one bar in the first test pattern; and (n) compare the first width with the second width to validate the first test pattern according to the pre-defined acceptance criterion.

In an example embodiment, to analyze the scanned first test pattern, the printer is configured to: (o) calculate a threshold value indicative of a median SRP value in a SRP of the first test pattern; (p) identify a first set of pixels corresponding to at least one space in the first test pattern where a first corresponding SRP value is less than the threshold value; (q) identify a second set of pixels corresponding to at least one bar in the first test pattern where a second corresponding SRP value is greater than the threshold value; and (r) compare a first count of the first set of pixels and a second count of the second set of pixels to validate the first test pattern.

In accordance with an example embodiment described herein, the processor is configured to receive a reference table indicating a plurality of aperture sizes of the optical sensor and a plurality of corresponding resolutions of the plurality of aperture sizes. The processor is further configured to receive characteristics data of at least one indicia of an image to be printed on a print media. In this aspect, the characteristics data includes at least a size of the at least one indicia. Further, the processor is configured to determine an applicable aperture size of the optical sensor based on the reference table and the characteristics data.

In an aspect, in accordance with said example embodiment, the processor is further configured to receive characteristics data of at least one indicia of an image to be printed on a print media. Further, the processor is configured to identify a first region and a second region of the image based on the characteristics data and scan the first region in a printed image at a first resolution and the second region in the printed image at a second resolution different from the first resolution.

Some example embodiments described herein relate to a computer-implemented method for calculating and calibrating an effective aperture size of an optical system. The computer-implemented method includes generating a scan reflectance profile (SRP) by scanning a test pattern using the optical system. In this regard, the test pattern includes at least one test element. The computer-implemented method further includes, calculating an element-reflectance value from the SRP, the element-reflectance value being calculated with respect to the at least one test element of the test pattern. Further the computer-implemented method includes, receiving a reference graph associated with the test pattern, the reference graph indicating a plurality of reference SRPs generated by a plurality of reference optical sensors scanning the test pattern, the plurality of reference optical sensors having a plurality of known aperture sizes. The computer-implemented method further includes, calculating the effective aperture size of the optical system based at least on interpolating the element-reflectance value on the reference graph. In an aspect, creating the reference graph includes using the plurality of reference optical sensors of known optical systems to scan the test pattern to obtain a reference SRP for each of the known optical systems, each optical system of the known optical systems having an aperture size that is different from respective aperture sizes of remaining optical systems from the known optical systems and wherein the reference graph further indicates a plurality of reference element-reflectance values from the plurality of reference optical sensors, the plurality of reference element-reflectance values being calculated with respect to the at least one test element of the test pattern.

In an aspect, in accordance with some example embodiments, where the optical system is an integrated part of a printer, the computer-implemented method further includes, printing a first test pattern comprising bars and spaces of defined specifications and scanning the first test pattern. The computer-implemented method further includes, analyzing the scanned first test pattern to validate the scanned first test pattern according to a pre-defined acceptance criterion and recording thermal management settings of the printer based on the validation of the first test pattern. Further the computer implemented method includes, printing a second test pattern at the recorded thermal management settings and calibrating the optical system using the effective aperture size of the optical system determined based on analyzing the second test pattern.

In some example embodiments, the computer-implemented method includes, receiving a reference table indicating a plurality of aperture sizes of the optical system and a plurality of corresponding resolutions of the plurality of aperture sizes. The computer-implemented method includes, receiving characteristics data of at least one indicia of an image to be printed on a print media. In this regard, the characteristics data comprises at least a size of the at least one indicia. The computer-implemented method further includes, determining an applicable aperture size of the optical system based on the reference table and the characteristics data.

In another example embodiment, the computer-implemented method includes, receiving characteristics data of at least one indicia of an image to be printed on a print media and identifying a first region and a second region of the image based on the characteristics data. The computer-implemented method further includes scanning the first region in a printed image at a first resolution and the second region in the printed image at a second resolution different from the first resolution.

In some embodiments, the computer-implemented method also includes, selecting a first effective aperture size and a second effective aperture size for scanning the first region and the second region of the image based on a reference table. In this regard, the reference table referred herein includes a plurality of aperture sizes and a plurality of resolutions corresponding to the plurality of aperture sizes.

In accordance with alternative or additional another exemplary aspect, the present disclosure includes systems and methods for testing a barcode verifier to characterize an optical system of the barcode verifier. More specifically, in some examples, characterizing the optical system may include determining an effective aperture size of the optical system.

In an alternative or additional exemplary embodiment, a method for characterizing an optical system may include a step of scanning a test pattern using an optical system to be tested to obtain a scan reflectance profile (SRP). This test pattern may comprise at least a test element. The method may also include calculating an element-reflectance value from the SRP. In particular, the element-reflectance value may be calculated with respect to information in the SRP related to the scanned test element. The method also includes the step of utilizing a reference graph to interpolate an effective aperture size of the optical system to be tested, where the effective aperture size corresponds in the reference graph to the element-reflectance value.

In another alternative or additional exemplary embodiment, a system for characterizing an optical system is provided. The system comprises a scannable test pattern having a plurality of linear bars and a test bar having a width that is narrower than each of the plurality of linear bars. The system also includes an optical sensor configured to scan the scannable test pattern to obtain an SRP. A processor is configured to calculate an element-reflectance value from information in the SRP related to the scanned test bar. The system also includes a reference graph having a curve that correlates aperture dimensions to element-reflectance values. The processor is further configured to interpolate an effective aperture dimension of the optical sensor from the reference graph based on the calculated element-reflectance value.

In yet another alternative or additional exemplary embodiment, a method is provided for creating a reference graph to be used for characterizing an optical system. The method may include a step of creating a test pattern that has a test element and a plurality of bars and spaces. The width of the test element is configured to be narrower than the width of each of the plurality of bars and spaces. The method also includes the step of using a plurality of reference optical sensors having different known aperture sizes to scan the test pattern to obtain an SRP for each reference optical sensor. An element-reflectance value is calculated from each SRP, where each element-reflectance value is calculated with respect to information related to the scanned test element. Also, the method includes creating a reference graph by plotting a curve showing a relationship between element-reflectance values versus known aperture sizes of the reference optical sensors. An effective aperture size of an optical system to be tested can be determined using the reference graph.

In accordance with another alternative or additional exemplary aspect, the present disclosure includes the concept of testing optical systems, particularly those optical systems that may be used for barcode verification. One such optical system is a CIS used in a barcode verification device. The systems and methods described herein can be used to characterize an optical system in order to determine an effective aperture size of the optical system. For instance, the effective aperture size may be based on the effective width of each sensor, which is related to the number of sensors per inch. Also, the effective aperture size may be based on the distance between the sensor and a printed barcode. The process of scanning a barcode, as mentioned throughout the disclosure, may include shining a laser beam on the barcode and detecting the light reflected off the barcode.

Example embodiments of the present disclosure also includes a device that is capable of performing the two functions of printing barcodes and verifying the printed barcodes. This integrated printer/verifier device allows the printing and verifying to be performed in a single device. The integrated printer/verifier device may include a CIS or other type of linear sensor array that uses the motion of the print medium as it is being transported through the device to generate a two-dimensional grayscale image of the barcode. The grayscale image can then be analyzed to determine the print quality of the barcode according to ANSI X3.182 and ISO/IEC 15416 standards or other barcode verification standards that may be established in the future.

When a barcode is verified, the effective aperture size may be calculated and then reported according to the verification standards. However, due to various factors affecting the resolution and other characteristics, a verifier device may have an effective aperture size that differs slightly from the actual physical dimensions of the optical system.

For this reason, it may be advantageous to determine an effective aperture dimension of the optical system of a barcode verification device. By calculating the effective aperture dimension according to the teachings disclosed herein, this value can be advertised as a certifiable parameter for stand-alone verification devices and/or integrated printer/verifier devices. The method of calculating the effective aperture size according to the teachings disclosed herein can also be used to determine if other verifying devices comply with the barcode verification standards.

Barcodes may be printed onto any suitable type of print medium. In some embodiments, a printer (or printer/verifier) may be a label printing device for printing barcodes onto labels that have at least some un-printed area (or blank area). The labels can be fed from a roll or other feed mechanisms to the printing mechanism of the label printing device.

In accordance with some example embodiments described herein, a method of characterizing an optical system of a printer is described. The method includes accessing, by a processing unit, information associated with an image to be printed on a print media. The method includes determining characteristics of at least one indicia in the image. In this regard, the characteristics comprises at least a size of the at least one indicia. The method further includes computing, based on the determination of the characteristics, an effective aperture size and an effective resolution corresponding to the effective aperture size, at which the optical system is to be characterized for scanning the at least one indicia printed on the print media.

In an aspect, in accordance with said example embodiments, the accessing of the information includes accessing an image buffer in a memory of the printer, the image buffer including the information comprising the image to be printed by the printer.

In another aspect, in accordance with some example embodiments described herein, the characteristics determined includes at least one of, a type of the at least one indicia, a size of the at least one indicia, size of one or more narrow elements and wide elements in a pattern to be scanned by the optical system, and characteristics defined in application standard defining a print quality.

In accordance with said example embodiments, the computing of the effective aperture size and the effective resolution is based on accessing a reference table. In this regard, the reference table includes a plurality of aperture sizes of the optical system and a plurality of resolutions applicable for the plurality of the aperture size respectively. In some example embodiments, the computing of the effective aperture size is based on selecting in the reference table, an aperture size, from amongst the plurality of aperture sizes, that is relatively closest to a desired aperture size for scanning the indicia by the optical system. In this regard, in some example embodiments, the computing of the effective aperture size is based on selecting in the reference table, a resolution from amongst the plurality of resolution that is applicable according to the computed effective aperture size for scanning the indicia by the optical system.

In accordance with some example embodiments described herein, the computing of the effective aperture size and the effective resolution is based on interpolating a value of the effective aperture size and the effective resolution respectively, using values corresponding to the plurality of the aperture sizes and the plurality of resolutions in the reference table.

In accordance with some example embodiments described herein, the reference table used for computing the effective aperture size and the effective resolution is created based on a reference graph by (a) scanning, by the optical system, a test pattern to be tested to obtain a scan reflectance profile (SRP), the test pattern comprising at least a test element, (b) calculating an element-reflectance value from the SRP, the element-reflectance value being calculated with respect to information related to the scanned test element, and (c) utilizing the reference graph to interpolate an ideal aperture size of the optical system to be tested, the ideal aperture size corresponding to the element-reflectance value. In this regard, the reference graph is created by using known optical systems to scan the test pattern to obtain a reference SRP for each known optical system, each known optical system having a known aperture diameter that is different from the aperture diameters of the other known optical systems. In accordance with said example embodiments, the method further comprises calculating a reference element-reflectance value from the reference SRPs for each known optical system, the reference element-reflectance values being calculated with respect to information related to the scanned test element.

Some example embodiments described herein relate to a method for characterizing an optical system of a printer. The method includes accessing, by a processing unit, a reference table comprising a plurality of aperture sizes of the optical system and a plurality of resolutions corresponding to the plurality of aperture sizes respectively. The method further includes accessing, by the processing unit, information from an image buffer in a memory of the printer, the information comprising at least one image to be printed on a print media and identifying, by the processing unit, at least one indicia based on the information comprising the at least one image. The method further includes determining, by the processing unit, characteristics of the at least one indicia, where the characteristics includes at least one of, a size of the at least one indicia identified in the at least one image and a measurement aperture size defined in an application specification defining a print quality. Further the method includes, computing, by the processing unit, based on the determined characteristics of the at least one indicia, an effective aperture size and an effective resolution corresponding to the effective aperture size, using the reference table accessed by the processing unit; and characterizing, the optical system based on the effective aperture size and the effective resolution for scanning the at least one image printed on the print media by the printer.

In accordance with said example embodiments, the optical system is characterized before scanning the at least one image based on the information accessed from the image buffer, the information including the at least one image that is to be printed next by the printer and scanned by the optical system.

In some embodiments, the reference table used for computing the effective aperture size and the effective resolution is created based on a reference graph by scanning, by the optical system, a test pattern to be tested to obtain a scan reflectance profile (SRP), the test pattern comprising at least a test element; and calculating an element-reflectance value from the SRP, the element-reflectance value being calculated with respect to information related to the scanned test element; and utilizing the reference graph to interpolate an ideal aperture size of the optical system to be tested, the ideal aperture size corresponding to the element-reflectance value. The reference graph is created by using known optical systems to scan the test pattern to obtain a reference SRP for each known optical system, each known optical system having a known aperture diameter that is different from the aperture diameters of the other known optical systems. In calculating a reference element-reflectance value from the reference SRPs for each known optical system, the reference element-reflectance values being calculated with respect to information related to the scanned test element.

In an aspect, in accordance with said example embodiments, the image includes a plurality of indicia. In this regard, the method includes identifying at least, a first indicia and a second indicia in the at least one image that is to be printed on the print media and determining a first size of the first indicia and a second size of the second indicia based on processing of the at least one image. The method further includes computing, based on the determination of the first size of the first indicia, a first aperture size and a first resolution at which the optical system is to be characterized for scanning the first indicia and computing, based on the determination of the second size of the second indicia, a second aperture size and a second resolution at which the optical system is to be characterized for scanning the first indicia. The method further includes characterizing the optical system to scan the print media upon printing the at least one image so that the optical system scans the first indicia on the print media based on the computed first aperture size and first resolution and scans the second indicia on the print media based on the computed second aperture size and the second resolution.

Some example embodiments described herein relate to an optical system. The optical system includes an optical sensor adapted to scan an indicia on a print media. The optical system also includes a processing unit communicatively coupled to the optical sensor. In this aspect, in accordance with said example embodiments, the processing unit adapted to, (a) access, information associated with an image to be printed on the print media; (b) determine characteristics of at least one indicia in the image, where the characteristics comprises at least a size of the at least one indicia; and (c) compute, based on the determination of the characteristics, an effective aperture size and an effective resolution corresponding to the effective aperture size, at which the optical system is to be characterized for scanning the at least one indicia printed on the print media.

In accordance with some example embodiments, the processing unit of the optical system is adapted to access an image buffer in a memory of a printer, the image buffer including the information comprising the image to be printed by the printer. In accordance with some example embodiments, the processing unit is adapted to compute the effective aperture size and the effective resolution based on accessing a reference table comprising a plurality of aperture sizes of the optical system and a plurality of resolutions applicable for the plurality of the aperture size respectively.

In some example embodiments, the reference table is created based on a reference graph computed by the processing unit. In this regard, to compute the reference graph, the processing unit is adapted to: (i) scan, a test pattern to be tested to obtain a scan reflectance profile (SRP), the test pattern comprising at least a test element; (ii) calculate an element-reflectance value from the SRP, the element-reflectance value being calculated with respect to information related to the scanned test element; and (iii) utilize the reference graph to interpolate an ideal aperture size of the optical system to be tested, the ideal aperture size corresponding to the element-reflectance value. In this regard, the reference graph is created by using known optical systems to scan the test pattern to obtain a reference SRP for each known optical system, each known optical system having a known aperture diameter that is different from the aperture diameters of the other known optical systems and calculating a reference element-reflectance value from the reference SRPs for each known optical system, the reference element-reflectance values being calculated with respect to information related to the scanned test element.

In some example embodiments, a printing system is described. The printing system includes a printer subsystem having a printing processing unit and a memory including an image buffer adapted to store at least one image to be printed by the printer subsystem. The printing system further includes an optical system communicatively coupled to the printer subsystem. In this regard, the optical system includes an optical sensor adapted to scan an indicia printed by the printer subsystem on a print media and a processing unit communicatively coupled to the optical sensor. The processing unit referred herein is adapted to: (a) access, from the memory of the printer subsystem, an information associated with the at least one image to be printed on the print media; (b) determine, based on the information, characteristics of at least one indicia in the at least one image, where the characteristics comprises at least, a size of the at least one indicia; and (c) compute, based on the determination of the characteristics, an effective aperture size and an effective resolution corresponding to the effective aperture size, at which the optical system is to be characterized for scanning the at least one indicia printed on the print media.

In an aspect, in accordance with said example embodiment, the memory of the printing subsystem comprises a reference table having a plurality of aperture sizes of the optical system and a plurality of resolutions applicable for the plurality of the aperture size respectively. In this aspect, the processing unit is adapted to compute the effective aperture size and the effective resolution based on accessing the reference table.

In accordance with some example embodiments described herein, a method of calibrating an optical system is described. The method includes (a) printing, by a printer, a pattern comprising a plurality of spaces and a plurality of bars of a defined specification; (b) scanning, by the optical system, the printed pattern; (c) analyzing, by a processing unit, the scanned pattern to validate the printed pattern to meet a pre-defined acceptance criterion; (d) recording, based on the validation of the printed pattern, thermal management settings of the printer; (e) printing, by the printer, a scannable test pattern at the recorded thermal management settings; and (f) calibrating, the optical system using an effective aperture size of the optical system determined based on analyzing the scannable test pattern.

In an aspect, in accordance with said example embodiment, in an instance, where the scanned pattern is not validated, the method further includes: (i) adjusting thermal management settings of the printer and (ii) based on the adjusted thermal management settings, repeating steps (a)-(c) until the printed pattern meets the pre-defined acceptance criterion.

In another aspect, in accordance with said example embodiments, analyzing the scanned pattern includes analyzing a scanned reflectance profile (SRP) of the scanned pattern to meet the pre-defined acceptance criterion.

In some example embodiments, where the defined specification of the bars and spaces respectively in the pattern includes narrow elements and wide elements, the analyzing of the scanned pattern further includes: (i) accessing, a SRP of the scanned pattern; (ii) measuring a narrow element center position indicative of a median reflectance value of the narrow elements in the pattern sensed by the optical system; (iii) measuring a wide element center position indicative of median reflectance value of wide elements in the pattern; (iv) comparing the narrow element center position with the wide element center position; and (v) validating the printed pattern, in an instance, where based on the comparison, the narrow element center position is equal to the wide element center position.

In another aspect, in accordance with some example embodiments, where in an instance, where based on the comparison the narrow element center position is not equal to the wide element center position, the method further includes: (i) adjusting the thermal management settings of the printer and (ii) based on the adjusted thermal management settings, repeating steps (a)-(c) until the printed pattern meets the pre-defined acceptance criterion.

According to some example embodiments, the method further includes (i) in instance, where the narrow element center position is less than the wide element center position, adjusting the thermal management settings of the printer by decreasing heat settings associated with a print head of the printer; and (ii) in instance, where the narrow element center position is greater than the wide element center position, increasing heat settings associated with the print head of the printer.

In an aspect, in accordance with said example embodiments, the optical system is a barcode verifier and the optical system comprises at least one optical sensor and the at least one optical sensor is a contact image sensor or a linear scan head incorporated in the barcode verifier.

In accordance with some example embodiments, analyzing the scanned pattern includes: (i) determining, a first width of at least one space, from amongst the plurality of spaces in the printed pattern; (ii) determining, a second width of at least one bar from amongst the plurality of bars in the printed pattern; and (iii) comparing the determined first width with the determined second width, to validate the printed pattern to meet the acceptance criterion.

In another aspect, in accordance with some example embodiments, where in an instance, where based on the comparison the first width is not equal to the second width, the method further includes: (i) adjusting the thermal management settings of the printer and (ii) based on the adjusted thermal management settings, repeating steps (a)-(c) until the printed pattern meets the pre-defined acceptance criterion.

In accordance with some example embodiments described herein, the method further includes: (i) in instance, where the first width corresponding to the at least one space is less than the second width corresponding to the at least one bar, adjusting the thermal management settings of the printer by decreasing heat settings associated with a print head of the printer; and (ii) in instance, where the first width corresponding to the at least one space is greater than the second width corresponding to the at least one bar, adjusting the thermal management settings of the printer by increasing heat settings associated with the print head of the printer.

In accordance with some example embodiments described herein, the determining of the first width of the at least one space and the second width of the at least one bar includes: (i) computing, a threshold value indicative of a median SRP value in a SRP of the scanned pattern; (ii) identifying a first set of pixels corresponding to the at least one space in the printed pattern for which respective SRP value is less than the threshold value; (iii) identifying a second set of pixels corresponding to the at least one bar for which respective SRP value is greater than the threshold value; and (iv) comparing a first count of the identified first set of pixels and a second count the second set of pixels to validate the printed pattern.

In some example embodiments, determining the first width of the at least one space and the second width of the at least one bar includes: (i) computing, for each pixel in the scanned pattern, a difference between a first SRP value of the pixel with a second SRP value of a neighboring pixel in the scanned pattern; (ii) recording in a table a set including difference values computed for each pixel in the scanned pattern; (iii) determining, an average difference value of the difference values recorded in the table; (iv) identifying, a first set of pixels corresponding to the at least one space in the printed pattern for which respective SRP value is less than the determined average difference value; (v) identifying a second set of pixels corresponding to the at least one bar for which respective SRP value is greater than the determined average difference value; and (v) comparing a first count of the identified first set of pixels and a second count the second set of pixels to validate the printed pattern.

Some example embodiments described herein relate to an optical system. The optical system includes an optical sensor adapted to scan a printed pattern comprising a plurality of bars and a plurality of spaces of a defined specification. The optical system further includes a processing unit communicatively coupled to the optical system. The processing unit is adapted to: (a) analyze, the printed pattern to validate the printed pattern to meet a pre-defined acceptance criterion; (b) record, based on the validation of the printed pattern, thermal management settings of a printer; (c) generate, a scannable test pattern at the recorded thermal management settings; and (d) calibrate, the optical system using an effective aperture size of the optical system determined based on analyzing the scannable test pattern.

In an aspect, in an instance, where the scanned pattern is not validated, the processing unit of the optical system is adapted to: (i) adjust thermal management settings of the printer; (ii) based on the adjusted thermal management settings, repeat steps (a)-(c) until the printed pattern meets the pre-defined acceptance criterion; (iii) generate, a new scannable test pattern at the recorded thermal management settings; and (iv) calibrate, the optical system using an effective aperture size of the optical system determined based on analyzing the new scannable test pattern.

In some embodiments, the processing unit is adapted to analyze the scanned pattern the by analyzing a scanned reflectance profile (SRP) of the scanned pattern to meet the pre-defined acceptance criterion.

In some example embodiments, where the defined specification of the bars and spaces respectively in the pattern comprises narrow elements and wide elements, the processing unit is adapted to: (i) access, a SRP of the scanned pattern; (ii) measure a narrow element center position indicative of a median reflectance value of the narrow elements in the pattern sensed by the optical system; (iii) measure a wide element center position indicative of median reflectance value of wide elements in the pattern; (iv) compare the narrow element center position with the wide element center position; and (v) validate the printed pattern, in an instance, where based on the comparison the narrow element center position is equal to the wide element center position.

In accordance with some example embodiments, where in an instance, where based on the comparison the narrow element center position is not equal to the wide element center position, the processing unit is to further: (i) generate a command to adjust thermal management settings associated with a print head of the printer and (ii) based on the adjusted thermal management settings, repeat steps (a)-(c) until the printed pattern meets the pre-defined acceptance criterion.

In some example embodiments, to adjust the thermal management settings, the processing unit is adapted to: (i) generate a command to decrease heat settings of a printhead of the printer, in instance, where the narrow element center position is less than the wide element center position; and (ii) generate a command to increase heat settings of the printhead of the printer, in instance, where the narrow element center position is greater than the wide element center position.

In accordance with some example embodiments, to analyze the scanned pattern, the processing unit is adapted to: (i) determine, a first width of at least one space, from amongst the plurality of spaces in the printed pattern; (ii) determine, a second width of at least one bar from amongst the plurality of bars in the printed pattern; and (iii) compare the determined first width with the determined second width, to validate the printed pattern to meet the acceptance criterion.

In accordance with some example embodiments, in an instance, where based on the comparison the first width is not equal to the second width, the processing unit is adapted to: (i) adjust the thermal management settings of the printer and (ii) based on the adjusted thermal management settings, repeat steps (a)-(c) until the printed pattern meets the pre-defined acceptance criterion.

According to some example embodiments, in another aspect, where: (i) in instance, where the first width corresponding to the at least one space is less than the second width corresponding to the at least one bar, the processing unit is to generate a command to decrease heat settings associated with a printhead of the printer; and (ii) in instance, where the first width corresponding to the at least one space is greater than the second width corresponding to the at least one bar, the processing unit is to generate a command to increase heat settings associated with the printhead of the printer.

In accordance with some example embodiments described herein, a method for characterizing an optical system of a printer is described. The method includes (i) accessing, characteristics of a print job defined for printing an image by a printer; (ii) identifying, at least a first region and a second region of the image based on the characteristics of the print job; and (iii) scanning, by the optical system, the first region in a printed image at a first resolution and the second region in the printed image at a second resolution different from the first resolution.

In an aspect, in accordance with said example embodiments, the first region is defined to be scanned at a high resolution and the second region in the image is defined to be scanned at a low resolution, the method includes: (i) scanning, by the optical system, the first region using default resolution settings of the optical system; and (ii) scanning, by the optical system, the second region by adjusting the default resolution settings of the optical system.

In another aspect, in accordance with said example embodiments, the adjusting of the default resolution settings of the optical system includes, combining outputs of a set of sensors of the optical system upon scanning the second region and where a number of sensors in the set of sensors is based on a resolution value of the low resolution.

In accordance with some example embodiments, the scanning of the printed image, is performed for each row in the image and for each row in the image, the optical system identifies a first portion corresponding to the first region and a second portion corresponding to the second region, for scanning the first portion of the row at the first resolution and the second portion of the row at the second resolution.

In accordance with some example embodiments, the method further includes, accessing the combined outputs of the set of sensors of the optical system for verifying the second region on the printed image by the optical system.

In another aspect, the method further includes: (i) identifying, a third region of the image based on the characteristics of the print job; and (ii) scanning, by the optical system, the third region in the printed image at a third resolution. In this regard, the scanning of the second region includes, adjusting default settings of the optical system by combining outputs of two adjacently positioned sensors in a row and two adjacently positioned sensors in a column of a sensor array of the optical system. Further, the scanning of the third region comprises adjusting default settings of the optical system by combining outputs of at least three adjacently positioned sensors in the row and at least three adjacently positioned sensors in the column of a sensor array of the optical system.

In some example embodiments, the method further includes selecting a first effective aperture size and a second effective aperture size for scanning the first region and the second region of the image respectively using a reference table comprising a plurality of aperture sizes and a plurality of resolutions corresponding to the plurality of the aperture sizes.

In accordance with said example embodiments, the reference table is created using a reference graph by: (i) scanning, by the optical system, a test pattern to be tested to obtain a scan reflectance profile (SRP), the test pattern comprising at least a test element; (ii) calculating an element-reflectance value from the SRP, the element-reflectance value being calculated with respect to information related to the scanned test element; and (iii) utilizing the reference graph to interpolate an ideal aperture size of the optical system to be tested, the ideal aperture size corresponding to the element-reflectance value. In this regard, the reference graph is created by using known optical systems to scan the test pattern to obtain a reference SRP for each known optical system, each known optical system having a known aperture diameter that is different from the aperture diameters of the other known optical systems and calculating a reference element-reflectance value from the reference SRPs for each known optical system, the reference element-reflectance values being calculated with respect to information related to the scanned test element.

Some example embodiments described herein relate to a system including: an optical subsystem and a processing unit communicatively coupled to the optical system. The optical subsystem includes an array of sensors arranged in at least one row, the optical subsystem adapted to scan an image printed on a print media. In accordance with said example embodiments, the processing unit is adapted to: (i) access, characteristics of a print job defined for printing the image on the print media; (ii) identify, at least a first region and a second region of the image based on the characteristics of the print job; and (iii) scan, by the optical subsystem, the first region in a printed image at a first resolution and the second region in the printed image at a second resolution different from the first resolution.

In an aspect, where the first region is defined to be scanned at a high resolution and where the second region in the image is defined to be scanned at a low resolution, the processing unit is adapted to: (i) scan, by the optical subsystem, the first region using default resolution settings of the optical subsystem; and (ii) scan, by the optical subsystem, the second region by adjusting the default resolution settings of the optical subsystem.

In some example embodiments, the processing unit is adapted to adjust the default resolution settings of the optical subsystem system based on combining outputs of a set of sensors from amongst the array of the sensors, upon scanning the second region.

In some example embodiments, the processing unit is adapted to: (i) identify, a third region of the image based on the characteristics of the print job; and (ii) scan, by the optical system, the third region in the printed image at a third resolution. In this regard, the processing unit is to scan the second region based on adjusting the default resolution settings by combining outputs of two adjacently positioned sensors in a row and two adjacently positioned sensors in a column, from the array of sensors and the processing unit is to scan the third region based on adjusting the default resolution settings by combining outputs of at least three adjacently positioned sensors in the row and at least three adjacently positioned sensors in the column, from the array of sensors.

According to some example embodiments, the processing unit is adapted to select a first effective aperture size and a second effective aperture size to scan the first region and the second region of the image respectively, using a reference table comprising a plurality of aperture sizes and a plurality of resolutions corresponding to the plurality of the aperture sizes. In some example embodiments, the processing unit is further adapted to access the combined outputs of the set of sensors to verify the second region on the printed image.

The above summary is provided merely for purposes of providing an overview of one or more embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The description of the embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 24A, 24B, and 24C illustrate examples of a test pattern that may be printed by a printing subsystem, in accordance with some example embodiments described herein;

DETAILED DESCRIPTION

Figure 1:
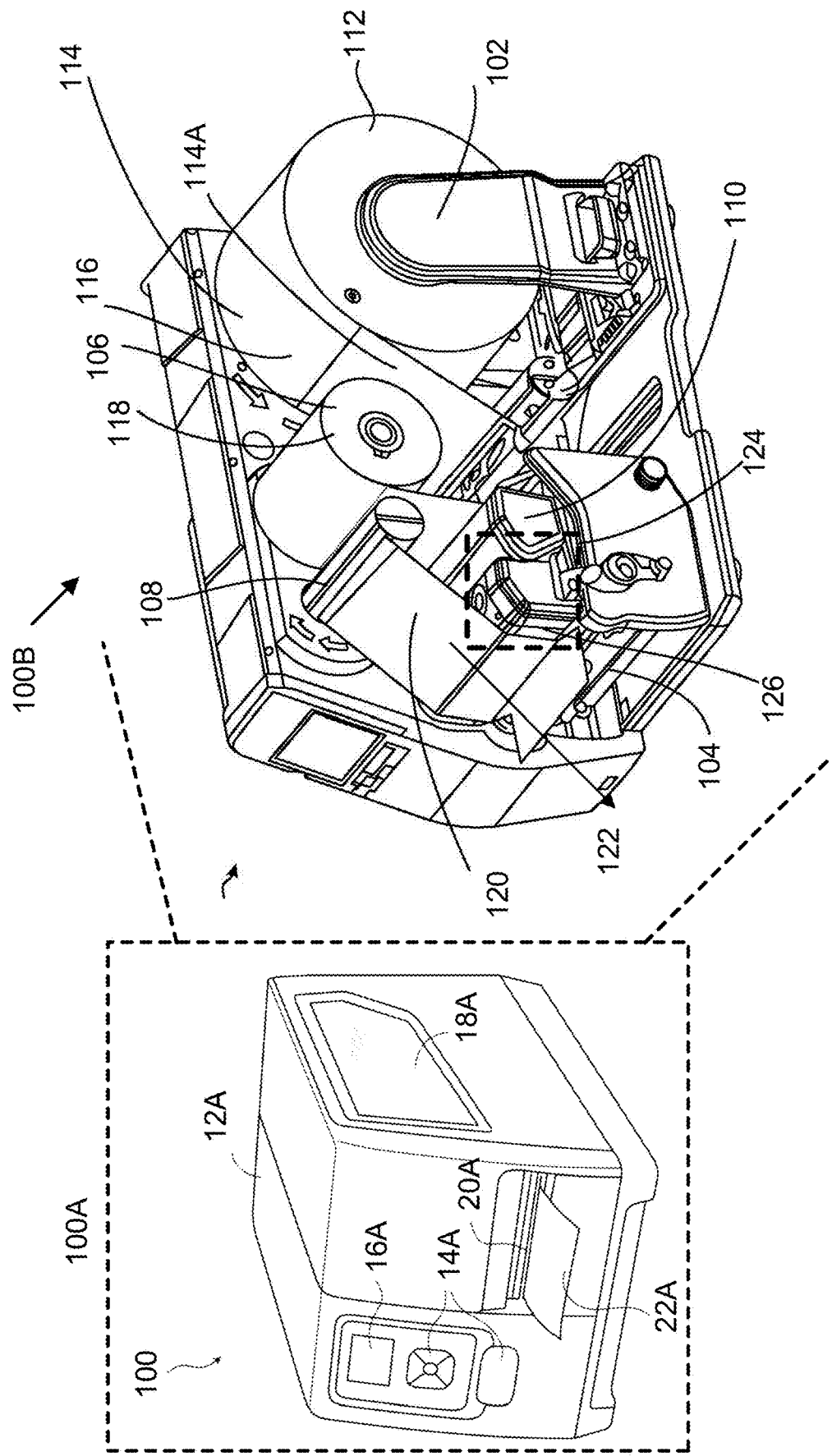
FIG. 1 illustrates a perspective view representing a label printer including an optical system and another perspective view representing various components of the label printer, in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting in so far as devices described herein, or portions thereof, may be attached or utilized in other orientations The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment)

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

In various example embodiments, the term "print media" is used herein to mean a printable medium (such as a page or a paper) on which print image (such as graphics, text, and/or visual images) may be printed. The print media may correspond to a continuous media that may be loaded in a printing apparatus in form of a roll or a stack. In some embodiments, the scope of the disclosure is not limited to having a continuous media. In some embodiments, the print media may be divided into one or more portions through perforations defined along a width of the print media. In an alternate embodiment, the print media is divided into the one or more portions through one or more marks that are defined at a predetermined distance from each other, along the length of the print media. In an example embodiment, a contiguous stretch of the print media, between two consecutive marks or two consecutive perforations, corresponds to a portion of the print media. In some embodiments, the print media may correspond to a thermal media on which the content is printed through application of heat on the print media itself. In alternate embodiments, the print media may correspond to a liner media, a liner-less media, and/or the like.

In various example embodiments, the term "print image" is used herein to mean an image that is to be printed on the print media. The print image may include one or more image components, for example decodable indicia (such as a barcode or a QR code), text content, graphical symbols, and the like, in a specified layout.

In various example embodiments, the term "image buffer" is used herein to mean a storage area reserved in a printing apparatus. Specifically, the image buffer includes a print image that is to be printed on the print media. Based on the image data rendered in the image buffer, the printing system or apparatus may be configured to control the printhead in an appropriate way at appropriate timing to print the print image on the print media. In various embodiments, the image buffer may be further configured to store property information associated with the print image. Examples of the property information may include, but are not limited to, gray levels, ANSI grade levels, numeric ANSI grades, and/or bar width growth percentages. The property information may further include type of decodable indicia, for example CODE39.

In various example embodiments, the term "burn line" is used herein to mean a printhead component that includes multiple heating elements disposed thereon, which under the control of a control device that is activated in such a pattern that an image, corresponding to the print image stored in the image buffer, is replicated/imprinted on the print media.

In various example embodiments, the term "printhead" is used herein to mean an assembly that includes one or more burn lines to print the print image (retrieved from the image buffer) on the print media. In an embodiment, the printhead may include a plurality of heating elements in each burn line that is energized (or heated) and pressed against a ribbon or the print media (such as a thermal paper) to perform a print operation. In an embodiment, during the print operation, only a set of heating elements are energized to perform the print operation. The set of heating elements may be selected based on the position of the various image components included in the print image to be printed on the print media.

In various example embodiments, the term "web direction" is used herein to mean a direction in which the print media travels towards the printhead during a print operation.

In various example embodiments, the term "cross-web direction" is used herein to mean a direction that is orthogonal/transverse to the web direction. In other words, the cross-web direction is a direction that is orthogonal/transverse to the direction in which the print media exits.

In various example embodiments, the term "Contact Image Sensor (CIS)" is used herein to mean a device that includes an array of linear sensors that capture the image content of the print media as the print media traverses through a printing and verifying system to generate a two-dimensional grayscale image of the print media. The grayscale image may then be analyzed to determine the print quality of a region-of-interest (ROI) (including decodable indicia, such as a barcode) according to, for example ANSI X3.182 and ISO/IEC 15416 standards or other barcode verification standards that may be established in the future.

In various example embodiments, the term "gap sensor" is used herein to mean a sensor that detects a front edge of the print media as it travels towards the printhead. Additionally or alternatively, the gap sensor may be configured to detect the rear edge of the print media.

In various example embodiments, the term "indicia verifier" is used herein to describe an apparatus that monitors whether the printing of the print media is of acceptable quality and/or determines if there are issues with printing decodable indicia onto print media. Examples of such issues may include, but not limited to, ribbon wrinkle, stained print media, damaged print media, defective print media, printing lapses, and barcode width variations. In response to such issues, automatic correction may be performed by the indicia verifier to allow the printing system to continue printing without pausing.

The term "processor", "processing unit", "processing system", and/or the like, is used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

For the purposes of this description, a general reference to "memory" refers to memory accessible by the processors, including internal memory or removable memory plugged into the device and memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, and similar electronic devices equipped with at least a processor configured to perform the various operations described herein.

The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

I. Overview

Optical systems (such as, but not limited to, printer verifiers with contact image sensor (CIS) devices) can be used for verifying a print quality of a printed label. Such optical systems are installed along with a printer for performing quality check of printing by the printer. These CIS devices have certain aperture sizes that are usually needed for testing certain barcodes. Thus, some verification standards may require that information regarding the aperture size of the verifier be made known when the barcode grade is reported. However, the optical components of a CIS may include an effective aperture dimension that is different from another CIS and that is unknown to the user. The effective aperture dimension of the CIS may greatly affect how the verifier grades the barcodes. Using an image sensor with a non-uniform response can lead to faulty verification of gray levels in a printed image, and it is therefore desirable to provide systems and methods that provide for adjusting an image sensor to ensure accuracy of verification. Thus, determining an effective aperture size of an optical system that may be used for verifying the print quality of a barcode is desired.

In addition, these optical systems are calibrated upon initialization or before use so that the optical systems operate at defined settings. For example, the resolution setting at which the optical system (such as one having an optical sensor array of a defined aperture size) scans the printed image may need to be calibrated. In this aspect, an effective aperture size of a printer verifier must be calculated for computing ANSI grading and reporting barcode printing quality of labels printed by the printer.

However, determining and calibrating an accurate aperture size of the verifier has associated challenges. In a printer configuration, due to manufacturing slack up tolerance, a focal point of the printer verifier that is used for determining the aperture size of the printer verifier can be shifted. "Pre-printed calibration cards" can be used to determine aperture size of the verifier. However, these cards may require careful handling to prevent damaging of the cards during use. Further, the accuracy of these pre-printed calibration cards varies when print media of varying thickness is used for printing.

In this regard, some example embodiments described herein relate to techniques for self-calibrating a printer verifier. According to some example embodiments, a self-calibration technique includes a process of determining an effective aperture size of the verifier by printing a unique pattern of equal size bars and spaces on any print media to confirm a printed size of desired print pattern. In this aspect, the confirmation of the printed size of desired pattern includes optimizing thermal settings of a printhead in the printer by recursively iterating the process of printing the unique pattern and analyzing a SRP of the printed unique pattern until optimum settings are reached. Once the optimum settings are identified, the method further includes printing a pattern with a known defect at the optimum thermal settings, and measuring the defect and using known techniques to determine the effective aperture size of the verifier.

In addition, for effectively scanning different sizes of barcodes printed by the printer, it is often required to have multiple verifier devices, each having different aperture size suitable for imaging respective sizes of barcodes. For example, to effective image the barcode for verification, a verifier with smaller aperture size is required for a barcode of a small size (such as one to be placed on a product), whereas a verifier with larger aperture size is required for a barcode of a larger size (such as one to place on a shipping carton). Because purchasing multiple verifiers may not be favorable for customers, software-based modification of an aperture size of the verifier may be implemented by changing resolution at which the barcodes are imaged. In this regard, a need exists for effective software-based modification techniques so as to modify an aperture size that exactly mirrors a desired physical aperture size.

In this regard, some example embodiments described herein relate to automatically selecting, in run time, (i.e. while a printer is printing a barcode), an effective aperture size applicable for a printer's verifier from a set of different aperture sizes determined using a software. In this aspect, information of a current image to be printed in the printer's image buffer, (i.e. an image to be currently printed) is used to configure the verifier to select a resolution and the aperture size before scanning the barcode. Selection of an aperture size of the verifier is based on various characteristics of the image (for example, a size of a barcode in a current reference image to be printed). Selection of resolution is performed based on utilizing a reference table including effective aperture sizes of the verifier for different resolutions of linear sensor of the verifier. Accordingly, at the run-time (i.e. while printing a barcode on each label of print media), characteristics including a size of the barcode is accessed from reference image in printer's image buffer and correspondingly an effective aperture size of the verifier applicable for the barcode size is identified. Further, a resolution applicable for the identified aperture size is identified from the reference table. Additionally, post identification of the aperture size based on the barcode size, some level of software blurring and binning of pixels could be performed using conventional approaches to blur the image for better approximating the aperture size to be used for scanning the barcode. Finally, the identified aperture size and the identified resolution are used for scanning the printed barcode for verification.

Further, scanning mechanisms (such as sensor arrays of the printer verifiers) are available in different resolution formats and aperture sizes. In this aspect, scanning images at lower resolution consumes less memory space (and accordingly faster) such that the verifier can perform verification of printed labels that are printed at high printing speed. Scanning images at higher resolution is slower and consumes more memory space. However, for scanning indicia such as barcodes, QR codes, verifier that supports scanning at higher resolution is desired (which reduces an overall printing and verification speed). Thus, verification of print quality by the printer verifier at high resolution is challenging due to speed and memory constraints. Given aforementioned challenges and limitations associated with the optical systems, various example embodiments described herein relate to techniques for effectively characterizing an optical system.

In this regard, some example embodiments described herein relate to a printer verifier that supports high resolution imaging based on lesser memory utilization so as to provide faster image verification. For example, a method of the printer verifier for scanning a printed image includes using characteristics of a print job for adjusting a resolution at which portions of the image are to be scanned by the verifier. In this example, when scanning an image, the verifier does not scan the entire image at only one resolution (i.e. high or low resolution supported by the verifier); instead, the verifier is adapted to scan different regions of an image at different resolutions at which the verifier is interpolated by a software.

Having described these example embodiments at a high level, description of the various devices and associated methods for performing various example operations is provided hereinafter.

II. Example Apparatus for Implementing Embodiments of the Present Invention

FIG. 1 illustrates a perspective view 100A representing a label printer 100 and another perspective view 100B representing various components of the label printer 100, in accordance with some example embodiments described herein.

Referring to the perspective view 100A, a label printer 100 is illustrated. The label printer may include an optical system, for example, an indicia verifier comprising a contact image sensor (CIS). Illustratively, the label printer 100 includes a housing 12A, one or more user input components 14A, one or more user output components 16A, a viewing window 18A, and a label output port 20A. As shown, a label 22A is illustrated exiting the label output port 20A of the label printer 100. More particularly, the label printer 100 may be configured to include the optical system, for example, a printer verifier positioned inside the housing 12A. The printer verifier may allow the label printer 100 to be self-correcting and self-calibrating. Additional elements may be incorporated into the label printer 100 to allow the enclosed printer verifier to be self-cleaning.

Referring to the perspective view 100B, the label printer 100 may include a media hub 102, a printer media output 104, a ribbon drive assembly 106, a ribbon take-up hub 108, and a printhead 110. The label printer 100 may also include a media roll 112, a print media 114, a media path 116, ribbon roll 118, a ribbon 120, and a ribbon path 122. In an example embodiment as disclosed herein, the label printer 100 may further include, for example, a printing and verifying system 124 that may include a gap sensor, the printhead 110, and an optical system (for example, but not limited to, an in-line indicia verifier 126). In some embodiments, the in-line indicia verifier 126 comprises one or more contact image sensors (CIS) that are hard-wired and fully integrated into the printing and verifying system 124 of the label printer 100. In some embodiments, the in-line indicia verifier 126 is separate from the printing and verifying system 124 of the label printer 100.

In this aspect, in an example embodiment, the media hub 102 is configured to receive the media roll 112. In an example embodiment, the media roll 112 may correspond to a roll of the print media 114 that may be a continuous media or may, in some example embodiments, include one or more portions that are defined by means of perforations, cut points, or one or more marks (as in the print media 114A). In an example embodiment, the media hub 102 is coupled to a first electrical drive (not shown) that actuates the media hub 102. On actuation, the media hub 102 causes the media roll 112 to rotate, which further causes the media roll 112 to supply the print media 114 to the printhead 110 along the media path 116. In an example embodiment, along the media path 116, the print media 114 traverses from the media roll 112 through the printhead 110 to the printer media output 104.

In an example embodiment, the printer media output 104 corresponds to a slot or other opening through which the printed media is outputted from the printhead 110. The printer media output 104 may be interfaced with the in-line indicia verifier 126, which may be either a factory fitted or a field installable accessory.

Illustratively, the ribbon drive assembly 106 may receive the ribbon roll 118 that corresponds to a roll of the ribbon 120. In an example embodiment, the ribbon 120 may correspond to an ink media that is utilized to dispose ink onto the print media 114 to print content on the print media 114. In an example embodiment, the ribbon drive assembly 106 may be coupled to a second electrical drive that may be configured to actuate the ribbon drive assembly 106. Upon actuation of the ribbon drive assembly 106, the ribbon drive assembly 106 rotates, which in turn causes the ribbon roll 118 to rotate and supply the ribbon 120 along the ribbon path 122. Along the ribbon path 122, the ribbon 120 traverses from the ribbon roll 118 to the printhead 110, and further to the ribbon take-up hub 108.

In an example embodiment, the ribbon take-up hub 108 may correspond to an assembly that may receive the used ribbon (i.e., a section of the ribbon 120 from which the ink has been disposed on the print media 114). The ribbon take-up hub 108 may also be coupled to a third electrical drive that may be configured to actuate the ribbon take-up hub 108. Upon actuation, the ribbon take-up hub 108 pulls the ribbon 120 from the ribbon roll 118. In an example embodiment, the second electrical drive and the third electrical drive may operate in synchronization such that an amount of the ribbon released by the ribbon roll 118 (due to actuation of the second electrical drive) is equal to the amount of the ribbon received by the ribbon take-up hub 108.

The printhead 110 may correspond to a component that is configured to print the content on the print media 114. In an example embodiment, the printhead 110 may include a plurality of heating elements (not shown), arranged in burn lines, that are energized and pressed against the ribbon 120 to perform a print operation. In operation, the printhead 110 applies heat on a portion of the ribbon 120 and, concurrently, presses the ribbon 120 against the print media 114 to transfer the ink on the print media 114. In an example scenario where the print media 114 corresponds to a thermal paper, the printhead 110 may be directly press against the thermal paper to perform the print operation. In accordance with various example embodiments described herein, the printhead 110 may operate based on thermal settings at which the label printer 100 may be configured to print.

During a print operation, one or more heating elements of the plurality of heating elements are energized to perform the print operation. The one or more heating elements may be selected based on the image components in the print image. For example, if a letter "A" is to be printed, the one or more heating elements that are energized are positioned on the printhead 110 in such a manner that when the printhead 110 is pressed against the ribbon 120 and the print media 114, letter "A" gets printed on the print media 114. To press the ribbon 120 against the print media 114, the printhead 110 translates in a vertically downward direction (or downward direction) to push the ribbon 120 against the print media 114.

In an example embodiment, after the print operation, the print media 114 and the ribbon 120 traverse along the media path 116 and the ribbon path 122, respectively, such that the print media 114 is outputted from the printer media output 104 and the used ribbon traverses to the ribbon take-up hub 108.

In some embodiments, the print media 114 passes through an in-line indicia verifier 126 integrated within and connected to a connection port at a media compartment of the label printer 100. The in-line indicia verifier 126 may be used to verify the content of the print media portions (such as label or tag) of the print media 114. The presence of the in-line indicia verifier 126 may be detected by the label printer 100 upon powering up. In case the in-line indicia verifier 126 is being used for the first time in the label printer 100, the in-line indicia verifier may be calibrated for the print image to be printed by the printhead 110 of the label printer 100. In case the label printer 100 is not properly connected with the in-line indicia verifier 126, the built-in error-handler of the label printer 100 may handle the standard error and generate a display message along with a corresponding error code. The operator of the label printer 100 may take necessary action accordingly to connect the in-line indicia verifier 126. The in-line indicia verifier 126 may enable the label printer 100 to be self-correcting and self-calibrating, and additional elements may be incorporated into the label printer 100 to allow the enclosed in-line indicia verifier 126 to be self-cleaning. Once verified, the print media 114 is outputted from the printer media output 104.

In some embodiments, the printing and verifying system 124 comprises at least the printhead 110 and the in-line indicia verifier 126. In this embodiment, the printhead 110 and the in-line indicia verifier 126 may be incorporated entirely within the housing of the label printer 100. In some example embodiments, the printhead 110 utilizes the ribbon 120 for the thermal transfer of ink to the print media 114 as the print media passes through the printhead 110. The printhead 110 includes a platen roller configured for moving the ribbon 120 and the print media through the printing and verifying system 124. Also, the platen roller provides a surface for supporting the print media 114 when the printhead 110 applies ink or directly prints on the print media 114. Once a print media is printed and verified, it may exit from the printing and verifying system 124. The label printer 100, as described in the above embodiment, is a thermal transfer printer. Notwithstanding, in other embodiments, the label printer 100 may be a direct thermal printer or other such printer, without deviation from the scope of the disclosure.

Figure 2A:
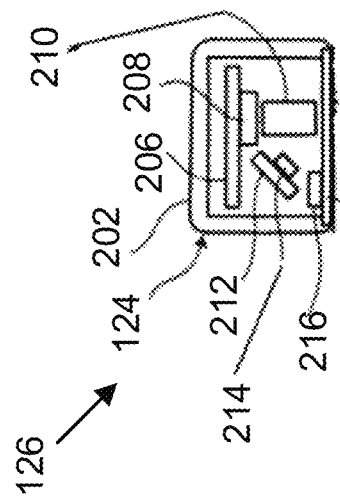
FIGS. 2A-2D illustrate a cutaway inside view of an optical system, in accordance with some example embodiments described herein.
Figure 2C:
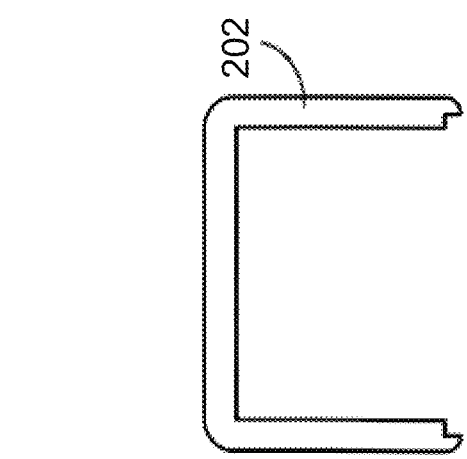
Figure 2C:
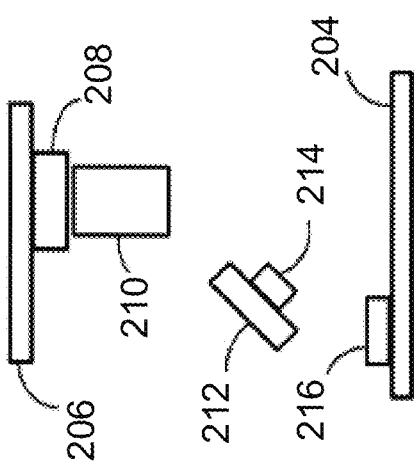
Figure 2B:
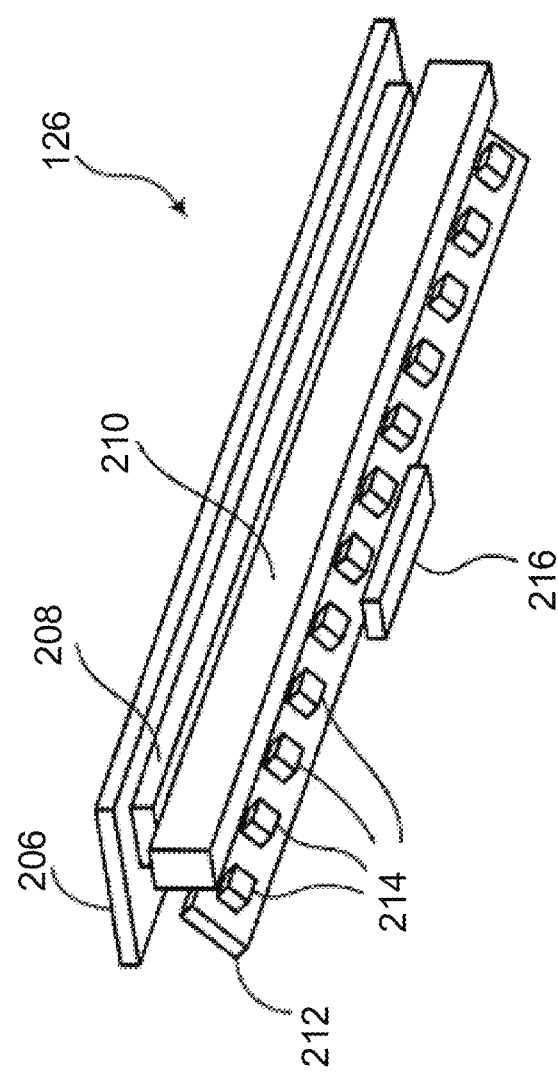

FIG. 2A illustrates a cutaway inside view of an optical system, for example, the in-line indicia verifier 126, according to one or more example embodiments described herein. FIG. 2B is a side view of the in-line indicia verifier 126. FIG. 2C is an exploded-view of the in-line indicia verifier 126.

Referring to FIGS. 2A-2C, the in-line indicia verifier 126 is illustrated to include a sensor housing 202, a window 204, a circuit board 206, a contact image sensor (CIS) 208, a lens array 210, a light board 212, a plurality of light sources 214 (e.g., light emitting diodes (LEDs)), and an ultrasonic vibrator 216.

The sensor housing 202, together with the window 204 (on bottom surface), forms an enclosure for protecting the internal components, such as the circuit board 206, the CIS 208, the lens array 210, the light board 212, the plurality of light sources 214 (e.g., light emitting diodes (LEDs)), and the ultrasonic vibrator 216 of the in-line indicia verifier 126. The sensor housing 202 of the printing and verifying system 124 is positioned near the printhead 110 to allow monitoring of the print quality with minimal delay after the print image is imprinted on print media, such as the print media 114. In an embodiment, the in-line indicia verifier 126 includes the sensor housing 202 disposed in the interior of the housing of the in-line indicia verifier 126.

The window 204, which may be made of a transparent material (such as glass) may permit the plurality of light sources 214 of the in-line indicia verifier 126 to project light upon, each image of decodable indicia printed on the print media is captured as the print image on the print media 114 moves across the window 204.

The circuit board 206 may be configured to support other internal components, such as the CIS 208, the lens array 210, the light board 212, the plurality of light sources 214, and the ultrasonic vibrator 216 of the in-line indicia verifier 126. In various embodiments, the internal components may be generally soldered onto the circuit board 206 to both electrically connect and mechanically fasten them to the circuit board 206.

The light board 212 may be configured to support the plurality of light sources 214 (e.g., light emitting diodes (LEDs)) in the sensor housing 202. In an embodiment, the plurality of light sources 214 may be spread out across the length of the light board 212 in a specified pattern for properly illuminating the print images printed on the print media. The plurality of light sources 214 may be configured to illuminate and project light upon each print image printed on the print media 114, as the print media 114 travels pass the window 204. Typically, the plurality of light sources 214 are LEDs fixed on the light board 212 in the specified pattern. In this example embodiment, as illustrated in FIG. 2B, there are shown 12 LEDs as the plurality of light sources 214. However, the plurality of light sources 214 may include more or fewer light sources for properly illuminating the print images printed on the print media 114 in other example embodiments.

The lens array 210 may be a group of lenses arranged in a specific pattern configured to receive reflected light from the print media 114 through the window 204. Such reflected light is measured by the CIS 208 having a plurality of sensor chips to generate the scanned image signals. In an embodiment, the lens array 210 may have one or more rows of gradient index lenses, with each lens having a continuous change of refractive index inside a cylinder. The one or more rows of gradient index (GRIN) lenses (such as a SELFOC® brand lens array) that couple the light reflected from the print image of the print media to the CIS 208. The lens array 210 provides a one-to-one correspondence between the width of an image sensing region and the width of a single sensing element of a chip in the CIS 208. In other words, each sensing element measures light reflected by a corresponding image region on the print media 114, wherein a width of each sensing element is substantially equal to a width of the corresponding measured image region. Accordingly, the CIS 208 may be configured to generate scanned image signals that correspond to a continuous image based on multiple overlapped images received from adjacent lenses of the lens array 210.

The CIS 208 may be an array of linear sensors configured to sense images printed on the print media 114 when the print media 114 is conveyed past the window 204 of the sensor housing 202. In certain embodiments, the CIS 208 may be configured to scan a test label for conducting a self-calibration method. The test label, for example, may include at least one of a test identification barcode, a white band, a black band, greyscale steps, resolution edges, and a distortion grid. In an embodiment, the CIS 208 may correspond to an image capturing component configured to generate scanned image signals corresponding to the sensed images printed on the print media 114.

In accordance with some example embodiments described herein, the ultrasonic vibrator 216 may be mounted directly on the window 204. The ultrasonic vibrator 216 may be configured to vibrate the window 204 to prevent dust or other small particles from settling on the surface of the window 204. In some embodiments, the ultrasonic vibrator 216 may be a piezoelectric element.

Figure 2D:
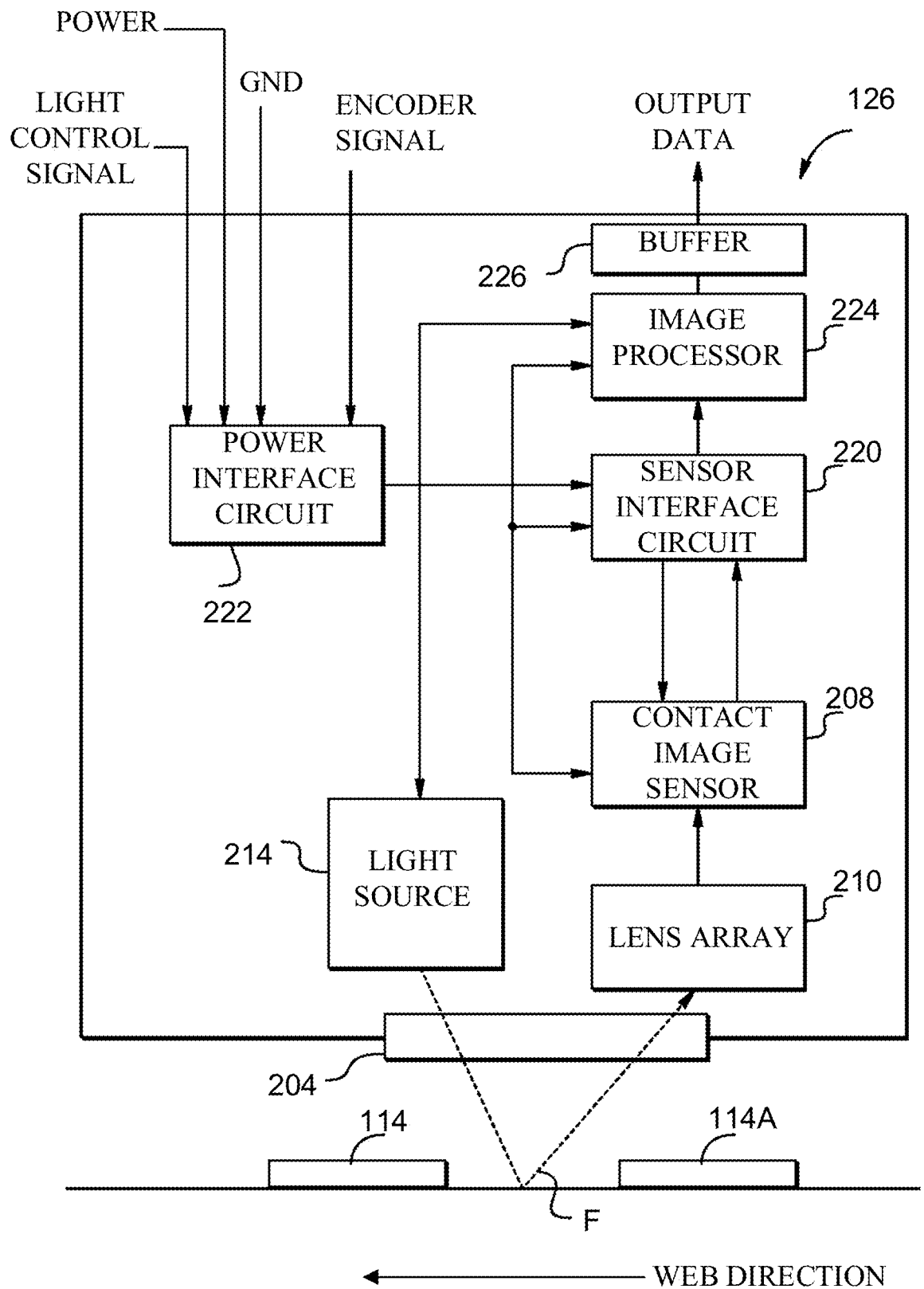

Referring to FIG. 2D, a schematic diagram of various components of the optical system (for instance, the in-line indicia verifier 126) is shown. The in-line indicia verifier 126 is illustrated to further include a sensor interface circuit 220, a power/interface circuit 222, and an image processor 224, a buffer 226, and the CIS 208. The in-line indicia verifier 126 may be configured to receive a plurality of signals including an encoder signal, power and ground signals, and a light control signal from a control logic such as, but not limited to, a processing unit of the label printer 100. The power/interface circuit 222 receives such signals, buffers the signals as necessary, and supplies appropriate signals to several other components of the in-line indicia verifier 126. The power/interface circuit 222 may include the necessary components to supply appropriate power and ground signals to the other components of the in-line indicia verifier 126.

As described in detail herein, the light sources 214 provide light through window 204 to illuminate a focal point F (i.e. on a verifier scan line) on a portion of the print media 114, such as a label. Reflected light from the print media 114 passes through window 204 to lens array 210 and is measured by the CIS 208 having the plurality of sensor chips to generate image signals. The sensor interface circuit 220 receives the image signals from the sensing elements of the plurality of sensor chips, performs analog to digital conversion of the signals, and processes the digital image signals to produce image data that is then sent to the image processor 224 and/or the control logic. The digital image data is representative of the imprinted print media 114. The CIS 208 operates at an appropriate clock rate to provide image signals at a desired longitudinal resolution, described hereinafter as a second resolution. The image processor 224 may perform calculations and operations using the image data according to desired application, such as a defect detection application, color registration application, or the like. Output data from the image processor 224 may then be transmitted to the control logic of the label printer 100.

The sensor interface circuit 220 includes an analog front end and a digital processing circuit. In the preferred embodiment, the analog front end includes an analog to digital (A/D) converter for converting the image signals from analog to digital. Further, the A/D converter includes a programmable gain amplifier, and the voltage value corresponding to an averaged output of sensing elements is converted to an eight-bit digital voltage signal.

The CIS 208 of the in-line indicia verifier 126 may be used to sense the front or rear edge of the print media 114. As the print media 114 moves forward under the in-line indicia verifier 126, the CIS 208 scans the image on the print media 114 to create a digital image. In an embodiment, as the print media 114 moves under the in-line indicia verifier 126 and gets scanned, the CIS 208 captures the grayscale of the front edge (or rear edge) of a label of the print media. The digital image may be compared with the original image for validating the print media 114 and grading the print media 114 per customer request. Thus, the in-line indicia verifier 126 serves the purpose of scanning the physical media output, such as print media 114, to generate a digital image copy that can be used for different post-processing applications, such as but not limited to, American National Standards Institute (ANSI) grading of an indicium, such as a barcode, print content validation, and optical character recognition (OCR).

Figure 3:
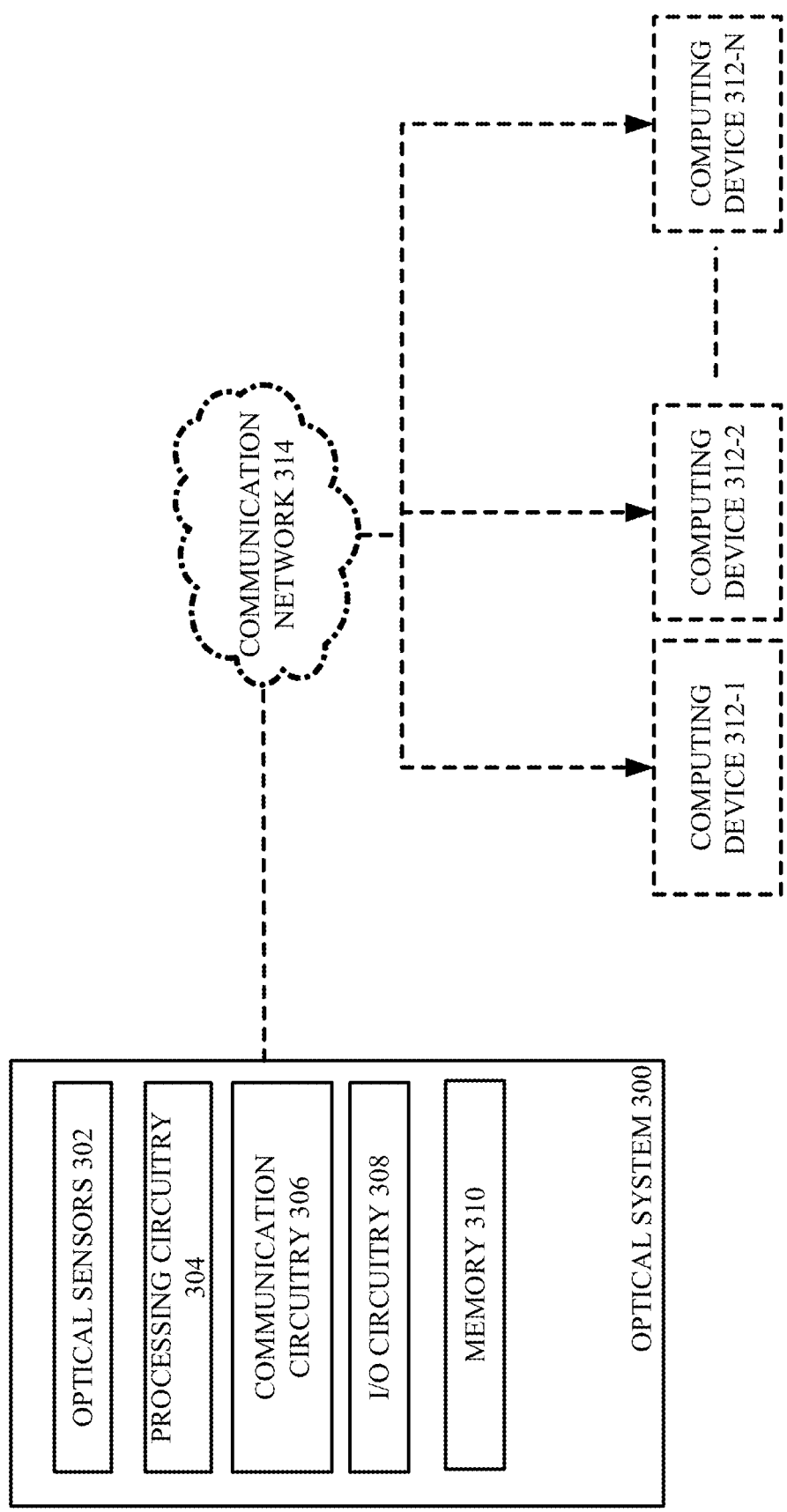
FIG. 3 illustrates various components of an optical system, in accordance with various example embodiments described herein.

FIG. 3 illustrates various components of an optical system 300, for example, the in-line indicia verifier 126, in accordance with various example embodiments described herein. In an aspect, FIG. 3 illustrates an example apparatus that may represent a basic set of components of a device embodying the optical system 300. For instance, according to some example embodiments, the optical system 300 may include optical sensors 302, a processing circuitry 304, a communication circuitry 306, an input/output (I/O) circuitry 308, and a memory 310. In an example, each of the optical sensors 302, the communication circuitry 306, the I/O circuitry 308, and the memory 310 may be communicatively coupled to the processing circuitry 304. The optical sensors 302 herein, in accordance with some example embodiments, may correspond to a CIS that is adapted to scan an image. In one example embodiment, the optical system 300 may correspond to an indicia verifier that is adapted to verify a print quality of a printed image. In this regard, in accordance with some example embodiments describe herein, the optical system 300 may be communicatively coupled to a printing system such as, but not limited to, a thermal printer, a label printer, and/or the like, and may verify an image that may include an indicia, for example, but not limited to, a barcode, a QR code, and/or the like printed by the printing system. In accordance with various example embodiments described herein, the optical system 300 may be configured to execute the operations described below in connection with FIGS. 21-37.

Illustratively, in some example embodiments, the optical system 300 may be communicatively coupled to one or more devices external to the optical system, such as the computing devices 312-1, 312-2 . . . 312-n, and/or the like, via a communication network 314.

Figure 4:
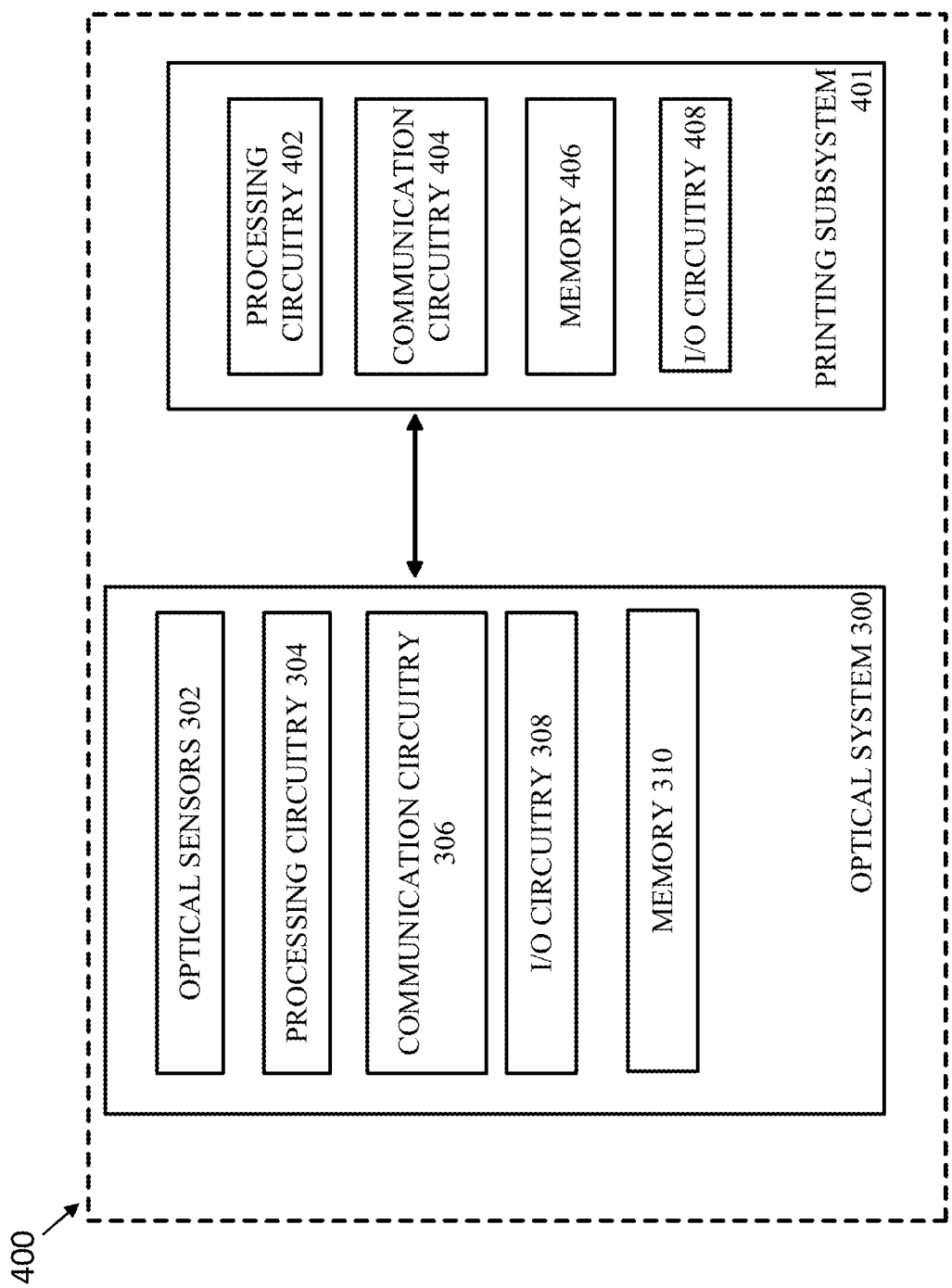
FIG. 4 illustrates various components of an optical system communicatively coupled to a printing subsystem, in accordance with another example embodiment described herein.

Referring to FIG. 4, in accordance with another example embodiment, a printing and verifying system 400 including the optical system 300 communicatively coupled to a printing subsystem 401 (for example, a printer) is described. Illustratively, the printing subsystem 401 may include a processing circuitry 402, a communication circuitry 404, a memory 406, and an I/O circuitry 408. In this aspect, each of the communication circuitry 404, the memory 406, and the I/O circuitry 408 may be communicatively coupled to the processing circuitry 402. In some example embodiments, the optical system 300 may be communicatively coupled to the printing subsystem 401 via a communication network, such as, but not limited to, the wireless communication network 314. Alternatively and/or additionally, in some example embodiments, the optical system 300 may be communicatively coupled to the printing subsystem 401 via a wired communication network. In accordance with said example embodiment, the optical system 300 may be adapted to scan an image printed on a print media by the printing subsystem 401. In this regard, the image may include at least one indicia that may be scanned by the optical system 300 for verifying a print quality of the printed image by the printing subsystem 401.

In accordance with various embodiments described herein, the processing circuitry 304 and/or the processing circuitry 402 may include a single or multiple set of processors or multi-core processors. Moreover, the processing circuitry 304 and/or the processing circuitry 402 may be implemented as an integrated processing system and/or a distributed processing system. The memory 310 and/or the memory 406 can be volatile or nonvolatile memory. The memory 310 and/or the memory 406 can also be removable (e.g., portable) memory, or non-removable (e.g., internal) memory. For example, the memory 310 and/or the memory 406 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

The processing circuitry 304 and/or the processing circuitry 402 described herein may be configured with processor executable instructions to perform operations described herein, for example to execute actions needed by the optical system 300 and/or the printing subsystem 401 respectively. In this aspect, in one embodiment, the processing circuitry 304 and/or the processing circuitry 402 may include one or more processors that may function as controllers for the optical system 300 and/or the printing subsystem 401, respectively. For example, in some example embodiments, one processor may be a primary controller while another may serve as a backup controller that may be swapped for the primary controller automatically or by maintenance personnel in the event of a failure without undue service downtime.

The processing circuitry 304 and/or the processing circuitry 402 described herein may execute various logical layers, applications, or modules including controls, scans, user interface data access, middleware routing, device communications, operating system services, and input/output drivers. The various logical layers, applications, or modules may be executed in conjunction with one another and exchange data with one another. As the processing circuitry 304 and/or the processing circuitry 402 receive inputs (e.g., commands and/or signals from the printing subsystem 401, the optical system 300, and/or other devices respectively) the various logical layers, applications, or modules may be executed individually and/or in concert by the processing circuitry 304 and/or the processing circuitry 402 to generate outputs (e.g., electrical signals to motor contacts, solenoid valves, switches, lamps, etc., data messages, or other output types).

In some example embodiments, the processing circuitry 304 and/or the processing circuitry 402 may exchange data with various other devices (for instance, scanners, sensors, actuators, diagnostic systems, controls, data store, and other devices (e.g., scales, printers, etc.)) via network connections (e.g., TCP/IP connections, Ethernet connections, Ethercat connections, PROFIBUS connections, RS 232 connections, USB connections, Wi-Fi connections, cellular connections, etc.).

Although these components 302-314 and 402-408 are described with some functional descriptors, it should be understood that the particular implementations necessarily include the use of particular hardware. It should also be understood that certain of these components 302-314 and 402-408 may include similar or common hardware. For example, the optical sensors 302 may leverage use of the processing circuitry 304, the memory 310, the communication circuitry 306, and/or I/O circuitry 308 to perform their associated functions, and duplicate hardware is not required for the distinct components of the optical system 300 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the optical system 300.

In some example embodiments, the processing circuitry 304 and/or the processing circuitry 402 described herein may be in communication with the memory 310 and/or 406 respectively, via a bus for passing information among components of the optical system 300 and the printing subsystem 401 respectively. In this aspect, the processing circuitry 304 and/or the processing circuitry 402 may be embodied in a number of different ways and may, for example, include one or more processing devices configured to perform independently. Additionally or alternatively, the processing circuitry 304 and/or the processing circuitry 402 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 304 and/or the processing circuitry 402 may be configured to execute instructions stored in the memory 310 and/or memory 406 respectively or otherwise accessible to the processor. Alternatively, or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the memory 310 and/or the memory 406 may be non-transitory and may include, for example, one or more volatile and/or non-volatile memories. In other words, for example, the memory may be an electronic storage device (e.g., a computer readable storage medium). The memory 310 and/or the memory 406 may be configured to store information, data, content, applications, instructions, or the like, for enabling the apparatus to carry out various functions in accordance with example embodiments contemplated herein.

The communication circuitry 306 and/or the communication circuitry 404 may be any means such as a device or circuitry embodied in either hardware or a combination of hardware and software that is configured to receive and/or transmit data from/to a network and/or any other device, circuitry, or module in communication with the optical system 300 and/or the printing subsystem 401, respectively. In this regard, the communication circuitry 306 and/or the communication circuitry 404 may include a network interface for enabling communications with a wired or wireless communication network. For example, the communication circuitry 306 and/or the communication circuitry 404 may include one or more network interface cards, antennae, buses, switches, routers, modems, and supporting hardware and/or software, or any other device suitable for enabling communications via a network. Additionally, or alternatively, the communication circuitry 306 and/or the communication circuitry 404 may include the circuitry for interacting with the antenna(s) to cause transmission of signals via the antenna(s) or to handle receipt of signals received via the antenna(s). These signals may be transmitted by the optical system 300 and/or the printing subsystem 401 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX), or other proximity-based communications protocols.

In some embodiments, the I/O circuitry 308 and/or the I/O circuitry 408 may, in turn, be in communication with processing circuitry 304 and/or the processing circuitry 402 respectively, to provide output to a user and, in some embodiments, to receive an indication of user input. The I/O circuitry 308 and/or the I/O circuitry 408 may comprise a user interface and may include a display that may include a web user interface, a mobile application, a client device, or the like. In some embodiments, the I/O circuitry 308 and/or the I/O circuitry 408 may also include a keypad, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 406, and/or the like).

It should be appreciated that, in some example embodiments, the processing circuitry 304 and/or the processing circuitry 402 may include a separate processor, specially configured field programmable gate array (FPGA), or application specific interface circuit (ASIC) to perform the above-described functions. In this aspect, the optical system 300 and/or the printing subsystem 401 is therefore implemented using hardware components of the apparatus configured by either hardware or software for implementing these planned functions.

In accordance with some example embodiments, an imaging circuitry of the in-line indicia verifier 126 for instance, including components, but not limited to, the light sources 214, the lens array 210, the CIS 208, and the image processor 224, may be communicatively coupled to a printer and may be disposed in a separate verifier. In this regard, in one example embodiment, the separate verifier may be attached to the printer or may be a standalone device to where the user brings the printed indicia for verification. To this extent, the verifier may comprise a verifier memory electrically connected to the imaging circuitry and a verifier processor. The verifier may further comprise an I/O circuitry and a verifier communications circuitry. Various subsystems in the verifier may be electrically connected via a coupler (e.g., wires, traces, etc.) to form an interconnection subsystem. The interconnection system may include power buses or lines, data buses, instruction buses, address buses, etc., which allow operation of the modules/subsystems and the interaction there between. In accordance with said example embodiments, the I/O circuitry of the verifier may also include a verifier graphical user interface. In some example embodiments, the verifier may be communicatively connected using the verifier communications circuitry to a computing device or the network via a wired or wireless data link. In a wireless configuration, the communication module may communicate with a host device over the network via a variety of communication protocols (e.g., WI-FI®, BLUETOOTH®), CDMA, TDMA, or GSM).

While in some example embodiments, a memory and a processor is in the verifier, it is to be understood that, in some example embodiments, only the printer or only the verifier, or both the printer and verifier communicatively coupled thereto may comprise the memory and the processor for executing the steps as hereinafter described (i.e., at least one of the verifier and the printer comprises a memory communicatively coupled to the imaging module and a processor communicatively coupled to the memory). In accordance with various embodiments of the present disclosure, the verifier that is attached to the printer may rely on the memory and the processor of printer for executing the steps as hereinafter described, while the verifier that is a standalone device has its own memory and processor for executing the steps as hereinafter described. Additionally or alternatively, the printer may rely on the memory and the processor of verifier attached to the printer for executing the steps as hereinafter described. Therefore, the processor in at least one of the printer and the verifier (or in the printer-verifier) is configured by the print quality verification program to execute the steps as hereinafter described to control the print quality of the printed barcode.

Various embodiments of the present disclosure will be described in relation to a thermal transfer printer. However, the present disclosure may be equally applicable to other types and styles of printers (inclusive of printer-verifiers) (e.g., a thermal direct printer, a laser toner printer, an ink drop printer, etc.). As used herein, the term "printer" refers to a device that prints barcodes, OCR-characters, text, illustrations, etc. onto print media (e.g., labels, tickets, plain paper, synthetic paper, receipt paper, plastic transparencies, and the like). Unless otherwise indicated, the term "printer" includes printer and printer-verifier. The print media may be continuous or non-continuous.

Figure 5:
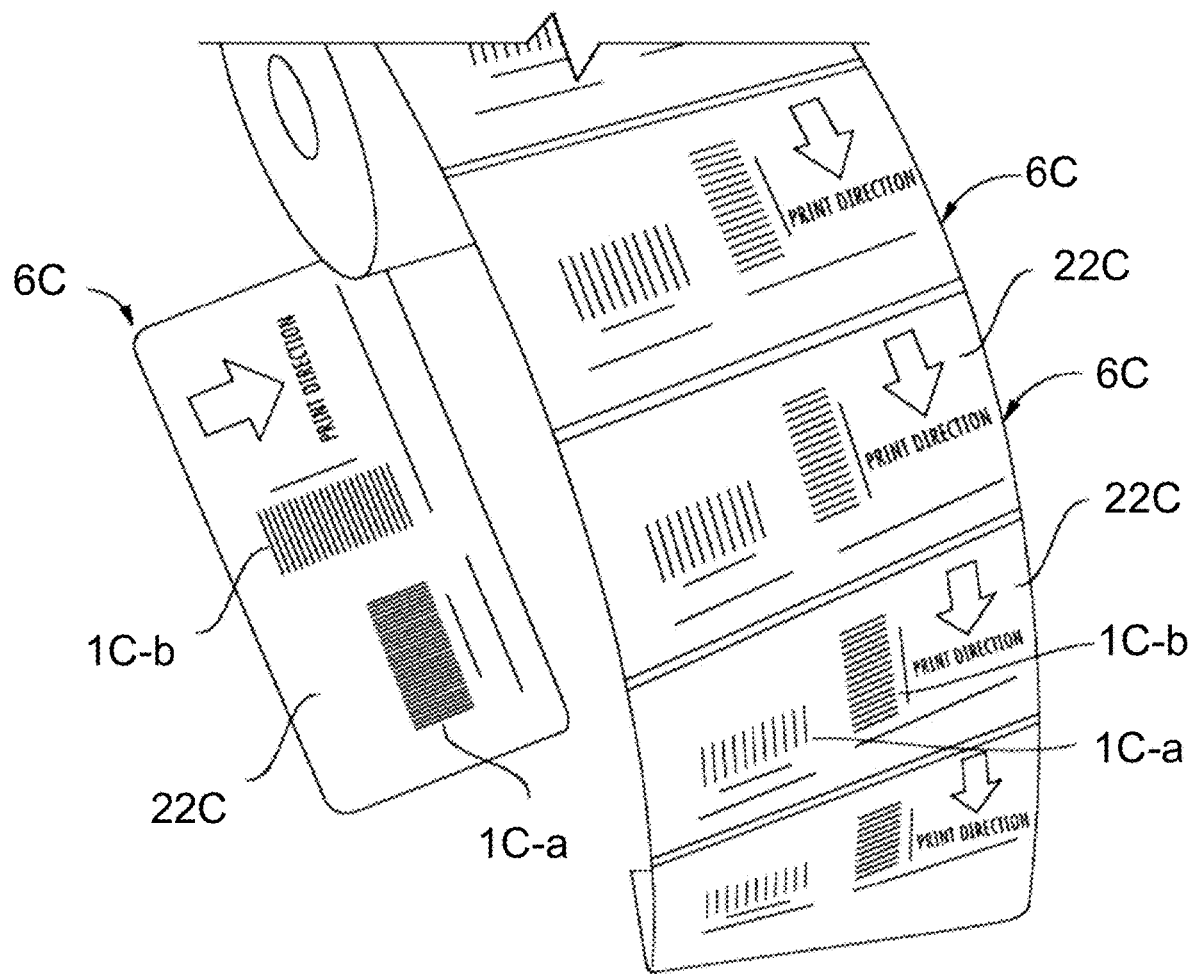
FIG. 5 depicts a plurality of exemplary printed indicia, for example, barcodes, on individual labels of a print media, in accordance with some example embodiments described herein.
Figure 6:
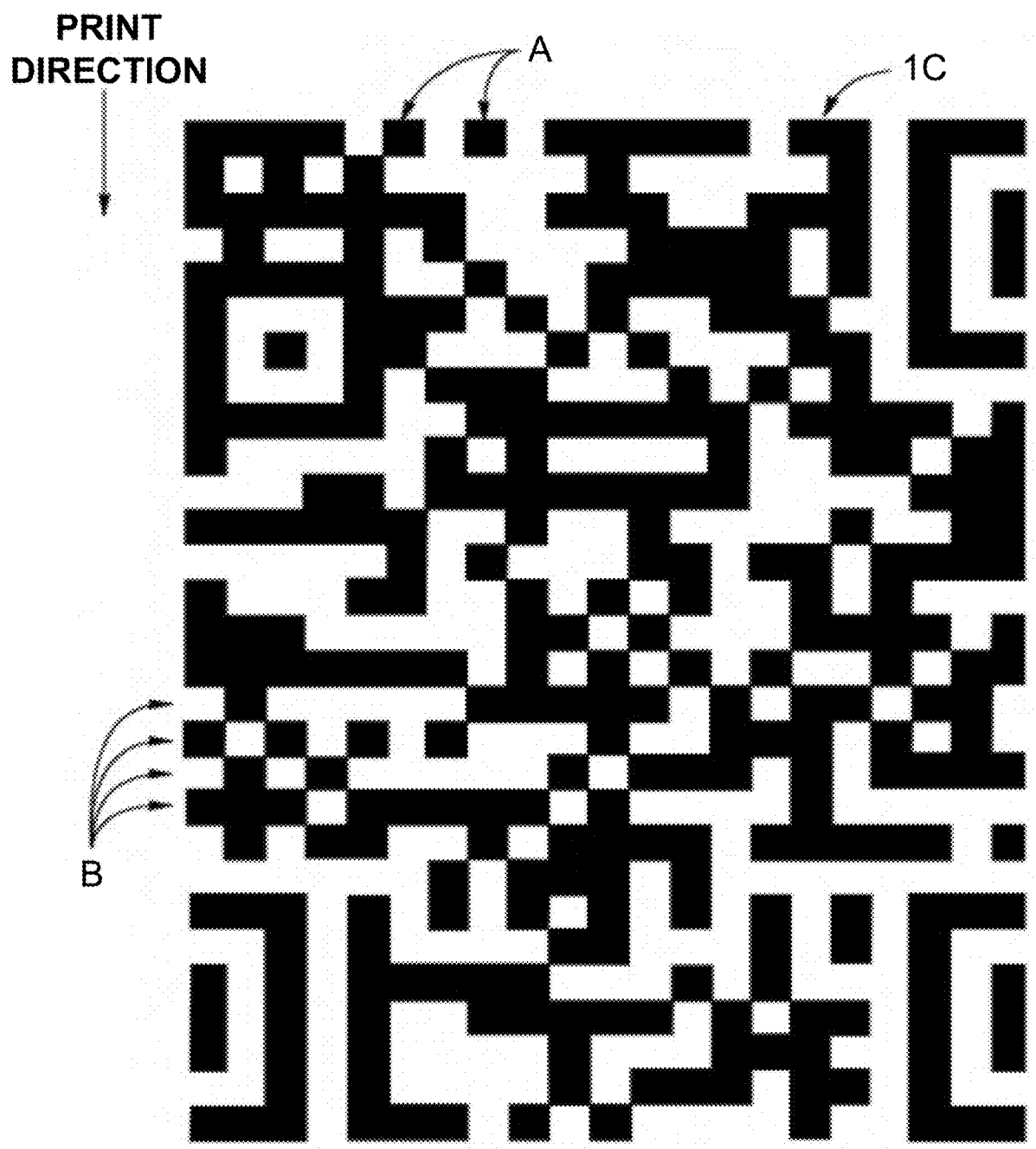
FIG. 6 depicts an exemplary printed barcode (a portion of a QR Code) comprising a two-dimensional barcode, in accordance with some example embodiments described herein.

FIG. 5 depicts a plurality of exemplary printed indicia (for example, barcodes) on individual labels 22C of a print media 6C, in accordance with some example embodiments described herein. FIG. 6 depicts an exemplary printed barcode (a portion of a QR Code) comprising a two-dimensional barcode, in accordance with some example embodiments described herein.

As used herein, the terms "barcode" and "OCR-B character" refer to an optical representation of data (e.g., data is encoded into the barcode and OCR-B character) that may be scanned (i.e., machine read) by a machine-reader. In various exemplary embodiments, there are many types of barcodes and OCR-B characters for many applications. Barcodes may be one-dimensional barcodes (e.g., Universal Product Code, U.P.C.) having dark lines (i.e., bars) and light lines (i.e., spaces) of various widths arranged along a scan axis (see, e.g., FIG. 5). Barcodes may be two-dimensional matrix symbols (e.g., Aztec Code, Data Matrix, QR Code (e.g., FIG. 6), PDF417, etc., herein a "two-dimensional barcode") having a two-dimensional array of light features, dark features, and (in some cases) alignment features. The light and dark features may include "modules," i.e., the printed (or unprinted) squares in a two-dimensional matrix symbol. An exemplary two-dimensional barcode (e.g., QR Code) is partially depicted in FIG. 6. The graphical look of a two-dimensional barcode is created by different patterns of geometric shapes. Some barcodes may use color (e.g., Ultracode) to encode data. OCR-B characters also encode data and include "modules" (i.e., printed or unprinted squares).

Barcodes and OCR-B characters are printed on print media. Once printed on a print medium, the barcode is referred to herein as a "printed barcode." The OCR-B character is referred to herein as a "printed OCR-B character" once printed on a print medium. The print medium on which the machine-readable indicium is printed is referred to herein as a "printed medium." The printed medium may be affixed to an item. For example, the encoded data relates to the item(s) on which the printed medium is affixed. The terms "barcode" and "symbol" may be used interchangeably herein.

In accordance with some example embodiments described herein, a quality of the printed barcode depends on the orientation of the printed barcode on the print medium (e.g., the label orientation) and how the printed barcode comes out of the printer. For instance, when the bars of a one-dimensional linear barcode are parallel to the movement of the print media stock through the printer, this is referred to as printing the barcode as a picket fence. A printed barcode formatted in the picket fence orientation is identified in FIG. 5 as printed barcode 1C-a. Printed barcode 1C-a comprises a first one-dimensional barcode. Conversely, when the bars of the one-dimensional (linear) barcode are perpendicular to the direction of the print media stock through the printer, this is referred to as printing the barcode as a "ladder." If positioned vertically, the printed barcode resembles a ladder. A printed barcode formatted in the ladder orientation is identified in FIG. 5 as printed barcode 1C-b. Printed barcode 1C-b comprises a second one-dimensional barcode. As shown in FIG. 5, the first one-dimensional barcode 1C-a and the second one-dimensional barcode 1C-b are printed on the same print medium. For purposes of discussing a modulation problem in both directions or orientations as hereinafter described, "a printed barcode" may comprise the first one-dimensional barcode 1C-a and the second one-dimensional barcode 1C-b printed on the same print medium.

When referring to a two-dimensional barcode 1C (e.g., the QR Code depicted in FIG. 6) that incorporates both vertical and horizontal dimensions, the picket fence orientation refers to the print direction in which the modules are arranged perpendicular to the movement of the print media and the ladder orientation refers to the print direction in which the modules are arranged parallel to the movement of the print media. The features of the printed barcode in FIG. 6 in the picket face orientation are identified the letter "A" and the features in the ladder orientation are identified with the letter "B".

Figure 7:
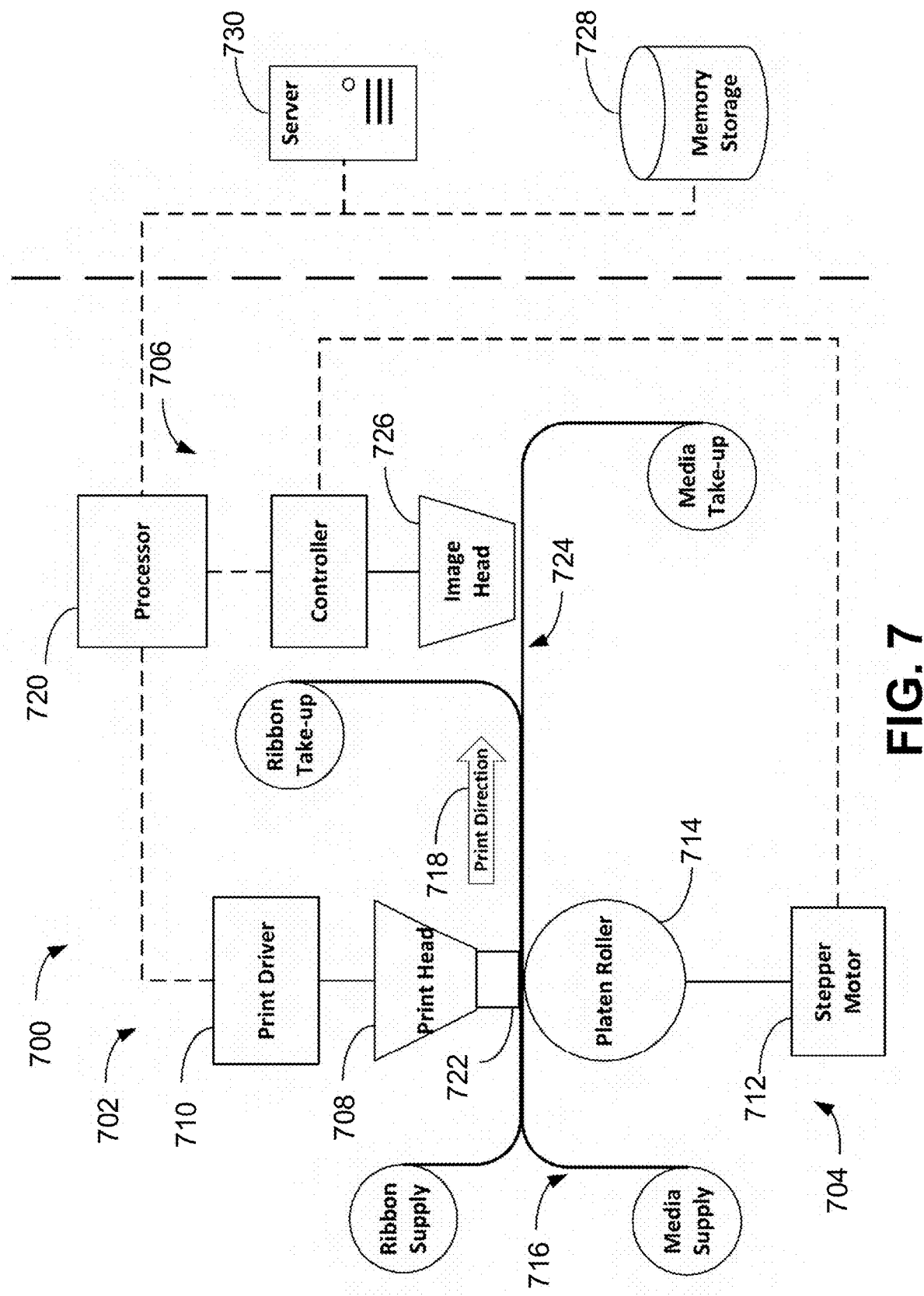
FIG. 7 schematically depicts an exemplary printer comprising the optical system and operations of the printer, in accordance with some example embodiments described herein.

FIG. 7 schematically depicts an exemplary printer comprising an optical system such as, but not limited to, the in-line indicia verifier 126, and operations of the printer in accordance with some example embodiments described herein. Illustratively, FIG. 7 schematically depicts an exemplary printer 700, which as shown may be a thermal transfer printer. Alternatively, any other printer or marking devices may be utilized in accordance with the present disclosure. As shown in FIG. 7, a printer 700 is provided which includes a printing assembly 702, a media transport assembly 704, and an imaging assembly 706. The printing assembly 702 includes a printhead 708 and a print driver 710. The media transport assembly 704 includes a stepper motor 712 and a platen roller 714. The stepper motor 712 advances the platen roller 714 in discrete increments, which, in turn, advances a printing media 716 between the platen roller 714 and the printhead 708 in a printing direction shown by an arrow 718. The speed of the media 716 may be tracked with a processor 720 associated with a counter, which maintains a count of the steps taken by the stepper motor 712.

In accordance with various example embodiments described herein, the printhead 708 is activated by the print driver 710. The print driver 710 is driven by print commands which are generated by print logic. The print commands comprise print data in combination with a system clock signal or strobe signal under control of the processor 720, intended to provide proper timing and spacing of successive sequential parts of the indicia to be printed or marked on the media by the printhead 708. The indicia, in accordance with various embodiments, may correspond to one of a barcode or other types of printed text or images. The printhead 708 have an array of print elements 722, and are operable for printing or marking a plurality of sequential parts of indicia onto a corresponding plurality of sequential segments of the media 716, producing printed media 724. The print driver 710 uses the print commands generated by the print logic to provide energizing signals to the array of print elements 722 of the printhead 708. The energizing signals activate the print elements 722, which, when activated, are effective to place a mark on the respective sequential segment of the media 716.

Further, the printed media 724 advances past the imaging assembly 706, which comprises an image head (or scanner) 726. Herein, the image head 726 or the scanner, in accordance with some example embodiments described herein may correspond to the CIS, the optical system, the in-line indicia verifier 126, and/or the like. The image head 726 is configured to capture information about the printed media or sequential parts thereof produced by the printing assembly 702. The image head 726 optically images, digitizes, or samples at least a portion of an indicia printed by the printhead 708. In an exemplary embodiment, the imaging assembly 706 takes advantage of the motion of the printed media 724 past the image head 726 to successively capture each portion of printed media, as the printed media advances past the image head. The image head 726 contains an array of photosensitive elements, such as in a charged coupled device ("CCD") having, for example, linear active surface pixel elements. Alternatively, in other embodiments, the image head 726 may contain other image sensors, such as 1D/2D array complementary metal-oxide-semiconductor (CMOS), CIS, or other such image sensors. In the case of a CCD, several imaging samples may be taken as the printed media 724 advances past the image head 726. Several imaging samples of an indicia may be aggregated to provide a digital representation or digital image of one or more portions of the printed indicia. The digital image and/or imaging samples may be stored in memory storage 728 for further processing or analysis in accordance with the present disclosure. Such further processing may be handled by a server 730, such as in an enterprise network environment. Other image heads may also be used, including vidicons, two-dimensional semiconductor arrays, and two-dimensional image sensor arrays. Operation of such a CCD image head is described in further detail in U.S. Pat. No. 6,042,279, the entirety of which is hereby incorporated by reference into the present disclosure.

In accordance with said example embodiments, a transport rate of the media 716 is intended to be synchronous with the activation of the printhead 708, such that print commands instructing the printhead 708 to print the successive sequential parts of the indicia correspond to the stepping of the stepper motor 712 and rotation of the platen roller 714. When synchronous, the printing media is transported past the printhead at a transport rate such that the plurality of sequential parts of the indicia are printed on the corresponding sequential segments of the media. When the transport rate of a media during printing is faster than intended, the printed image will be longer than instructed by the print command, which is sometimes referred to as image stretch. Conversely, when the transport rate of a media during printing is slower than intended, the printed image will be shorter than instructed by the print command, which is sometimes referred to as image compression.

Figure 8:
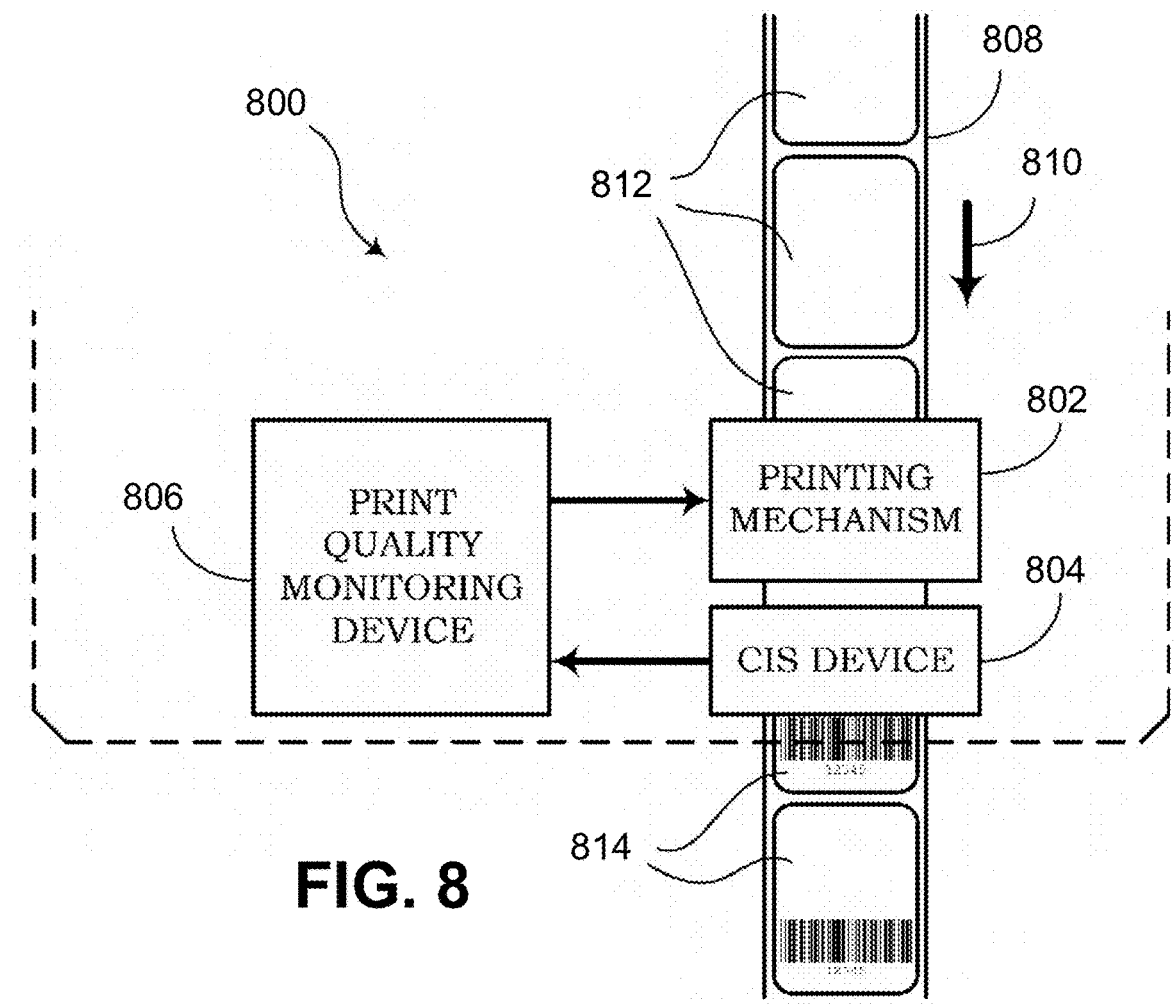
FIG. 8 schematically illustrates a block diagram of a printing and verifying device including the optical system for verifying a printed media, in accordance with some example embodiments described herein.

FIG. 8 is a block diagram illustrating an example embodiment of a printing and verifying device 800 including the optical system for verifying a printed media. The printing and verifying device 800 includes, among other things, a printing mechanism 802, a CIS device 804, and a print quality monitoring device 806. In an exemplary embodiment, these elements are disposed inside a housing of a label printer (e.g., label printer 100). In other exemplary embodiments, the CIS device 804 may be incorporated into a housing or positioned at an output port of the label printer.

The printing and verifying device 800 is configured such that the printing mechanism 802 and CIS device 804 (or a camera in general) are positioned adjacent to or near each other. In this way, the sensing of the print quality can take place immediately after the printing mechanism 802 prints onto the labels. The CIS device 804 (or the camera) senses images of the labels and forwards sensor signals to the print quality monitoring device 806, which acts as a control device. The print quality monitoring device 806 processes the sensor signals to determine print quality and provides feedback to the printing mechanism 802.

In operation, print media 808 is fed through the label printer in the direction of arrow 810, as shown in FIG. 8. The print media 808 may include blank labels 812 onto which the printing mechanism 802 prints images to produce printed labels 814 that are fed through an output port of the label printer.

Figure 9:
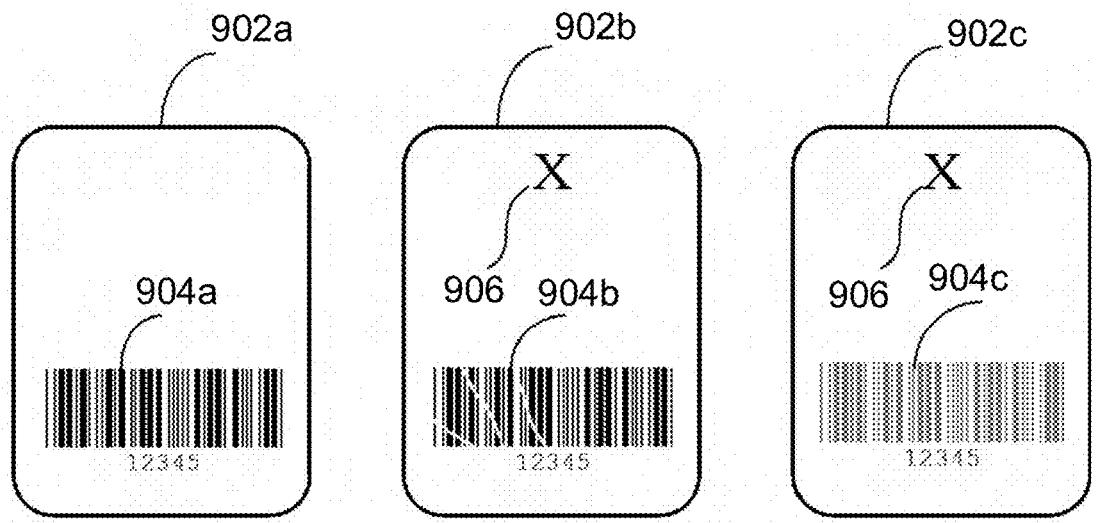
FIG. 9 illustrates examples of labels having properly and improperly printed barcodes that are verified by the optical system, in accordance with some example embodiments described herein.

FIG. 9 illustrates examples of labels having properly and improperly printed barcodes that are verified by the optical system, for instance, the in-line indicia verifier 126, in accordance with some example embodiments described herein. Illustratively, a first label 902a includes barcode 904a, which has been properly printed and has been verified by the print quality monitoring device 806 as being valid for use. However, a second label 902b includes a defective barcode 904b, which, in this case, includes discontinuous barcode lines caused by any number of possible situations. With the present disclosure, the CIS device 804 and print quality monitoring device 806 can detect the defective barcode 904b even while a portion of the defective barcode 904b is still being printed. When the defect is detected, the print quality monitoring device 806 can instruct the printing mechanism 802 to print an error mark 906, such as an "X", onto the top of the label 902b while the print media 808 is still being fed through the label printer. Similarly, a third label 902c is also detected as having a defective barcode 904c. In this case, the barcode 904c is faded to a level that does not meet quality standards for barcodes. When the print quality monitoring device 806 detects this defect, the printing mechanism 802 is again alerted to the issue and prints an error mark 906 onto the defective label 902c. The error mark 906 can be used to indicate to a user that the labels are not to be used.

In some example cases, the print quality monitoring device 806 may determine that an error occurs. Not only can the print quality monitoring device 806 instruct the printing mechanism 802 to print the error marks (e.g., mark 906 shown in FIG. 9) when necessary, the print quality monitoring device 806 may also instruct the printing mechanism 802 to stop printing. In addition, stopping the printing process can also include instructing a feeding mechanism to stop feeding the print media 808 through the label printer. Furthermore, in response to detecting an error, the print quality monitoring device 806 may further provide instructions to a user regarding how the issues may be fixed.

Figure 10:
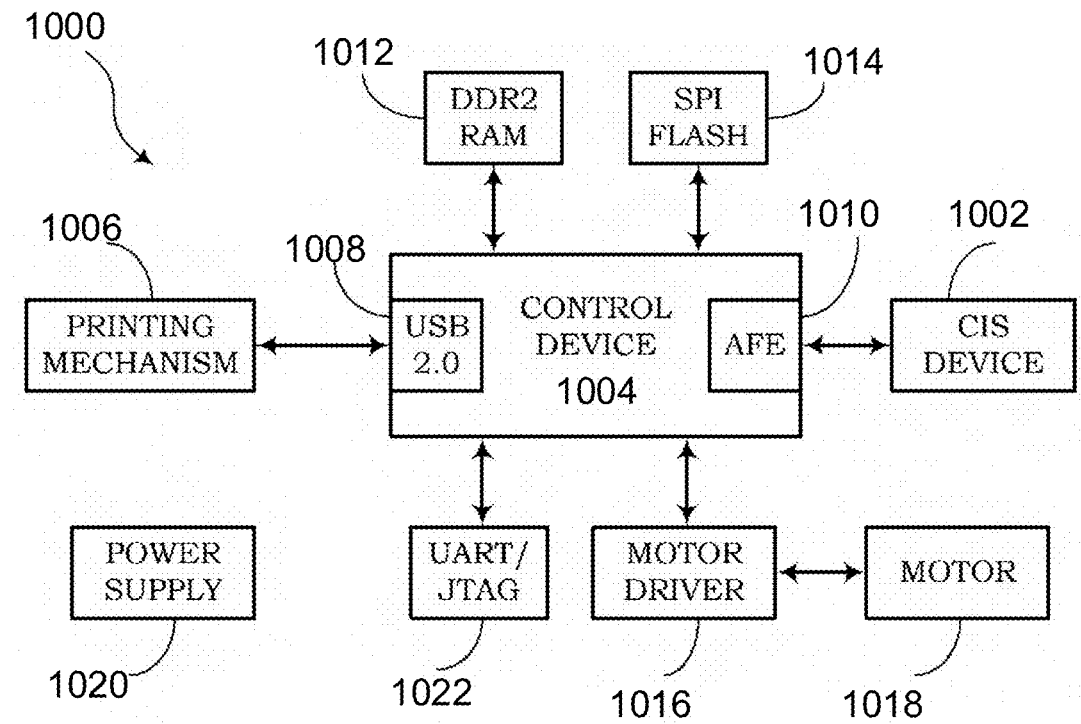
FIG. 10 is a block diagram showing another example embodiment of a printing and verifying device comprising a contact image sensing device, in accordance with some example embodiments.

FIG. 10 is a block diagram showing another example embodiment of a printing and verifying device 1000 comprising a CIS device 1002, for example, the optical system, in accordance with some example embodiments. The printing and verifying device 1000 of FIG. 10 includes a control device 1004, a printing mechanism 1006, and the CIS device 1002. In accordance with said example embodiment, the control device 1004 includes a USB 2.0 interface 1008 for enabling communication with the printing mechanism 1006 and an analog front end (AFE) interface 1010 for enabling communication with the CIS device 1002. The control device 1004 may also be connected to a memory, such as DDR2 RAM 1012 and SPI flash 1014. The control device 1004 is also connected to a universal asynchronous receiver/transmitter (UART) joint test action group (JTAG) interface 1022 and a motor driver 1016. The motor driver 1016 is configured to drive a motor 1018 that is used to feed the print media through the label printer. A power supply 1020 supplies power to the control device 1004, printing mechanism 1006, the CIS device 1002, the motor driver 1016, and other components of the printing and verifying device 1000.

Referring to FIGS. 8 and 10, in accordance with said example embodiment, the print quality monitoring device 806 and the control device 1004 are configured to adjust printer settings of the printing mechanism 802, 1006 to optimize a print quality of the printing mechanism 802, 1006. The print quality monitoring device 806 and the control device 1004 are configured to allow the printing mechanism 802, 1006 to continue printing if the adjustments of the printer settings are sufficient to maintain an acceptable print quality. When the print quality monitoring device 806 or the control device 1004 determines that issues regarding the print quality are not correctible, the print quality monitoring device 806 or the control device 1004 is configured to discontinue the operations of the printing device, and is further configured to instruct a user via the user output component or other output device on how to correct the issues manually.

Referring to FIG. 8, the printing and verifying device 800 is configured to monitor ribbon wrinkle, stained print media, damaged print media, defective print media, printing lapses, and barcode width variations. Upon determining that a printed label is damaged or contaminated or upon receiving an input from a user to obtain a copy of the printed label, the printing and verifying device 800 may be configured to scan and restore the printed label. Also, the printing and verifying device 800 may instruct the printing mechanism 1006 to print the scanned and restored label.

This scanning and restoring feature allows the user to quickly reproduce labels and even restore damaged labels, contaminated labels, or other low quality labels. This feature can be comparable to a photocopier with repair functionality to restore the quality of the labels. Because reproducing barcodes results in a similar or lower print quality, it is usually not recommended to photocopy barcode labels. However, the present disclosure is capable of restoring quality to guarantee an acceptable print quality.

Figure 11:
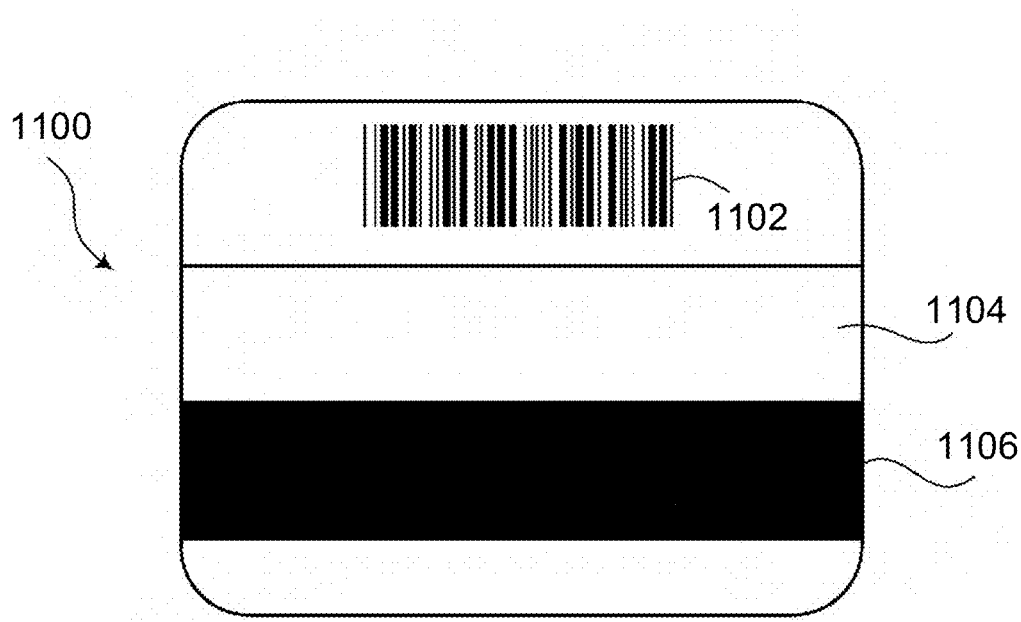
FIG. 11 illustrates a test label that may be used for self-calibration of the optical system, in accordance with some example embodiments described herein.

In accordance with some example embodiments described herein, the optical system, for example, the in-line indicia verifier 126, may be adapted to perform self-calibration. In this aspect, in one example embodiment, the self-calibration of the optical system may be performed by using a test label. FIG. 11 illustrates an embodiment of a test label 1100 that may be used for self-calibration. The test label 1100 can be inserted into a path of the print media so that it passes by the printing and verifying device 1000 including the CIS device 1002 or other device for detecting the quality of a printed label. The test label 1100, according to the embodiment of FIG. 11, includes an identification barcode 1102, a white band 1104, and a black band 1106. The identification barcode 1102 can be read by a sensor, for instance one or more optical sensors of the optical system or the CIS device 1002, to determine that the test label 1100 is for test purposes to self-calibrate the sensor. The self-calibration process can be automatically activated as a result of reading the identification barcode 1102.

The features of the identification barcode 1102, such as length, width, and edge quality, also serve as geometric and graphical references for the CIS device 1002 for calculating print quality and defects. The white band 1104 may be used to detect a visible accumulation of absorptive (i.e., dark) dust and the black band 1106 may be used to detect a visible accumulation of reflective (i.e., bright) dust. The white band 1104 and the black band 1106 also serve as references for printing reflectance levels for the verifier when calculating contrast. In some embodiments, a test label may be used that also includes greyscale steps, resolution edges, and a distortion grid.

In accordance with some example embodiments described herein, the printing and verifying device 1000 is configured to scan the test label 1100 for conducting the self-calibration process. The test label 1100 may include the test identification barcode 1102, at least one white band 1104, and at least one black band 1106.

Figure 12:
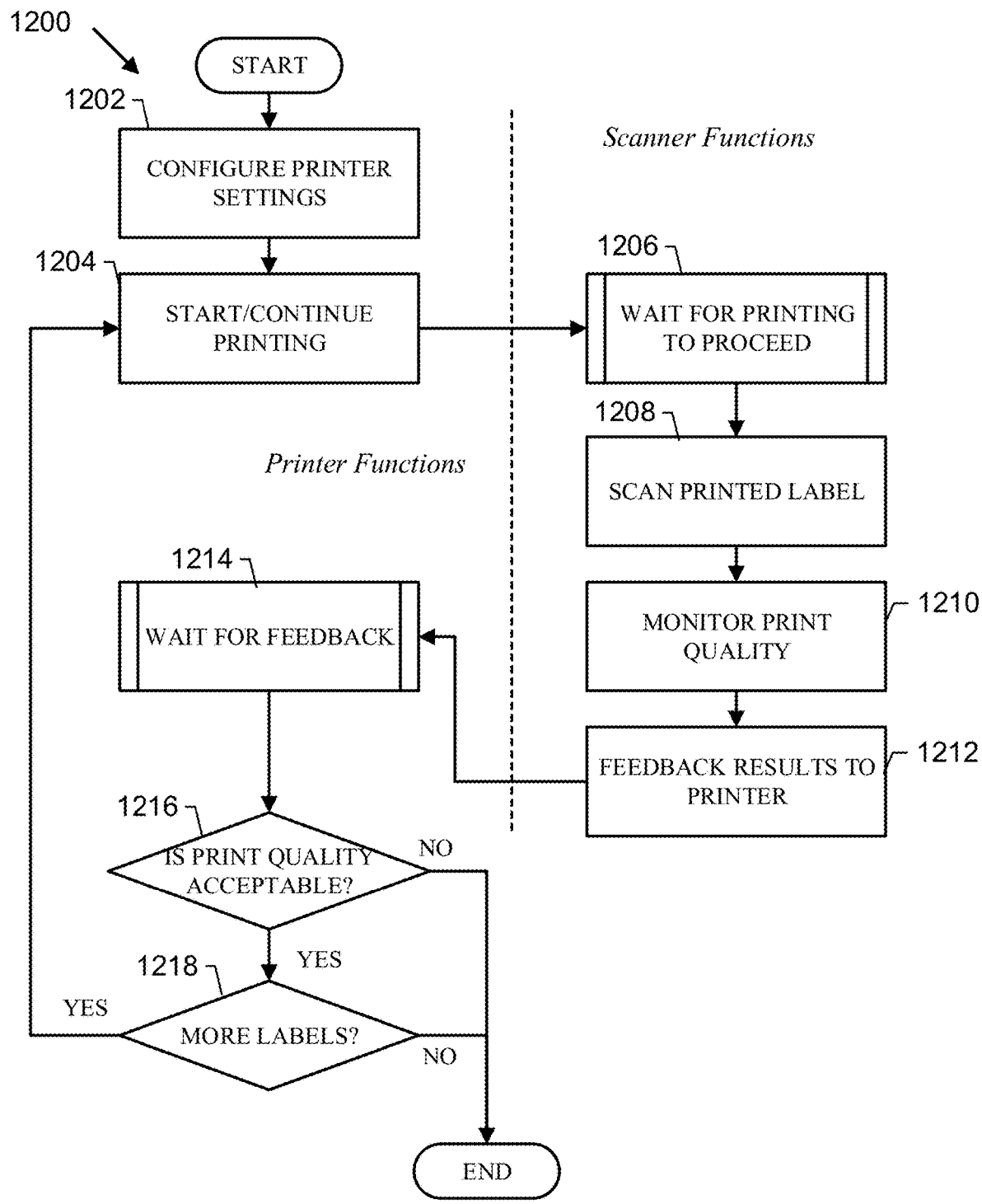
FIG. 12 is a flow diagram illustrating a method for printing and verifying labels by the optical system, in accordance with various example embodiments described herein.

FIG. 12 is a flow diagram illustrating a method 1200 for printing and verifying labels by the optical system, in accordance with various example embodiments described herein. Illustratively, a left side of the flow diagram includes steps that may be executed by a printer and a right side of the flow diagram includes steps that may be executed by the optical system, for example, the printing and verifying system 124, or the CIS device 804, 1002, and/or the like, referred as scanner hereinafter for the description of FIG. 12.

The method 1200 includes steps of configuring printer settings of the printer, as indicated in block 1202. After the print settings are configured, the printer can start printing (block 1204). The scanner waits for the printing process to start, as indicated in block 1206. When printing has commenced, the method 1200 includes scanning the printed label according to block 1208. Then, the method 1200 includes the step of monitoring the print quality of the scanned label (block 1210). As indicated in block 1212, the scanner then feeds the results of monitoring the print quality back to the printer.

In some cases, the printer may need to wait for the feedback (block 1214) before continuing the printing process. However, if the scanning and monitoring steps are executed quickly, the printer may receive the results from the scanner during the printing process, such that no delay is experienced. Nevertheless, once the printer receives the feedback, it is determined in decision block 1216 whether the print quality is acceptable. If it is determined that the print quality is inadequate to continue printing, the printing process ends. In some embodiments, information may be provided to the user (e.g., via user output components) as to why the printing process is stopped.

According to some alternative methods, the method 1200 may include additional steps to determine if unacceptable print quality determined in block 1216 is correctible. If so, adjustments to the printer settings can be made without stopping the printing process.

If it is determined in block 1216 that the print quality is acceptable or correctable, the method 1200 proceeds to decision block 1218, which determines if more labels are to be printed. If not, the method 1200 ends. Otherwise, for more labels, the method 1200 returns to block 1204 and the printing continues for the next label. The processes of method 1200 may repeat these steps for each label.

Therefore, according to one embodiment of the present disclosure, a method associated with a printer for verifying print quality may be provided. The method may include the step of utilizing a printer mechanism to print images onto the print media (block 1204). Also, the method may include optically monitoring (block 1210), inside the printer, a print quality of the images printed onto the print media and then adjusting printer settings of the printer mechanism based on the monitored print quality. The method may also include automatically maintaining the cleanliness of components inside the printer that are configured to monitor the print quality.

Furthermore, the method may include an additional step of instructing the printer mechanism to print marks on defective print media when the monitored print quality is below an acceptable standard. The method may also include positioning a printing verification device near a printer mechanism to allow the printing verification device to monitor the print quality with minimal delay after the images are printed on the print media.

III. Example Methods for Implementing Embodiments of the Present Invention

Embodiments of the present invention may be implemented as various computer-implemented methods, details of which are described hereinafter.

A. Determining Characteristics of an Optical System

Figure 13:
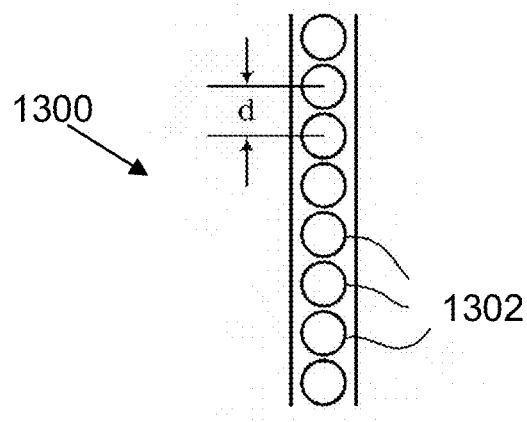
FIG. 13 schematically depicts a diagram of a lens array of the optical system, in accordance with some example embodiments described herein.

FIG. 13 is a view of an example CIS 1300 comprising plurality of optical sensors, for instance, sensor pick-up units 1302. The sensor pick-up units 1302 may be part of an array of optical units having a light source and photocell such as exists in a typical CIS. The dimension d represents a center spacing from one sensor pick-up unit 1302 to an adjacent unit 1302. Therefore, the dimension d may be used to determine the number of units per inch. An array of sensor pick-up units 1302 having a small dimension d will produce a finer resolution image. The number of units 1302 per inch may be used to determine a theoretical resolution, for instance, a resolution measured in dots per inch (dpi) like, but not limited to 600 dpi, 800 dpi, 1200 dpi, and/or the like. However, a more accurate representation of the optical system is the "effective aperture size," as defined herein.

Figure 14:
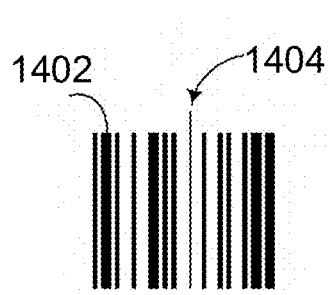
FIG. 14 schematically depicts a test pattern, in accordance with some example embodiments described herein.

FIG. 14 is a diagram showing an embodiment of a test pattern 1402. It should be understood that the test pattern 1402 may include any combination of bars and spaces. As illustrated, the test pattern 1402 includes narrow bars and wide bars separated from each other by narrow spaces and wide spaces. According to alternative embodiments, the test pattern 1402 may include bars all having the same width and/or spaces all having the same width. In other embodiments, the test pattern 1402 may have bars having two or more different widths and/or may be separated by spaces having two or more widths. The test pattern 1402 may contain a test element (i.e., a bar or a space) that is smaller than the other elements.

The test pattern 1402 may be reproduced on a test card or other media to allow a verifier to be tested. Also, the test pattern 1402 can be used by known optical systems for establishing a reference graph that can be used for characterizing the optical system of the verifier to be tested. The processes for establishing a reference graph are described in more detail below.

The test pattern 1402 may correspond to a readable barcode. Otherwise, the test pattern 1402 may include any combination of bars and spaces simply for the purpose of testing. Thus, the test pattern 1402 does not necessarily meet any particular format structure for barcodes or include the prerequisite number or position of encoded characters, proper widths of bars and spaces, or other characteristics of a barcode that might conform to predefined barcode standards. In other embodiments, the test pattern may be a two-dimensional (2D) barcode (e.g., PDF417, Data Matrix, Quick Response code (QR code), etc.).

In particular, the test pattern 1402 includes a test element 1404, such as a bar that is narrower than the narrow bars of the test pattern 1402. In other embodiments, the test element 1404 may be a space that is narrower than the narrow spaces of the test pattern 1402. Accordingly, the test element 1404 may be a narrow bar or space that is narrower than the aperture size (e.g., diameter d) of a lens array of the CIS 1300. In some embodiments, the test pattern 1402 may include two or more test elements having similarities to the test element 1404.

The test element 1404 shown in FIG. 14 may be referred to as a "defect" according to barcode verification standards and may cause substantially reduced contrast as a function of the aperture size. By using the contrast of known metrology apertures with respect to the test element 1404 and comparing the contrast produced by the CIS 1300, a highly accurate effective aperture size can be determined. The same methods can also be used to determine non-conformance of verification products that may advertise actual sizes but are unable to provide results close to the effective aperture sizes.

According to some embodiments, multiple different test patterns may be created for testing the optical systems. The different test patterns may have different patterns of bars and spaces and may have different widths of the test elements. Additionally, if multiple test patterns are utilized for characterizing an optical system, each test pattern may include a readable identification code. Thus, when a reflectance value is calculated from a particular test pattern, a corresponding reference graph can be identified with respect to the identified test pattern for determining aperture size.

Figure 15:
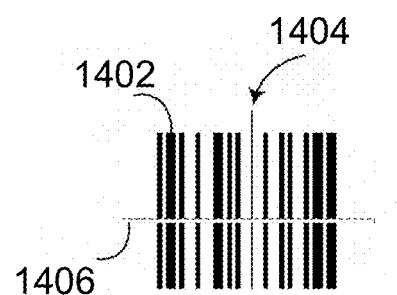
FIG. 15 schematically depicts an aperture size with respect to the test pattern of FIG. 14, in accordance with some example embodiments described herein.

FIG. 15 illustrates the test pattern 1402 of FIG. 14 and further illustrates the width of a scan beam or aperture size 1406 (i.e., diameter d) used for reading the test pattern 1402. In various exemplary embodiments, the aperture size 1406 may correspond approximately to the width of the narrow bars and narrow spaces of the test pattern 1402. Also, the width of the test element 1404 may be narrower than the aperture size 1406.

According to the teachings of the present disclosure, optical systems having different aperture sizes can be used to scan the test pattern 1402. The wider the dimension of the aperture, the less the optical system will be able to resolve the test element 1404 from the rest of the test pattern 1402.

As suggested above, the test pattern 1402 can be used to establish a reference to which characteristics of an optical system to be tested can be compared. For example, the test pattern 1402 can be scanned by known metrology devices having apertures with known optical dimensions. A barcode metrology device is referred to as a scanning microdensitometer, which can be used to measure known defect cards that are used to calibrate verifiers. A verifier can be tested to determine if the verifier roughly displays characteristics of a verifier having the same aperture size.

However, instead of calibrating verifiers using test cards, implementations of the present disclosure include scanning the test pattern 1402 to obtain information from a reference metrology device. This information can then be used create a reference graph. Then, from the reference graph, an optical system, for instance, the in-line indicia verifier 126, can be characterized to determine effective aperture size.

Figure 16:
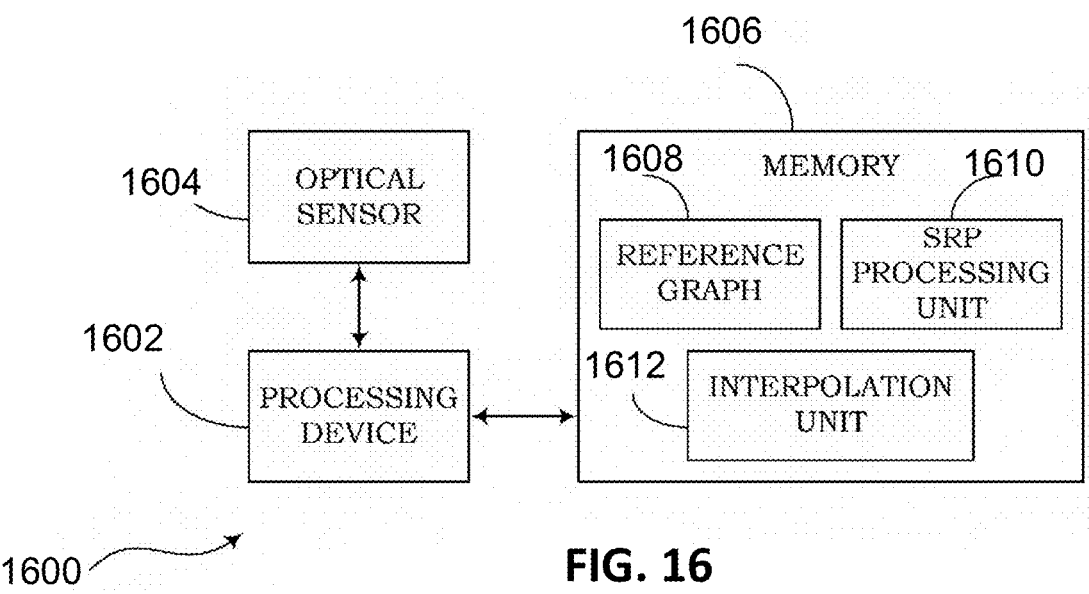
FIG. 16 schematically depicts a block diagram of a barcode verifier, in accordance with some example embodiments described herein.

FIG. 16 is a block diagram illustrating an example embodiment of a barcode verifier 1600 that is capable of characterizing its own optical system to certify conformance to an aperture dimension. As illustrated, the barcode verifier 1600 comprises a processing device 1602, an optical sensor 1604, and memory 1606. The memory 1606 may be configured to store software and/or firmware components for enabling the barcode verifier 1600 to not only verify a barcode but also to characterize an optical system to be tested. More particularly, the characterization of the optical system may refer to the process of determining an effective dimension (e.g., aperture diameter) of the optical sensor 1604.

The memory 1606 may include, for example, a reference chart 1608, a scan reflectance profile (SRP) processing unit 1610, and an interpolation unit 1612. The reference chart 1608 is a graph that is created when the test pattern 1402 is used with known reference metrology devices. The reference chart 1608 may be used with other barcode verifiers that also utilize the test pattern for characterizing an optical system.

The reference chart 1608 can be used for determining an effective aperture size of an unknown optical system. To create the reference chart 1608, reflectance values derived from an SRP of the test pattern 1402 can be calculated for a number of known optical systems having different known aperture sizes. The reflectance values and known aperture sizes can represent point coordinates in the reference chart 1608. When multiple known optical systems are utilized to obtain multiple points, a line or curve can be created to show an approximate correlation between reflectance values and aperture sizes.

Once the reference chart 1608 is originally established, an unknown optical system, such as the barcode verifier 1600 of FIG. 16, can be utilized to scan the same test pattern used for creating the reference chart 1608, such as the test pattern of FIG. 14. The reference chart 1608 can then be used to determine effective aperture size.

In operation, the optical sensor 1604 optically senses a test pattern, such as the test pattern 1402 of FIG. 14 or other suitable patterns having distinguishable test elements, such as test element 1404. The processing device 1602 utilizes the SRP processing unit 1610 to create an SRP from data obtained from the scanned test pattern. The processing device 1602 may also utilize the SRP processing unit 1610 to determine information from the SRP. For example, according some example embodiments described herein, the processing device 1602 may determine a parameter related to the reflectance characteristics of the elements of the test pattern. One reflectance parameter of interest may be a parameter referred to as Element Reflectance Non-uniformity (ERN).

Using the interpolation unit 1612, the corresponding effective aperture size can be determined by interpolating the ERN values with respect to the reference chart 1608. The ERN value can be compared with known values of the reference chart 1608. The interpolation can be performed using the interpolation unit 1612 to determine a corresponding aperture dimension value. This aperture dimension value can be referred to as an effective aperture size for the unknown optical system (e.g., a system including one or more of the optical sensor 1604). In some embodiments, the barcode verifier 1600 may be configured as a testing device that is configured to merely determine the effective aperture size without performing verification functions.

Figure 18:
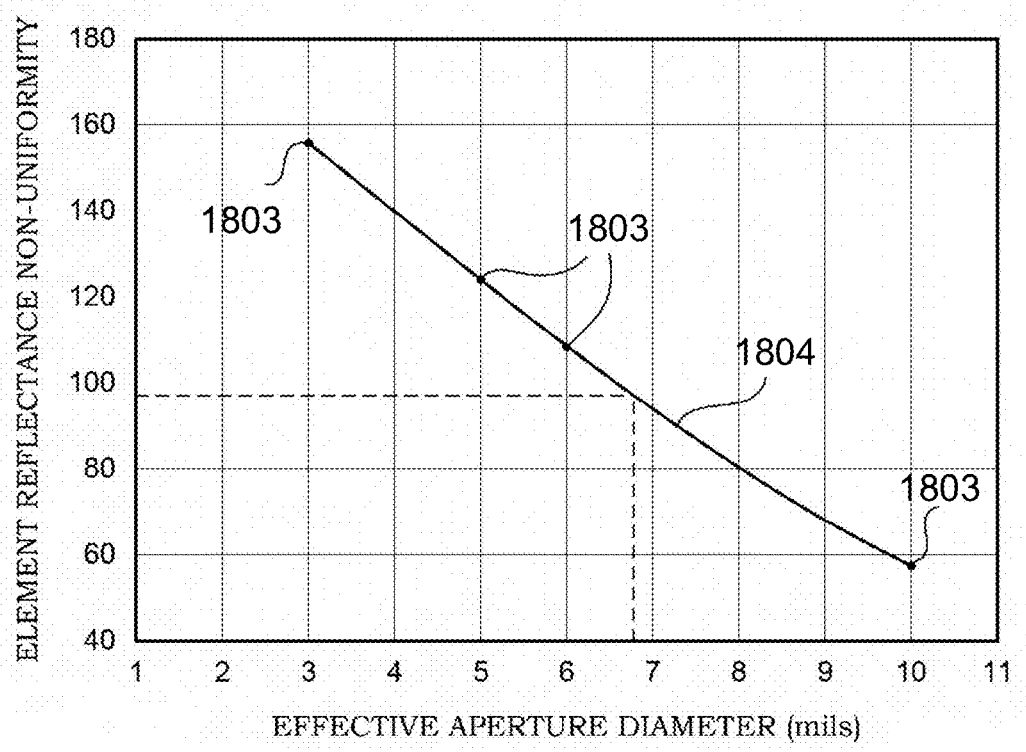
FIG. 18 schematically depicts a reference graph correlating element-reflectance values with aperture sizes, in accordance with some example embodiments described herein.

In accordance with some example embodiments described herein, the barcode verifier 1600 can be used for characterizing an optical system (i.e., the barcode verifier 1600 can be used as a testing system). The testing system may use a scannable test pattern, such as the test pattern 1402 shown in FIG. 14. The test pattern is configured with a plurality of linear bars and a test element having a width that is narrower than each of the plurality of linear bars or spaces. The optical sensor 1604 is configured to scan the scannable test pattern to obtain a scan reflectance profile (SRP). The processing device 1602 is configured to calculate an element-reflectance value from information in the SRP related to the scanned test element. The barcode verifier 1600 further utilizes a reference graph having a curve that correlates aperture dimensions to element-reflectance values. An example of a reference curve is shown in FIG. 18 and is described below. The processing device 1602 is further configured to interpolate an effective aperture dimension of the optical sensor 1604 from the reference graph based on the calculated element-reflectance value.

As mentioned above, the reference graph is created by using known optical systems having different aperture dimensions to scan the scannable test pattern to obtain a reference SRP for each known optical system. The processing device 1602 calculates a reference element-reflectance value for each known optical system from information related to the scanned test element in the reference SRPs. The graph processing unit includes a step of plotting the curve of the reference graph to show the correlation between the reference element-reflectance values and known aperture dimensions of the known optical systems.

The plurality of linear bars of the scannable test pattern may represent bars of a linear barcode. The optical sensor 1604 may be a CIS or linear scan head incorporated in a barcode verifier. The barcode verifier, for example, may be part of an integrated printer/verifier device.

Figure 17:
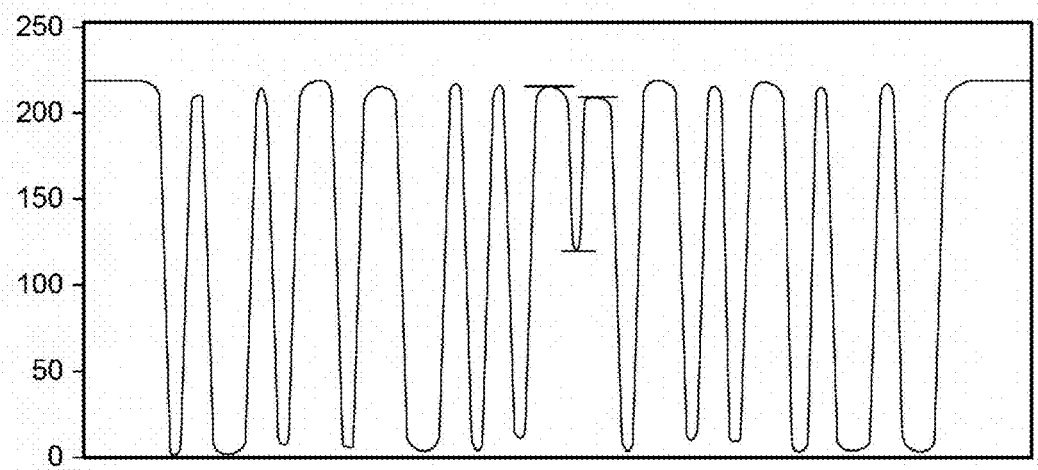
FIG. 17 schematically depicts a graph including a scan reflectance profile (SRP) of the test pattern of FIG. 14, in accordance with some example embodiments described herein.

FIG. 17 is a graphical depiction of a scan reflectance profile (SRP) 1702. The SRP 1702 of FIG. 17 is an example of a measurement of grayscale levels of reflectance of the test pattern of FIG. 14. The grayscale levels may be configured as an eight-bit digital value ranging from 0 to 255 on the SRP 1702. Therefore, the black (i.e., low-reflectance) bars are depicted in the SRP 1702 as having a low level of reflectance on the SRP 1702, while the white (i.e., high-reflectance) spaces are depicted in the SRP 1702 as having a high level of reflectance.

The SRP 1702 may show the feature of the test element 1404, which in some embodiments may be a thin low-reflectance bar. In this example, a grayscale level of 217 is reached at the space before the test element 1404. The scan drops to a grayscale level of 119 at the position of the test element 1404. The reason that the reflectance does not drop to a level near zero at the test element 1404 is due to the thin width of the test element 1404 with respect to the aperture of the optical system. Lastly, the SRP 1702 shows in this example that the reflectance level reaches 209 at the space after the test element 1404.

Therefore, according to the example shown in FIG. 17, an element-reflectance value can be calculated regarding the test element 1404. One element-reflectance value that may be calculated is the Element Reflectance Non-uniformity (ERN), which is defined in the barcode verification standards. ERN is calculated as an average difference between the peaks surrounding a specific element (i.e., test element 1404) and the valley of the element itself. In this example, the ERN may be calculated as ((peak1−valley)+(peak2−valley))/2, or ((217−119)+(209−119))/2=94.0. This ERN value, which the processing device 1602 may derive from the SRP 1702 according to the example of FIG. 17, is also used in the example with respect to FIG. 18.

FIG. 18 is a reference graph 1802 that may be created from known optical systems having known aperture sizes. In some implementations, the reference graph 1802 may be stored in the memory of a barcode verifier. For instance, the reference graph 1802 may be the same as the reference chart 1608 described with respect to FIG. 16. The reference graph 1802 correlates element-reflectance values (e.g., ERN) with aperture size. For example, the aperture size may be measured in units of thousandths of an inch (i.e., "mils"). Four points 518 have been used in this example for creating the reference graph 1802.

According to the example of FIG. 18, an optical system having an aperture size of 3 mils had been used to scan a test pattern to produce an SRP from which the ERN value was found to be 156 on an eight-bit gray-scale value ranging from 0 to 255. A 5-mil optical system scanned the same test pattern to obtain an ERN value of 124; a 6-mil optical system scanned the test pattern to obtain an ERN value of 108.5; and the 10-mil system obtained an ERN value of 57.5. From these four points 1803, the reference curve 1804 was created.

To determine the effective aperture size of the unknown optical system, the unknown optical system is used to scan the test pattern and an SRP is created from the scan. The ERN value is calculated from the SRP and the ERN value is used to interpolate the effective aperture size. As shown in FIG. 17, the SRP 1702 was created and an ERN value of 94.0 was calculated with respect to the portion of the SRP 1702 corresponding to the location of the test element 1404. Using the reference graph 1802 of FIG. 18, the ERN value of 94.0 is used to determine an effective aperture size of approximately 6.8 mils.

Figure 19:
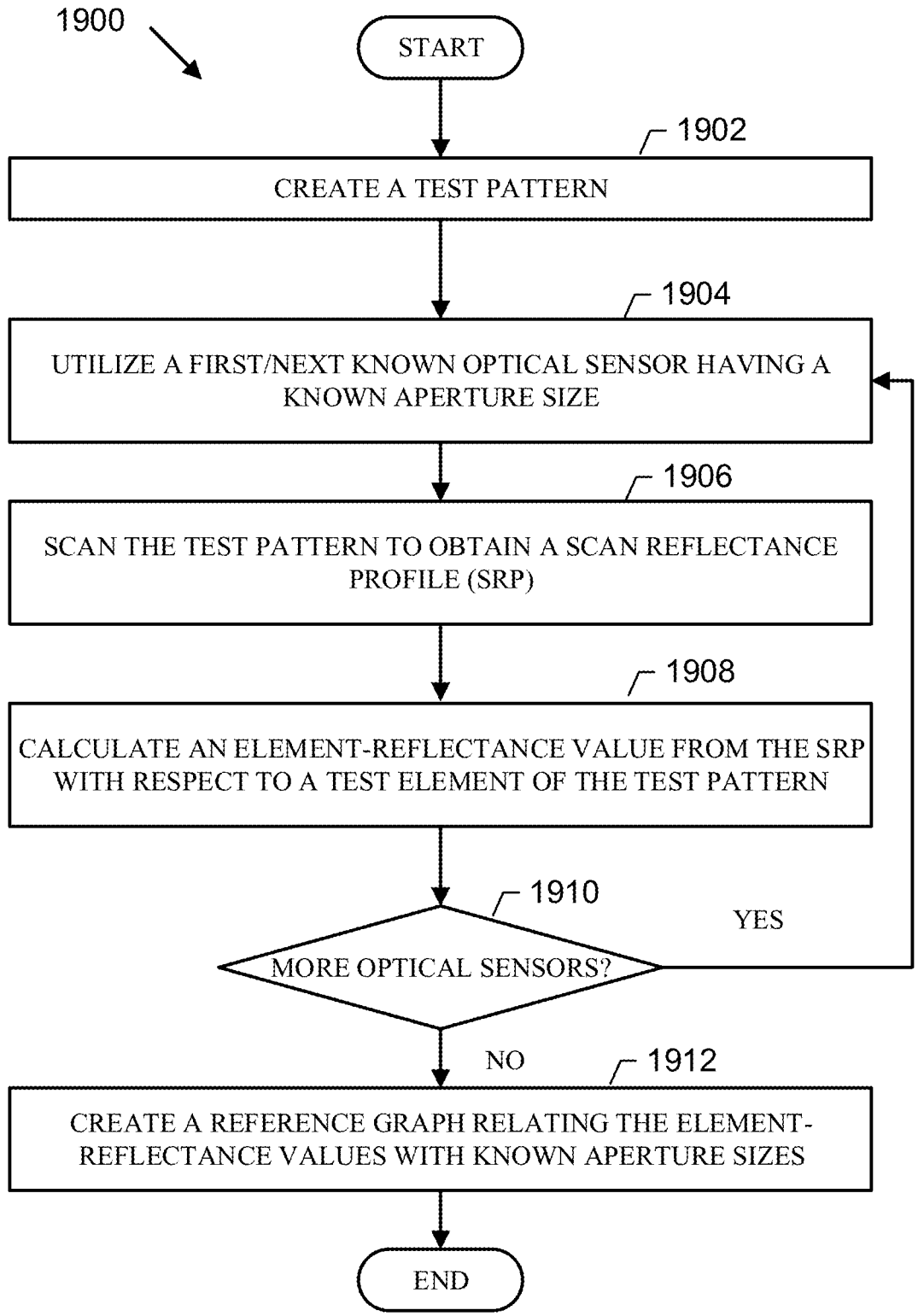
FIG. 19 schematically depicts a flow diagram of a method for creating a reference graph, in accordance with some example embodiments described herein.

FIG. 19 is a flow diagram showing an embodiment of a method 1900 for creating a reference graph. The method 1900 includes a step of creating a test pattern, indicated in block 1902. The test pattern may include a plurality of bars and spaces and at least one test element. As indicated in block 1904, the method 1900 includes selecting a first known optical sensor having a known aperture size. This selected optical sensor is used to scan the test pattern to obtain a scan reflectance profile (SRP), as indicated in block 1906.

From the SRP, the method 1900 includes calculating an element-reflectance value, such as Element Reflectance Non-Uniformity (ERN), as indicated in block 1908. This value is calculated with respect to the portion of the SRP where the test element is positioned within the test pattern. Also, a coordinate including the two variables of ERN (or other reflectance value) and aperture size can be stored.

Decision block 1910 describes a step of determining whether more known optical sensors are to be used to create additional coordinates. At least two coordinates are needed to at least create a line that can be used as a reference for other intermediate interpolation. Preferably, at least two known aperture sizes will bound the aperture sizes of the unknown optical systems to be tested. In some embodiments, the line (or curve) created by two or more points can be used to interpolate or extrapolate aperture size values from calculated ERN values.

If it is determined in decision block 1910 that more optical sensors are to be used for creating the reference graph, then the method 1900 loops back to block 1904 so that the next known optical sensor having another known aperture size can be used. In various exemplary embodiments, each known optical sensor may have different aperture sizes for creating multiple points on the graph.

If it is determined in decision block 1910 that no more optical sensors are to be used, then the method 1900 proceeds to block 1912. As indicated in block 1912, the method 1900 includes the step of creating a reference graph that relates the element-reflectance values with respect to the aperture sizes. For example, the reference graph may have a similar appearance as the graph shown in FIG. 18.

Therefore, the present disclosure describes embodiments of methods for creating a reference graph to be used for characterizing an optical system. In some embodiments, the method may include creating a test pattern including a test element and a plurality of bars and spaces. The width of the test element is preferably narrower than the width of each of the plurality of bars and spaces. The method may also include using a plurality of reference optical sensors having different known aperture sizes to scan the test pattern to obtain a scan reflectance profile (SRP) for each reference optical sensor. Then, the method includes calculating an element-reflectance value from each SRP, wherein each element-reflectance value is calculated with respect to information related to the scanned test element. Lastly, the method may include creating the reference graph by plotting a curve showing a relationship between element-reflectance values versus known aperture sizes of the reference optical sensors. An effective aperture size of an optical system to be tested can then be determined using the reference graph.

According to some implementations, the method may also include the step of determining the effective aperture size of an optical system to be tested. The effective aperture size may be determined from the reference graph by calculating an element-reflectance value from an SRP obtained by using the optical system to be tested to scan the test pattern and interpolating the aperture size from the calculated element-reflectance value.

The method may also include the step of creating a plurality of test patterns each having a test element and a plurality of bars and spaces. The width of each test element may be narrower than the width of each of the plurality of bars and spaces. The test element of each test pattern may have a width that is different from the width of the other test elements.

Furthermore, for each of the plurality of test patterns, the method may further comprise a step of using the plurality of reference optical sensors to scan the respective test pattern to obtain an SRP for each reference optical sensor. An element-reflectance value can be calculated from each SRP, wherein each element-reflectance value is calculated with respect to information related to the scanned test element of the respective test pattern. Also, the method may include a step of creating a reference graph corresponding to the respective test pattern, which plots element-reflectance values versus known aperture sizes of the reference optical sensors.

With the plurality of test patterns, the method may further include the step of scanning each of the plurality of test patterns using an optical system to be tested to obtain test SRPs. The method may also include calculating a test element-reflectance value from each of the test SRPs, wherein the test element-reflectance values are calculated with respect to information related to the scanned test element of each of the plurality of test patterns. Then, each respective reference graph is utilized to interpolate an aperture dimension of the optical system to be tested. Each aperture dimension corresponds with the test element-reflectance value. Finally, with multiple test patterns, the method may include averaging the aperture dimensions determined from the plurality of reference graphs to calculate an effective aperture diameter for the optical system to be tested.

According to some embodiments, the plurality of bars and spaces of the test pattern may include narrow bars, wide bars, narrow spaces, and wide spaces representing bars and spaces of a linear barcode. The test element may be a low-reflectance bar having a width less than the nominal diameter of an aperture of each of the reference optical sensors.

Figure 20:
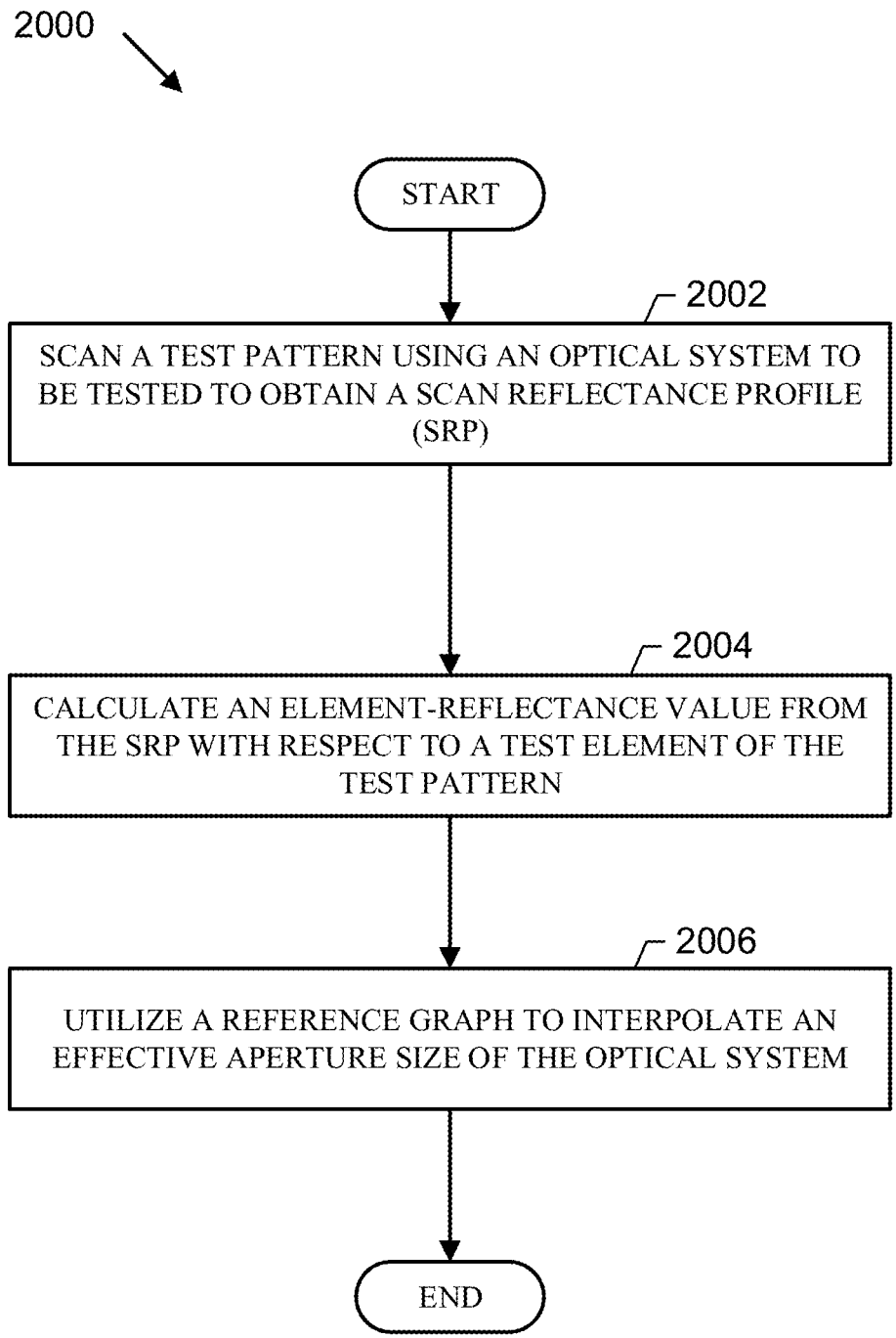
FIG. 20 schematically depicts a flow diagram of a method for characterizing an optical system, in accordance with some example embodiments described herein.

FIG. 20 is a flow diagram showing an embodiment of a method 2000 for characterizing an optical system. In the embodiment illustrated in FIG. 20, the method 2000 includes a step of scanning a test pattern using an optical system to be tested, as indicated in block 2002. The test pattern is the same test pattern used for creating the reference graph, as described above. From the scan of the test pattern, a scan reflectance profile (SRP) can be obtained.

The method 2000 further includes the step of calculating an element-reflectance value (e.g., ERN) from the SRP, as indicated in block 2004. The element-reflectance value is calculated with respect to the portion of the SRP that relates to the test element of the test pattern.

The method 2000 also includes utilizing a reference graph to interpolate an effective aperture size of the optical system to be tested, as indicated in block 2006. The reference graph is the same graph created with respect to the known optical systems using the same test pattern. The effective aperture size can be determined based on the element-reflectance value calculated with respect to block 2004.

Therefore, according to various embodiments of the present disclosure, methods for characterizing an optical system are provided. One method may include scanning a test pattern using an optical system to be tested to obtain a scan reflectance profile (SRP). The test pattern may comprise at least a test element. The method also includes calculating an element-reflectance value from the SRP, wherein the element-reflectance value is calculated with respect to information related to the scanned test element. Then, the method includes utilizing a reference graph to interpolate an effective aperture size of the optical system to be tested, the effective aperture size corresponding to the element-reflectance value.

In some embodiments, the method may further comprise the step of creating the reference graph by using known optical systems to scan the test pattern to obtain a reference SRP for each known optical system. Each known optical system in this embodiment may have a known aperture diameter that is different from the aperture diameters of the other known optical systems.

The step of creating the reference graph may further comprise the step of calculating a reference element-reflectance value from the reference SRPs for each known optical system. The reference element-reflectance values may be calculated with respect to information related to the scanned test element. Creating the reference graph may also include plotting a curve showing a relationship between the reference element-reflectance values and known aperture diameters of the known optical systems.

According to some embodiments, the method may further include the step of creating the test pattern to include a plurality of narrow bars and wide bars, wherein the test element is a line having a width that is narrower than the width of each of the narrow bars and wide bars. The narrow bars and wide bars may represent bars of a linear barcode.

In accordance with some example embodiments described herein, the optical system to be tested may be a CIS, linear scan head, a laser beam, a two-dimensional sensor array (e.g., as used in a digital camera) or other sensing device. Also, the optical system may be incorporated in a barcode verifier or a bar code scanner. In some embodiments, the barcode verifier may be part of an integrated printer/verifier device. The step of calculating the element-reflectance value may include the step of calculating Element Reflectance Non-uniformity, which is defined in ISO/IEC 15416.

The systems and methods disclosed herein are configured to obtain the native resolution from images created using a linear sensor array. The native resolution is compared to the SRPs created from two or more known apertures of known metrology devices.

In some example embodiments, an image obtained from the optical system can be blurred mathematically using techniques to produce "synthetic" aperture sizes that are larger than the effective aperture size. However, it is not possible to artificially produce a smaller aperture. For instance, it may be desirable to create an optical system to meet a specific grade. If a grade of C/10/660 is desired, for example, where "C" represents the overall grade, "10" represents a 10-mil aperture, and "660" represents the frequency of the light source in nanometers, one would start with an optical system having an effective aperture size smaller than 10 mils. For example, using the optical system mentioned above with respect to the example of FIGS. 17 and 18, the effective aperture size would start out as 6.8 mils. The optical system can then be mathematically blurred to change the 6.8-mil aperture to a 10.0-mil aperture to thereby meet the desired grade.

By using a synthetic aperture, the ability to accurately determine the effective aperture can be affected. For example, synthetic blurring becomes progressively less accurate as errors in the measured effective aperture increase.

B. Utilizing Characteristics of an Optical System

FIGS. 21-23, 26-27, 29-30, 33, 35 and 37 illustrate example flowcharts of the operations performed by various components, circuitry, and/or the like of a printing and/or verifying systems as described in FIGS. 1, 2A-2D, 3, 4, 7, 8, 10, 16, respectively. For example, various operations described in the stated flowchart figures may be performed using components such as, but not limited to, the label printer 100, in-line indicia verifier 126, an optical system 300, printing subsystem 401, printer 700, printing and verifying device 800, 1000, barcode verifier 1600 as described in the FIGS. 1, 2A-2D, 3, 4, 7, 8, 10, 16, respectively. However, without limiting scope of the description, for purposes of brevity, the flowcharts of the operations described in FIGS. 21-23, 26-27, 29-30, 33, 35 and 37 are described herein as operations performed by the printing and verifying system 400 described in FIG. 4.

It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 21-23, 26-27, 29-30, 33, 35 and 37, when executed, convert a computer or processing circuitry into a particular machine configured to perform an example embodiment of the present invention. Accordingly, the operations of 21-23, 26-27, 29-30, 33, 35 and 37 define an algorithm for configuring a computer or processor, to perform an example embodiment. In some cases, a general purpose computer may be provided with an instance of the processor which performs the algorithm of FIGS. 21-23, 26-27, 29-30, 33, 35 and 37 to transform the general purpose computer into a particular machine configured to perform an example embodiment.

Accordingly, blocks/steps of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

Figure 21:
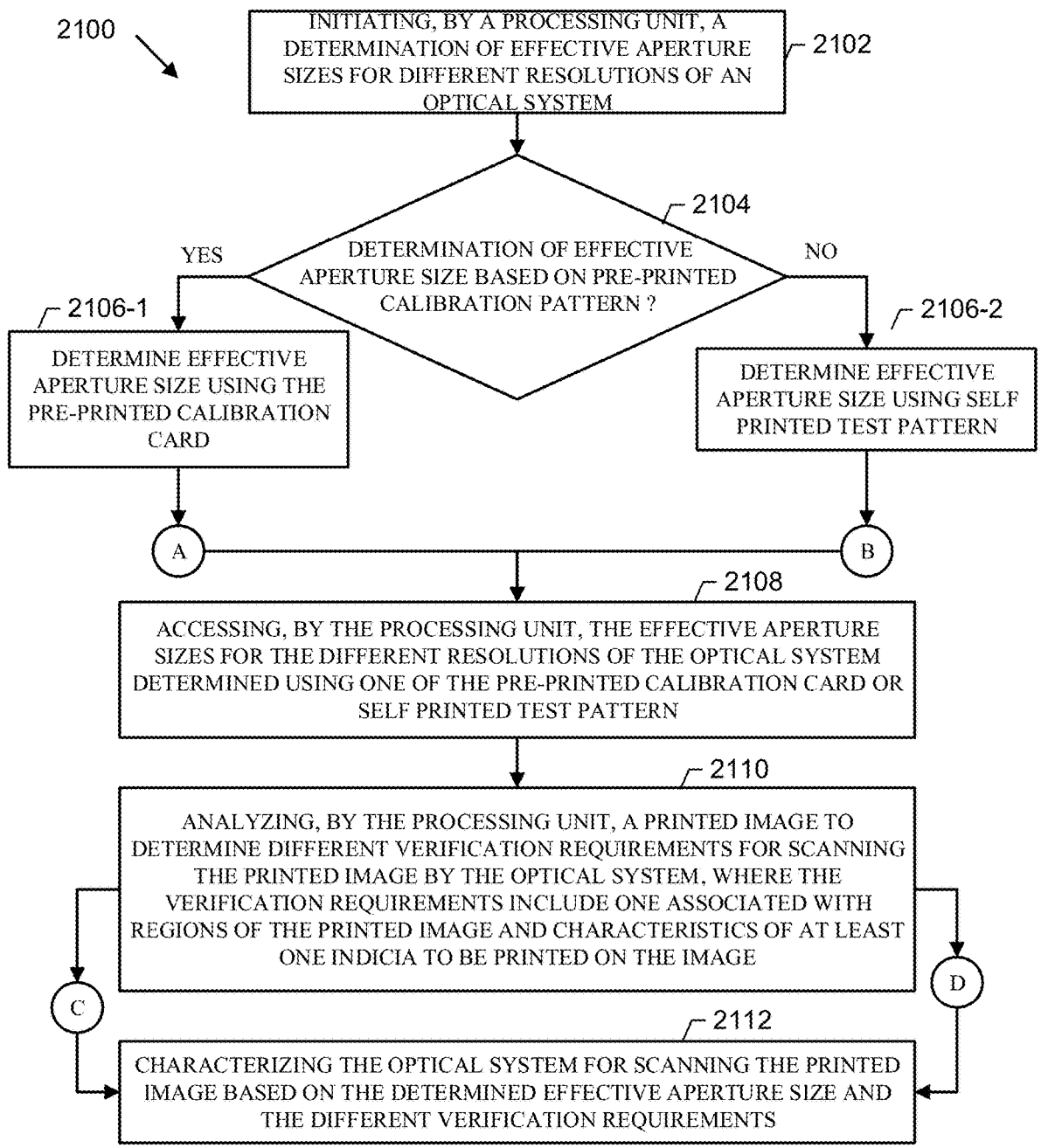
FIG. 21 schematically depicts a flow diagram of another method for characterizing an optical system, in accordance with some example embodiments described herein.

FIG. 21 schematically depicts a flow diagram of another method for characterizing an optical system in accordance with some example embodiments described herein. At step 2102, the printing and verifying system 400 includes means, such as the processing circuitry 304 and/or the processing circuitry 402, to initiate a determination of effective aperture sizes applicable for different resolutions of the optical system 300. In accordance with said example embodiment, characterizing of the optical system 300 may refer to calibrating or configuring the optical system 300, for example, the in-line indicia verifier 126 of the label printer 100, for scanning an image printed by the label printer 100.

In one example embodiment, the calibration referred herein, may be initiated by the label printer 100, i.e. by the processing circuitry 402 of the printing subsystem 401. In another example embodiment, the calibration referred herein may be initiated by the in-line indicia verifier 126 itself, i.e. by the processing circuitry 304 of the optical system. In this aspect, the processing circuitry 304 and/or the processing circuitry 402 may initiate a process for the determination of effective aperture size based on occurrence of a "trigger condition." For instance, in one example, the processing circuitry 304 may initiate the process based on powering ON of the optical system 300. In this aspect, the process may get initiated each time as a user turns on a power of the optical system 300 and/or a printer device including the printing subsystem 401 in communication with the optical system 300. Alternatively, in some example embodiments, the process may be initiated upon installation, for instance, during a configuration set up performed at the installation of the optical system 300.

Moving to step 2104, in accordance with various example embodiments described herein, the determination of the effective aperture size may be performed based on at least one of (i) a pre-printed calibration card used by the optical system 300 and/or (ii) a self-printed test pattern, i.e. a test pattern printed by the printing subsystem 401 associated with the optical system 300.

The "pre-printed calibration card" described herein may correspond to a calibration media that may be utilized during the design and or manufacture of the printer or in other embodiments, provided to customers during a purchase of a verifier device, such as the optical system 300, for configuring the verifier before a first use. For example, the pre-printed calibration card may be used during installation of the verifier with a printer device. In this aspect, the customer can configure the verifier using the pre-printed calibration card before initiating the verification operation. In an example embodiment, the pre-printed calibration card may include a test pattern 1402 printed on a media.

The "self-printed test pattern" may correspond to a test pattern printed on a label of a print media by the printer. In this aspect, a customer may himself print the self-test pattern using a print media used in the printing, depending upon verification requirements of the verifier used along with the printer.

Referring to the method 2100, when the determination of the effective aperture size is to be performed based on the pre-printed calibration card, the process moves to step 2106-1, where the effective aperture size is determined using the pre-printed calibration card. From step 2106-1, the method flow moves to pointer "A," including steps of determining the effective aperture size using the pre-printed calibration card, details of which are described in connection with FIG. 22. Alternatively, when the determination of the effective aperture size is to be performed using a "self-printed test pattern," the process moves to step 2106-2 where the effective aperture size is determined using the self-printed test pattern. From step 2106-2, the method flow moves to pointer "B," including steps of determining the effective aperture size using the self-printed test pattern, details of which are described in connection with FIG. 23.

Moving further, at step 2108, the printing and verifying system 400 includes means, such as the processing circuitry 304 and/or the processing circuitry 402, to access the effective aperture sizes applicable for scanning at different resolutions by the optical system 300. In this aspect, the effective aperture sizes applicable for different resolutions may be determined using any means such as the pre-printed calibration card or the self-printed test pattern. In some examples, a reference table may be stored in the memory 310 and/or the memory 406 of the optical system 300 and the printing subsystem 401, respectively, and the reference table may include values of the effective aperture sizes applicable for the different resolutions at which the optical system 300 may be calibrated for scanning a printed image.

Further, at step 2110, the printing and verifying system 400 includes means, such as the processing circuitry 304 and/or the processing circuitry 402, to analyze a printed image to determine verification requirements. The verification requirements may be indicative of application specifications at which the optical system 300 is to be configured for scanning the printed image by a printer. In some example embodiments, the verification requirements may be accessible to the printing subsystem 401 and/or the optical system 300 before scanning the printed image. For example, in some embodiments described hereinafter, a print job defined for printing the image may be analyzed by the processing circuitry 304 and/or the processing circuitry 402 for determining the verification requirements. Additionally and/or alternatively, in some example embodiments, the processing circuitry 304 and/or the processing circuitry 402 may access a printer's image buffer including data defining specifications of one or more images to be printed by the printer. The processing circuitry 304 and/or the processing circuitry 402 may analyze information from the printer's image buffer to determine the verification requirements of the optical system 300.

In accordance with various example embodiments described herein, the verification requirements may refer to parameters or settings at which the optical system 300 may be configured to operate. For instance, in some example embodiments, the verification requirements may include at least one of (i) resolution requirements associated with different regions of the printed image (i.e. at what resolution the optical system 300 scans a region of the image for accurate verification) and (ii) characteristics such as, but not limited to, size, type etc. of at least one indicia to be printed on the printed image. The printed image may be printed by the printing subsystem 401 associated with the optical system 300. The method flow moves to step 2112 via pointer "C" or pointer "D," which describes process flow for determination of the verification requirements, in accordance with some example embodiments, details of which are described in FIGS. 33 and 34.

Moving to step 2112, the printing and verifying system 400 includes means, such as the processing circuitry 304 and/or the processing circuitry 402, to characterize the optical system 300 for scanning the printed image. In this regard, the optical system 300 may be characterized based on the determined effective aperture size (at steps 2106-1 or 2106-2) and the determined verification requirements at step 2110. Characterizing the optical system 300 herein refers to adjusting the optical system 300 to operate at a defined setting, for example, at an effective aperture size or a desired resolution, for scanning the printed image for verification purposes.

1. Aperture Size Calibration

Figure 22:
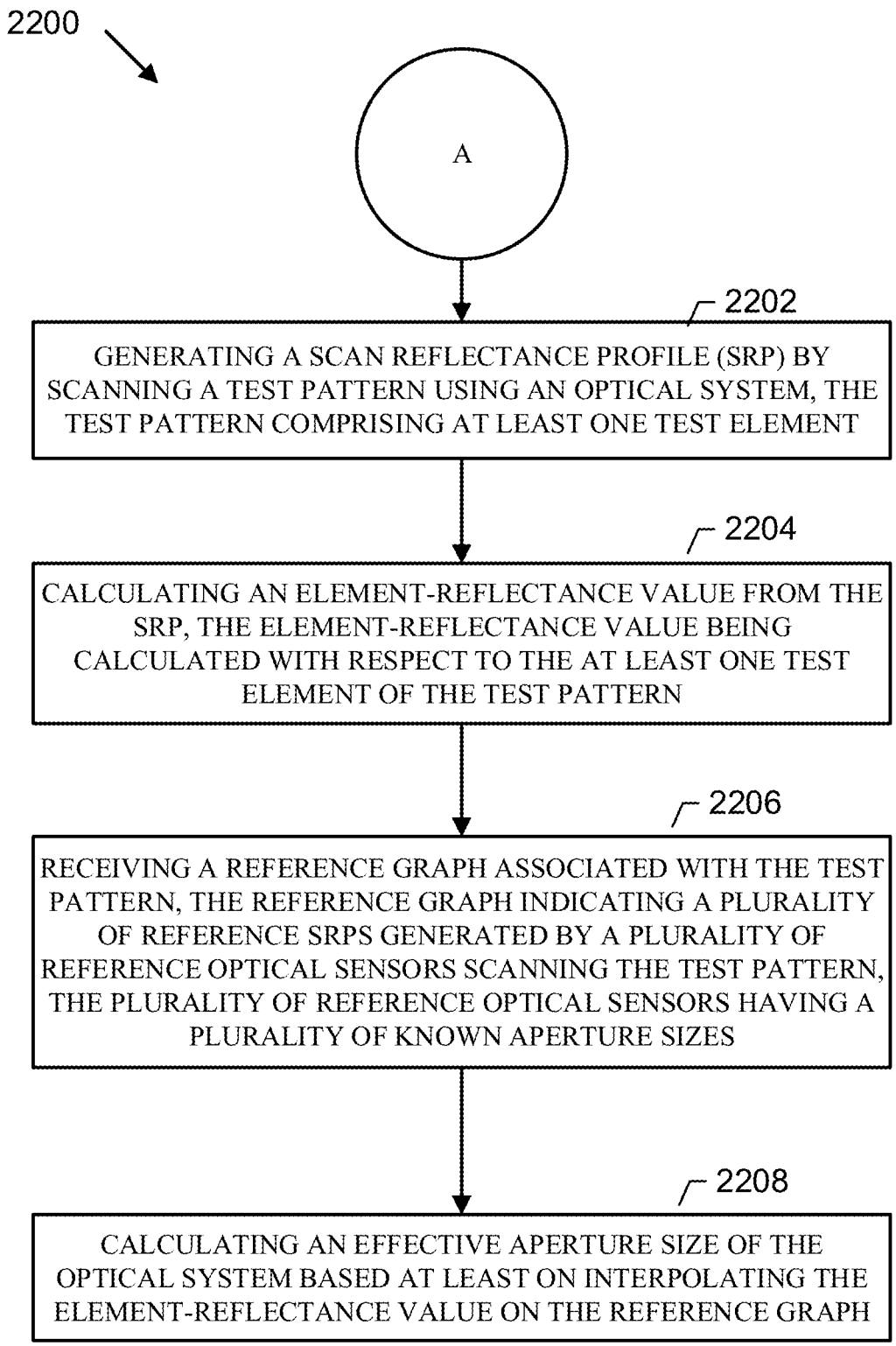
FIG. 22 schematically depicts a flow diagram of a method for determining an effective aperture size of an optical system using pre-printed calibration card, in accordance with some example embodiments described herein.

FIG. 22 schematically depicts a flow diagram of a method 2200 for determining an effective aperture size of an optical system using pre-printed calibration card, in accordance with some example embodiments described herein. Without limiting scope of the description and for purposes of brevity, the flow diagram described in FIG. 22 may be read in accordance with description of FIGS. 19 and 20.

In accordance with various example embodiments described herein, the method 2100 may start at pointer "A" in connection with step 2106-1 after step 2104 of the method 2100 described in FIG. 21. In this regard, the steps 2202-2208 may be performed if, at the step 2106, it is determined that an effective aperture size of the optical system 300 is to be determined based pre-printed calibration card.

Referring to FIG. 22, at step 2202, the printing and verifying system 400 includes means, such as the processing circuitry 304, to generate a scan reflectance profile (SRP) by scanning a test pattern (for example, the test pattern 1402 illustrated in FIGS. 14 and 15) by the optical system 300. FIG. 17 illustrates a graphical depiction of the scan reflectance profile (SRP) 1702 that may be generated by the processing circuitry 304. In accordance with said example embodiments, the test pattern scanned by the optical system 300 may correspond to a pattern printed on the pre-printed calibration card, and may include at least one test element, for example, the test element 1404 illustrated in FIGS. 14 and 15.

Moving to step 2204, the printing and verifying system 400 includes means, such as the processing circuitry 304 and/or the processing circuitry 402, to calculate an element-reflectance value from the SRP generated from step 2202. In this regard, the element-reflectance value may be calculated with respect to the at least one test element of the test pattern.

Further, at step 2206, the printing and verifying system 400 includes means, such as the processing circuitry 304 and/or the processing circuitry 402, that may receive via the communication circuitry 306 and/or the communication circuitry 404 a reference graph associated with the test pattern. The reference graph may indicate two or more reference SRPs generated by two or more of reference optical sensors scanning the test pattern. In this aspect, the one or more optical sensors referred herein have known aperture sizes. FIG. 18 illustrates an example reference graph 1802 that may be received by the processing circuitry 304 and/or the processing circuitry 402 at step 2206. Details of the reference graph 1802 are described in reference to FIG. 18.

At step 2208, the printing and verifying system 400 includes means, such as the processing circuitry 304 and/or the processing circuitry 402, to calculate an effective aperture size of the optical system 300 based at least on interpolating the element-reflectance value on the reference graph. Example embodiments including details of interpolation of the element-reflectance value on the reference graph are described in reference to FIGS. 16-18.

Figure 23:
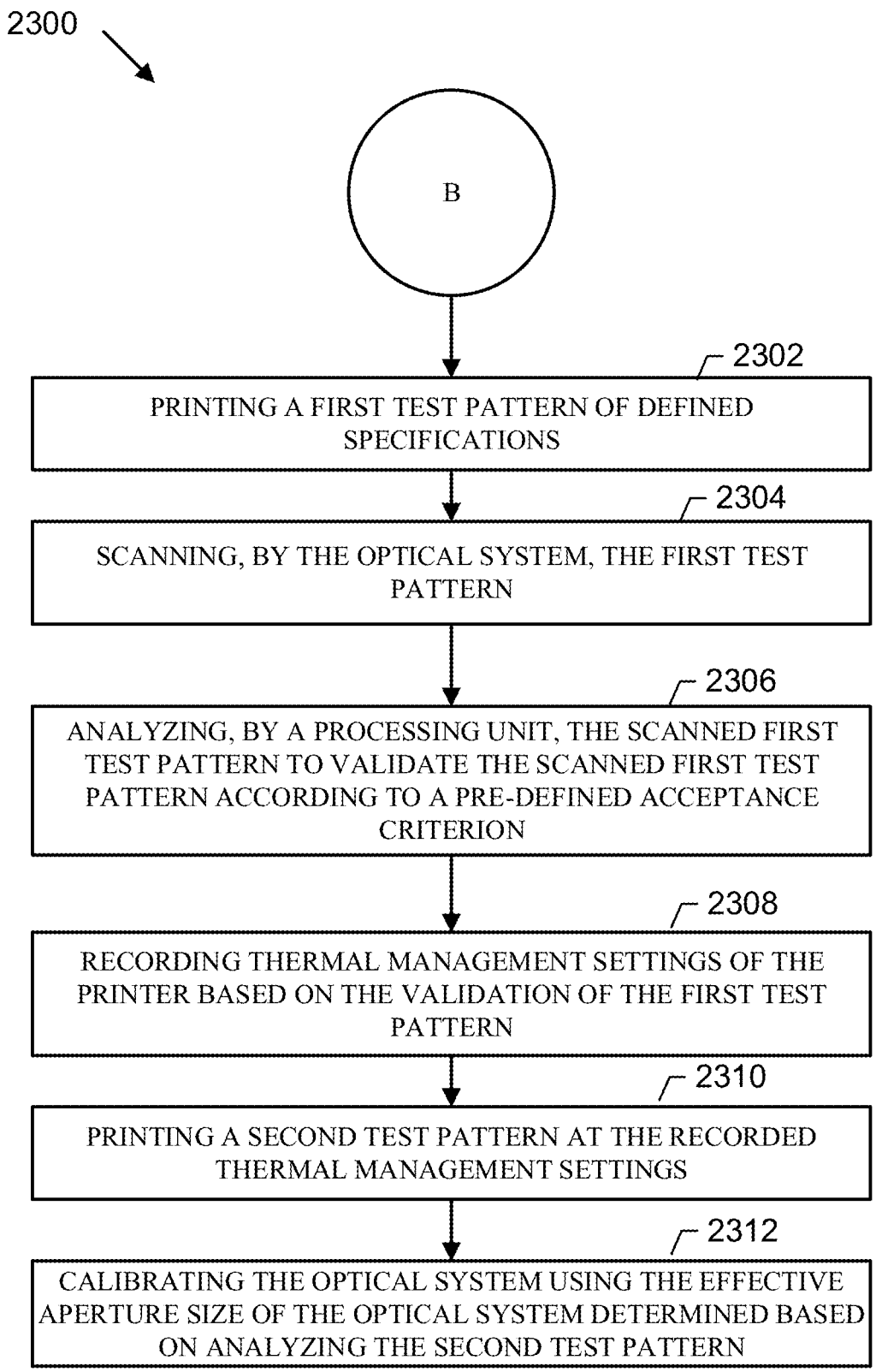
FIG. 23 schematically depicts a flow diagram of a method for determining an effective aperture size of an optical system using self-printed calibration card, in accordance with some example embodiments described herein.

FIG. 23 schematically depicts a flow diagram 2300 of a method for determining an effective aperture size of an optical system using self-printed calibration card, in accordance with some example embodiments described herein. In accordance with various example embodiments described herein, the flow diagram 2300 may start at pointer "B" in connection with step 2106-2 after step 2104 of the method 2100 described in FIG. 21.

In accordance with an example embodiment, at step 2302, the printing and verifying system 400 includes means, such as the processing circuitry 402 of the printing subsystem 401, to initiate printing of a first test pattern of defined specification. In accordance with said example embodiment, printing of the first test pattern may be performed on a print media including one or more labels (for example the blank labels 812) used by the printer for printing. The defined specification herein refers to: (i) a type of pattern (for example, chessboard type, linear barcode type, and/or the like) that may include multiple black elements and correspondingly white elements and (ii) characteristics of a pattern (for example, size of each black element and white element, orientation, shape, sequence of narrow elements and wide elements etc.). In accordance with various example embodiments, the printing of the first pattern may be performed by a printer of the printing subsystem 401, for example, the label printer 100, the printer 700 as described in FIGS. 1 and 7 respectively.

Figure 24A:
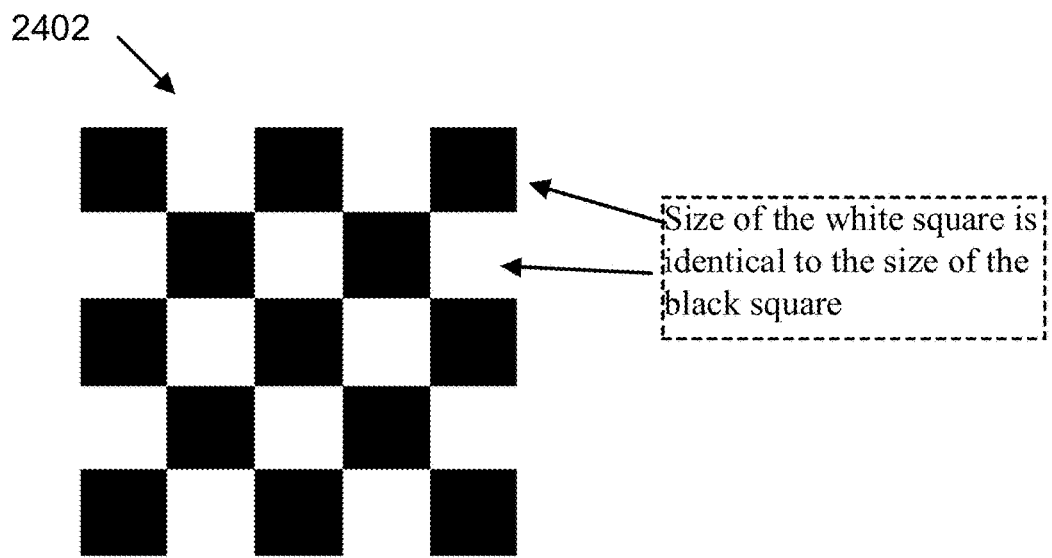
Figure 24B:
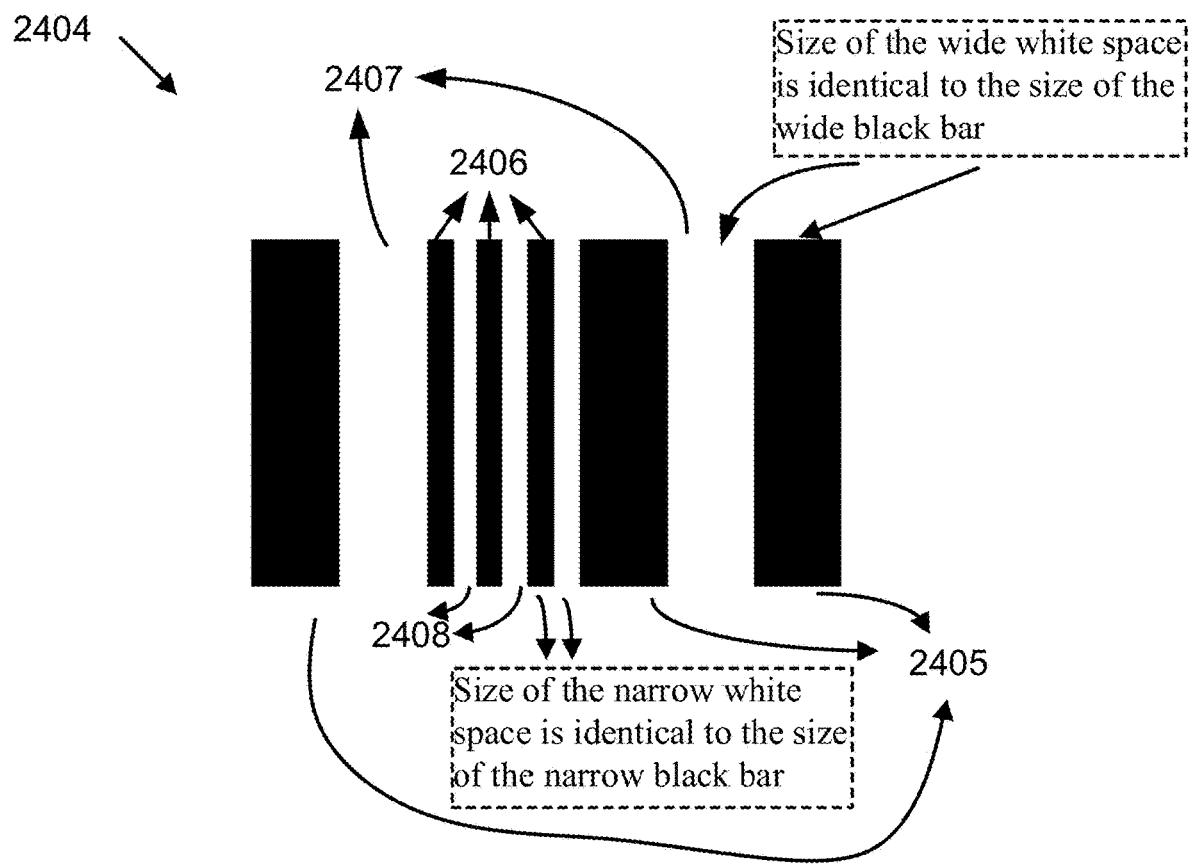

FIG. 24A and FIG. 24B illustrate examples of the first test pattern that may be printed by the printing subsystem 401. Referring to FIG. 24A, a test pattern 2402 may include a specification defining multiple black square boxes and white square boxes arranged in a chessboard like pattern. In this regard, a design of the test pattern 2402 is such that a size of each of the white square in the test pattern 2402 is identical to a size of black square in the test pattern 2402. Alternatively, in another example, referring to FIG. 24B, a test pattern 2404 may include multiple bars and spaces of defined specification. Illustratively, the test pattern 2404 may include wide and narrow bars and corresponding wide and narrow spaces. In this aspect, a design of the test pattern 2404 is such that a size of a wide white space is identical to a size of a wide black bar.

Moving to step 2304, the printing and verifying system 400 includes means, such as the optical system 300, to scan via one or more of the optical sensors 302 the first test pattern (for example, the test pattern 2402 or 2404 printed by the printing subsystem 401). In this regard, the optical system 300 may scan an image including the first test pattern printed on a label of a print media. According to one example embodiment, the scanning may be performed in a row by row fashion, for each row of the image as the image is being printed by the printer. Alternatively, the scanning may be performed by the optical system 300 upon printing of the image including the first test pattern.

At step 2306, the printing and verifying system 400 includes means, such as the processing circuitry 304 and/or the processing circuitry 402, to analyze the scanned first test pattern to validate the scanned first test pattern according to a pre-defined acceptance criterion. The pre-defined acceptance criterion referred herein may correspond to a condition or set of rules that dictate an optimal printing of the first pattern by the printing subsystem 401.

For example, but not limited to, the pre-defined test criterion may define that a width of each wide white element in the first test pattern should be identical to a width of each wide black element if the first test pattern is printed by the printer. Accordingly, if, upon analyzing the scanned first test pattern, it is determined that the pre-defined test criterion is met, the first test pattern is validated. However, if it is determined that the pre-defined test criterion is not met, the first test pattern is not validated. In accordance with some example embodiments, the pre-defined test criterion may include a threshold value that is to be met for the pre-defined test criterion. Further details of validating a test pattern printed by the printing subsystem 401 are described in FIGS. 26-30.

At step 2308, the printing and verifying system 400 includes means, such as the processing circuitry 402, to record thermal settings of the printing subsystem 401 based on the validation of the first test pattern at step 2306. The thermal settings of the printing subsystem 401 herein refer to heat settings of a printhead of a printer (for instance, the printhead 708 of the printer 700) described in FIG. 7. Thus, the thermal settings of the printing subsystem 401 is recorded if the first test pattern is validated.

In various embodiments, a printhead of the printer includes multiple resistive heating elements defined per inch on a substrate of the printhead (for example, 200 dots per inch (dpi), 300 dpi, and/or the like). In this aspect, as a print job is executed, these heating elements are selectively or collectively activated for printing. The heat elements of the printhead may operate at different heat settings (i.e. at a defined temperature) during a printing operation.

The heat settings at which the printhead operates may be manipulated depending on printing requirements. For example, to print a black bar or a black square of the test pattern 2402 and 2404 respectively, the heat settings are increased. For white square and white bars (where no printing occurs), the printhead is not heated. In this regard, the thermal settings associated with the printhead defines printing of each dot on the label of print media. Thus, for achieving a desired print quality, the printhead 708 of the printer 700 is to be configured for "optimal thermal settings" of the printhead.

However, the thermal settings of the printhead 708 can be overly increased, and an over-burn may occur during the printing. Similarly, the thermal settings of the printhead 708 can be overly decreased, and an under-burn may occur during the printing. Either such scenario (i.e. the over-burn and the under-burn) results in a bad printout, which does not meet a print quality standards or the pre-defined test criterion (e.g., in a printed pattern black squares or narrow bars are slightly larger than respective white squares or narrow spaces). In this regard, the optical system 300 (such as a verifier) is operable to verify such defects resulted in the bad printouts.

Accordingly, for printing an indicia such as a barcode pattern or a thin line, the printhead's thermal settings are to be adjusted to avoid an under-burn or over-burn of a printout. In this aspect, an over-burn or an under-burn of the printout would vary a thickness of a printed line. For example, if printing of a line of thickness 1.6-mils is desired, due to the thermal settings that may be high or low, the line may be printed of a thickness 1.9-mils or 1.1-mils, respectively.

Incorrect printing of the line on the print label due to the over-burn or the under-burn of the printout also effects scanning of the printed image. For instance, in some situations, a calculated effective aperture size of the optical system 300 determined for scanning a printed image may be erroneous in case of the over-burn or the under-burn in the printout. Further details of an over-burn and an under-burn by the printhead due to thermal settings are described in connection with FIGS. 25A and 25B.

Moving to step 2310, the printing and verifying system 400 includes means, such as the processing circuitry 402 of the printing subsystem 401, to initiate printing of a second test pattern at the recorded thermal settings. In this aspect, the recorded thermal settings correspond to heat settings at which the first test pattern is validated at step 2306. In other words, in accordance with said example embodiment, at step 2310, the printing of the second test pattern is performed by the printhead 708 of the printer when the printhead 708 is operated at an optimal thermal setting. In one example embodiment, the optimal thermal settings herein correspond to heat setting of the printhead 708 that results in a printout represented by first three dots 2502 in FIG. 25A (i.e. a heat setting at which, upon printing, causes neither an over-burn or an under-bur). Further details related to under-burn, over-burn, and optimal heat settings are described after description of the flowchart illustrated in FIG. 23.

In accordance with said example embodiment, the second test pattern printed at the recorded test settings may include a test element, for instance, the test element 1404 illustrated in FIGS. 14 and 15, respectively. The test elements in the second test pattern herein may comprise a "defect line." FIG. 24C illustrates, an example of a test pattern 2400c including a test element 2402c that may be printed at step 2310 by the printing subsystem 401. Further, the number under each bar code indicates the thickness of each of test element 2402c in mils.

At step 2312, the printing and verifying system 400 includes means, such as the processing circuitry 402, to calibrate the optical system 300 using an effective aperture size of the optical system 300. The effective aperture size of the optical system 300 may be determined based on analyzing the second test pattern. In one example embodiment, the second test pattern may correspond to the test pattern 1402 described in FIGS. 14 and 15, including the test element 1404. In this regard, the effective aperture size of the optical system 300 may be determined using operations described in FIGS. 19, 20, and 22 respectively.

Figure 25A:
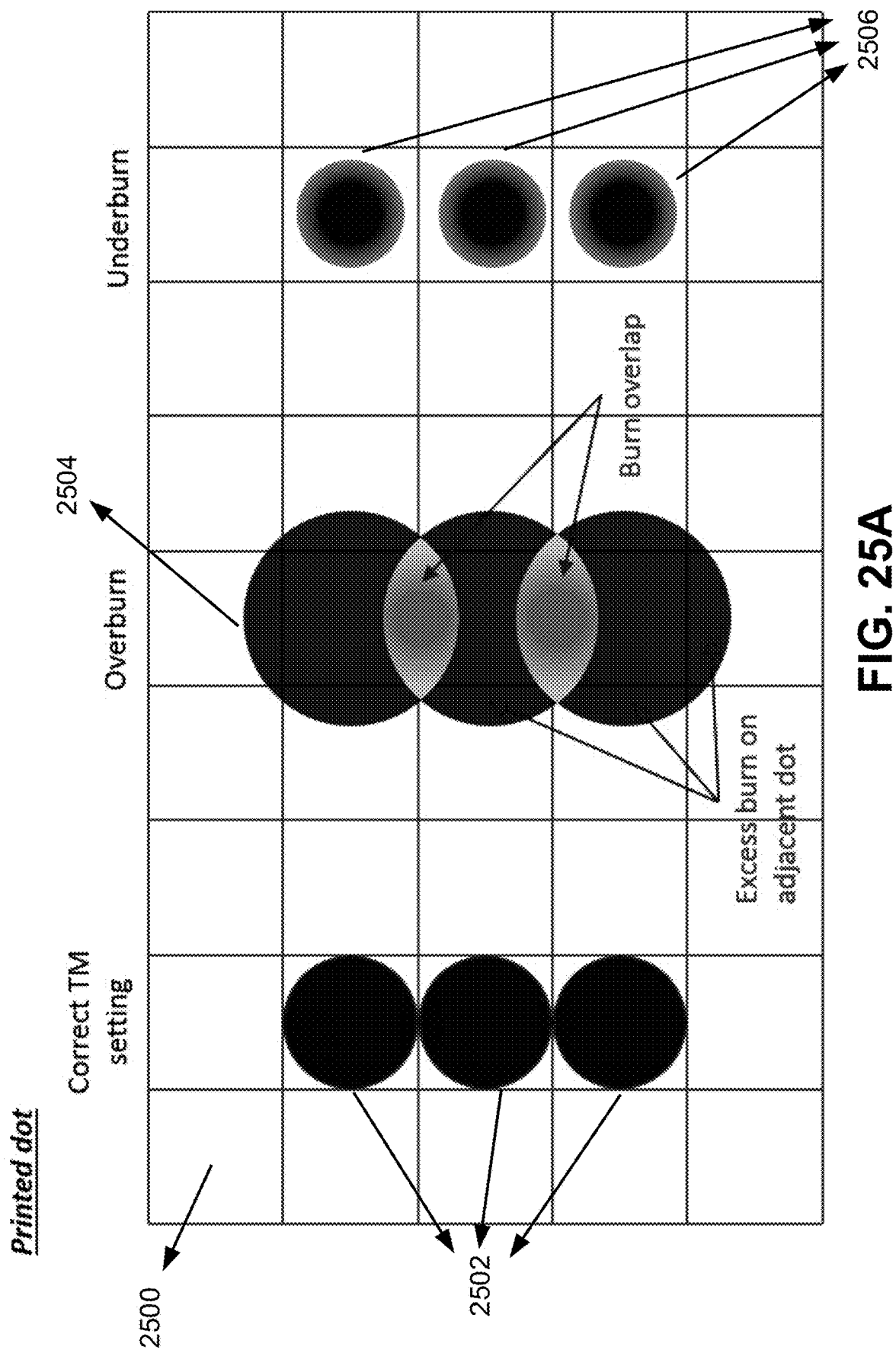
FIGS. 25A and 25B illustrate example scenarios representing an over-burn, an under-burn, and an optimal printing by a printing subsystem of a printer, in accordance with some example embodiments described herein.
Figure 25B:
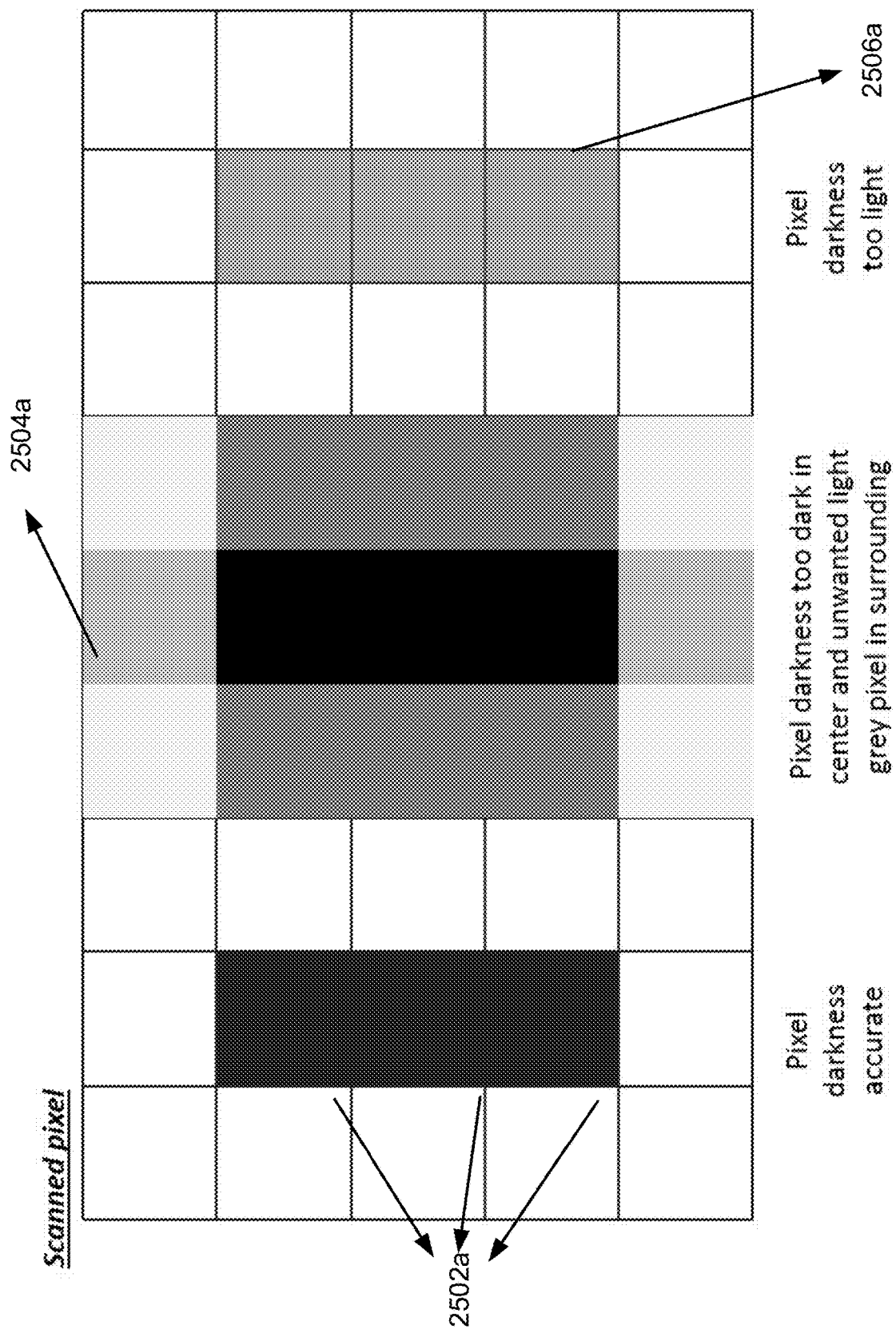

FIGS. 25A and 25B illustrate example scenarios representing over-burn, under-burn, and optimal printing by the printhead 708. For example, FIG. 25A illustrates a print 2500 on a print label, including first three dots 2502 printed at optimal thermal settings of the printhead 708, second three dots 2504 printed due to over-burn, and third three dots 2506 printed due to under-burn. Illustratively, the first three dots 2502 printed at the optimal thermal settings are of similar size and evenly spread in a fill up area. The second three dots 2504 is are representations of over-burn, as the printout of one filling area is spread on surrounding a filling area represented as burn overlap. Further, in the third three dots 2506, black space is left out in respective filling areas between each dot due to the under-burn.

FIG. 25B illustrates results of scanning of the print 2500 of the FIG. 25A (i.e. a scanned image) by the optical system 300. Illustratively, in FIG. 25B, when scanned by the optical system 300, each print dot from amongst the first three dots 2502, the second three dots 2504, and the third three dots 2506 of round shape is represented as a square shape corresponding to pixels. In this aspect, a portion 2502a represents pixels corresponding to the first three dots 2502 in FIG. 25A, a portion 2504a represents pixels corresponding to the second three dots 2504 in FIG. 25A, and a portion 2506a represents pixels corresponding to the third three dots 2506 in FIG. 25A. Thus, it may be understood that the portion 2504a is representative of a scan result obtained after scanning an over-burn printout (for example, the second three dots 2504) by the printhead, and the portion 2506a is representative of a scan result obtained after scanning an under-burn printout (for example, the third three dots 2506). Similarly, the portion 2502a is representative of a scan result obtained after scanning an accurate printout (for example, the first three dots 2502) by the optical system 300.

Referring to the portion 2504a (representing the over-burn), upon scanning, a printed line appears dark or full black with surrounding pixels being partially grey instead of white. The partial grey appearance of printed line in the portion 2504a is because of a printout bled of ink on dots adjacent to the second three dots 2504, depending on the amount of over-burn in the printout, during the printing. Also, referring to the portion 2506a (representing the under-burn), upon scanning, a printed line appears dim and shows a light grey color instead of full black.

In this aspect, in accordance with said example embodiments, if, upon scanning, a line printed by the printing subsystem 401 is either too light (such as the portion 2506a realized in scanned image by the optical system 300) or too dark with grey surrounding area (such as the portion 2504a realized in scanned image by the optical system 300), it is identified that the printing performed by the printing subsystem 401 is not at optimal thermal settings, and the printed pattern is invalidated. In such cases, if a test pattern including a test element (such as the test pattern 1402) is printed (i.e. at non-optimal thermal settings), an ERN measurement for computing an effective aperture size (as described in FIGS. 14-20) would result in erroneous computation of the aperture size. Additionally, in such cases, to print a self-printed calibration card for calibrating the optical system, the thermal settings of the printhead are repeatedly adjusted (i.e. either increased or decreased until a correct pattern is printed and scanned by the optical system 300) in accordance with various example embodiments described herein. Details of adjusting the thermal settings until optimal settings are achieved are described in connection with FIG. 26.

Figure 26:
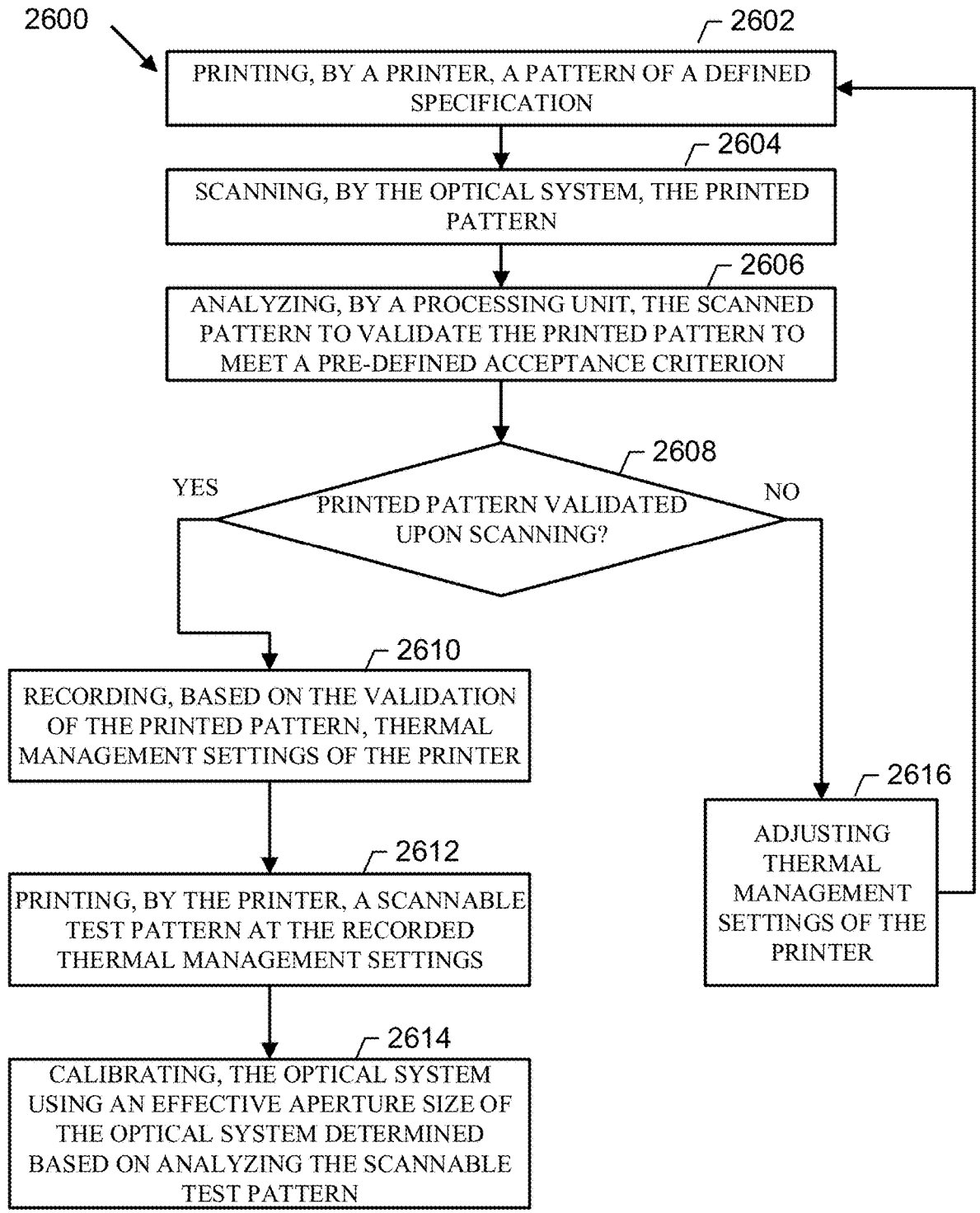
FIG. 26 schematically depicts a flow diagram of a method for characterizing an optical system using self-printed calibration card, in accordance with some example embodiments described herein.

FIG. 26 schematically depicts a flow diagram 2600 of a method for characterizing an optical system using self-printed calibration card, in accordance with some example embodiments described herein.

At step 2602, the printing and verifying system 400 includes means, such as the processing circuitry 402, to print a pattern (for example, the pattern 2402 or the pattern 2404) of a defined specification. The defined specification herein, can be a chessboard pattern including multiple black squares and multiple white squares of identical sizes, or can be a linear pattern including narrow and wide black elements and spaces arranged in a sequence.

At step 2604, the printing and verifying system 400 includes means, such as the optical system 300, to scan the pattern printed from step 2602. At step 2606, the printing and verifying system 400 includes means, such as the processing circuitry 304 and/or the processing circuitry 402, to analyze the scanned pattern. In this aspect, upon scanning, a scanned image of the pattern may include portions such as any of the portion 2502a, 2504a, 2506a illustrated in FIG. 25B.

In accordance with said example embodiments, the pattern (printed by the printing subsystem 401 at step 2602 and scanned by the optical system 300 at step 2604) may be validated based on the analyzing the scanned pattern. In this regard, analyzing of the scanned pattern may include analyzing SRP of the scanned image and determining an element reflectance value using techniques as described in FIGS. 14-20. Here, validation of the printed pattern represents printing of the pattern that meets a pre-defined acceptance criterion, for example, a print quality parameter based on a printing standard.

In some example embodiments, the processing circuitry 402 and/or the processing circuitry 304 may validate the printed pattern, if, upon analyzing a scan of the printed pattern, it is determined that each black bar in the printed pattern is of an identical size as of each white space in the printed pattern. Alternatively, in another embodiment, the printed pattern may be validated if, upon analyzing a scan of the printed pattern, it is determined, that a printout by the printing subsystem 401 includes black bars having sizes in a range from about +2% of the size of the white spaces to about -%2 of the size of the white spaces and vice versa.

Moving to step 2608, the printing and verifying system 400 includes means, such as the processing circuitry 304 and/or the processing circuitry 402, that determine whether the printed pattern is valid or invalid. If it is determined that the printed pattern is not valid at step 2608, the method flows to step 2616. At step 2616, the printing and verifying system 400 includes means, such as the processing circuitry 304 and/or the processing circuitry 402 to adjust thermal settings of the printer. As described earlier, the thermal settings referred herein may represent heat settings associated with a printhead (for example the printhead 708) of a printer (the printer 700). For instance, in one example, the thermal settings may correspond to a temperature value up to which one or more heating elements of the printhead 708 are to be heated. In this regard, adjusting the thermal settings may include one of increasing or decreasing the heat settings of the printhead 708. For purposes of brevity, the thermal settings of the printhead are interchangeably referred hereinafter as the thermal settings of the printing subsystem 401 throughout the description.

As illustrated, upon adjustment of the thermal settings of the printer at step 2616, the method flows back to the step 2602 where the printing subsystem 401 prints a pattern of the defined specification at the adjusted thermal settings. In this regard, in accordance with various example embodiments described herein, steps 2602, 2604, 2608 and 2612 are repeated until the printed pattern gets validated at step 2606 and the validation of the printed pattern is determined at step 2608.

According to said example embodiments, at step 2608, if it is determined that the pattern is validated, the method flows to step 2610, where the processing circuitry 304 and/or the processing circuitry 402 records thermal settings of the printer. Further, at step 2612, a scannable test pattern is printed by the printing subsystem 401. In this aspect, the scannable test pattern is printed by the printing subsystem 401 based on configuring the printhead to operate at the recorded thermal settings. The scannable test pattern referred herein corresponds to a self-printed calibration card, and may include a test element. In accordance with some example embodiments, the scannable test pattern may correspond to the pattern 1402, including at least the test elements 1404.

Moving further at step 2614, the printing and verifying system 400 includes means, such as the processing circuitry 304 and/or the processing circuitry 402, to calibrate the optical system 300 using an effective aperture size of the optical system 300. In this aspect, the effective aperture size is determined based on analyzing the scannable test pattern printed at step 2612. Details related to determination of the effective aperture size based on scanning and analyzing a test pattern including a test element are described in reference to FIGS. 14-20.

Figure 27:
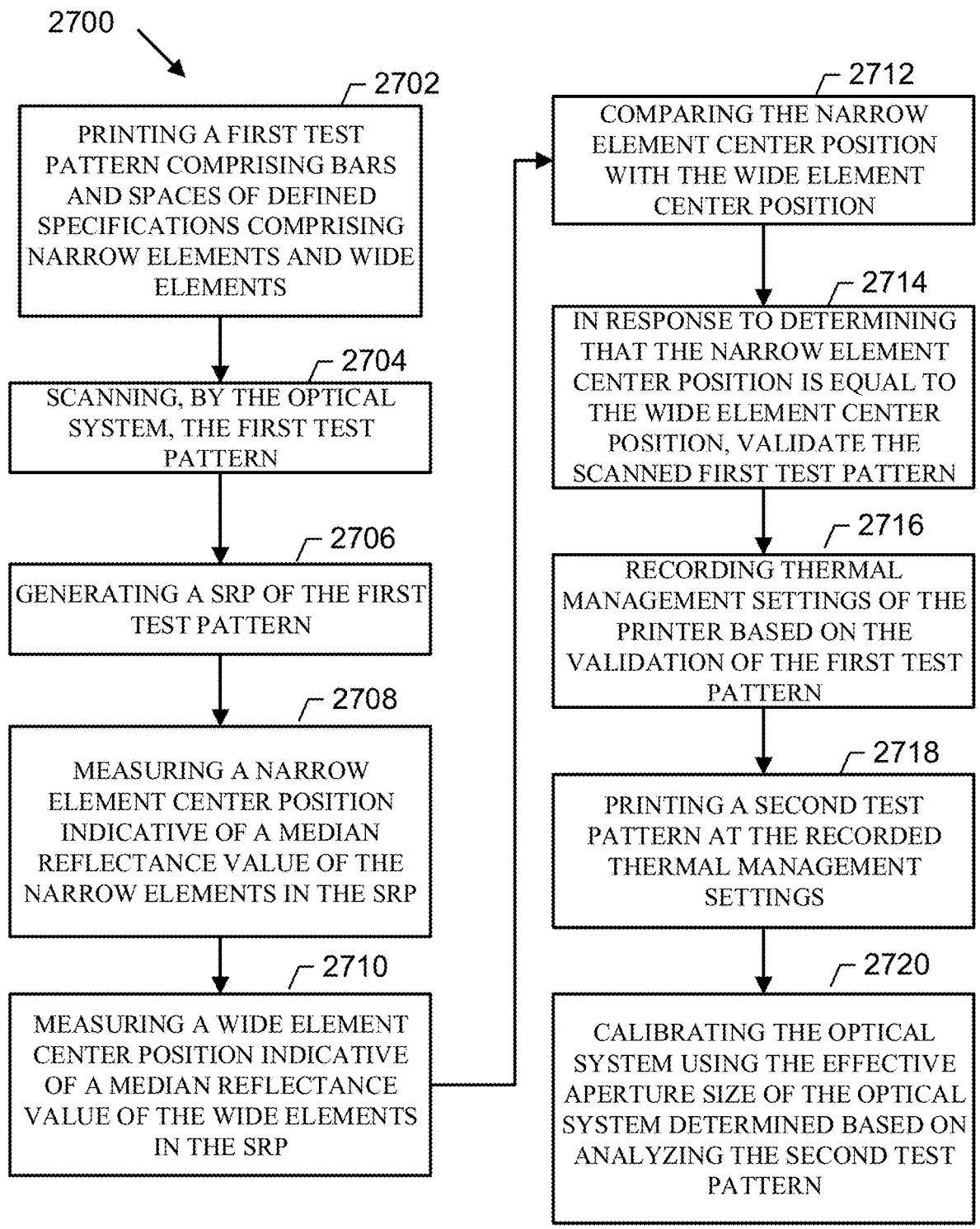
FIG. 27 schematically depicts a flow diagram of a method for characterizing an optical system using self-printed calibration card, in accordance with some example embodiments described herein.

FIG. 27 schematically depicts a flow diagram 2700 of a method for characterizing an optical system, such as the optical system 300, using self-printed calibration card in accordance with some example embodiments described herein.

At step 2702, the printing and verifying system 400 includes means, such as the processing circuitry 304 and/or the processing circuitry 402, to initiate printing of a first test pattern of a defined specification. In one example embodiment, the first test pattern referred herein may correspond to the pattern 2404 illustrated in FIG. 24B that includes multiple wide black elements 2405 (or bars), multiple wide white elements 2407 (or spaces), multiple narrow black elements 2406, and multiple narrow white elements 2408 respectively.

At step 2704, the printing and verifying system 400 includes means, such as the optical system 300, to scan the first test pattern, for instance the test pattern 2404.

Moving to step 2706, the printing and verifying system 400 includes means, such as the processing circuitry 304 and/or the processing circuitry 402 to generate a SRP of the first test pattern 2404 scanned at the step 2704. The SRP of the first test pattern 2404 referred herein, is indicative of a profile of reflectance values sensed by one or more optical sensors 302 of the optical system 300. In accordance with some example embodiments described herein, the SRP 1702 may correspond to a SRP of the second test pattern and the SRP 2802a may correspond to the a SRP of the first test pattern. In an example embodiment, the SRP of a test pattern may correspond to the SRP 1702 illustrated in FIG. 17.

Figure 28A:
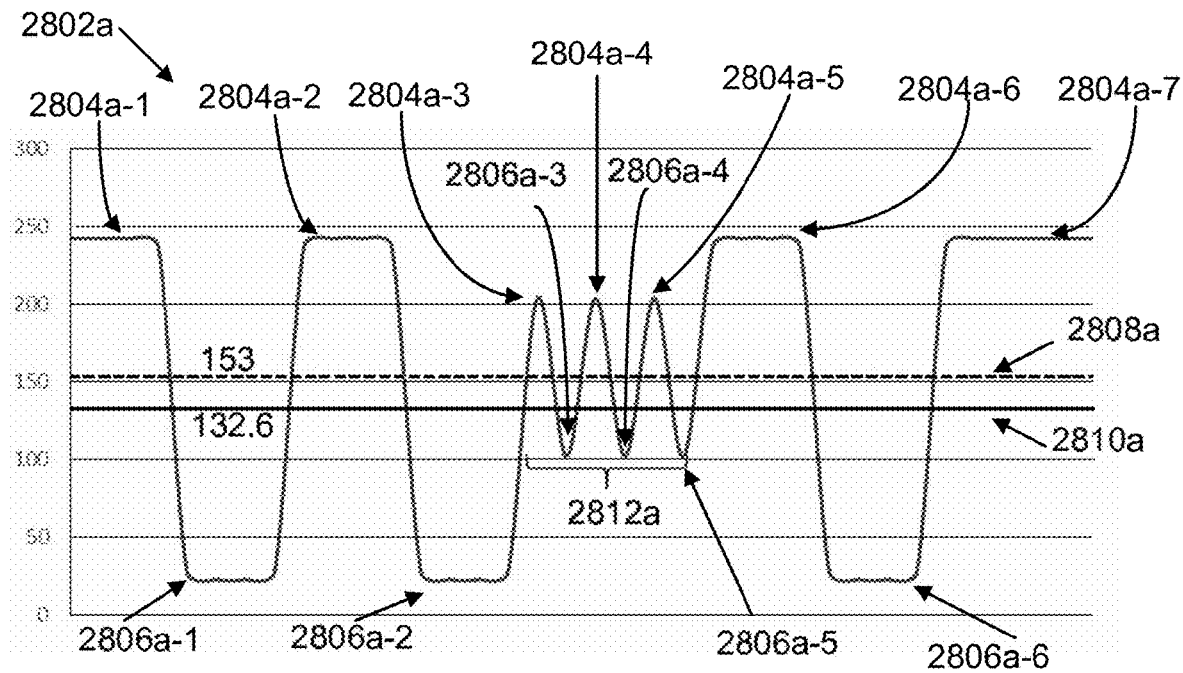
FIGS. 28A, 28B, and 28C illustrate example scan reflectance profile (SRPs) generated upon scanning different test patterns by an optical system, in accordance with some example embodiments described herein.
Figure 28B:
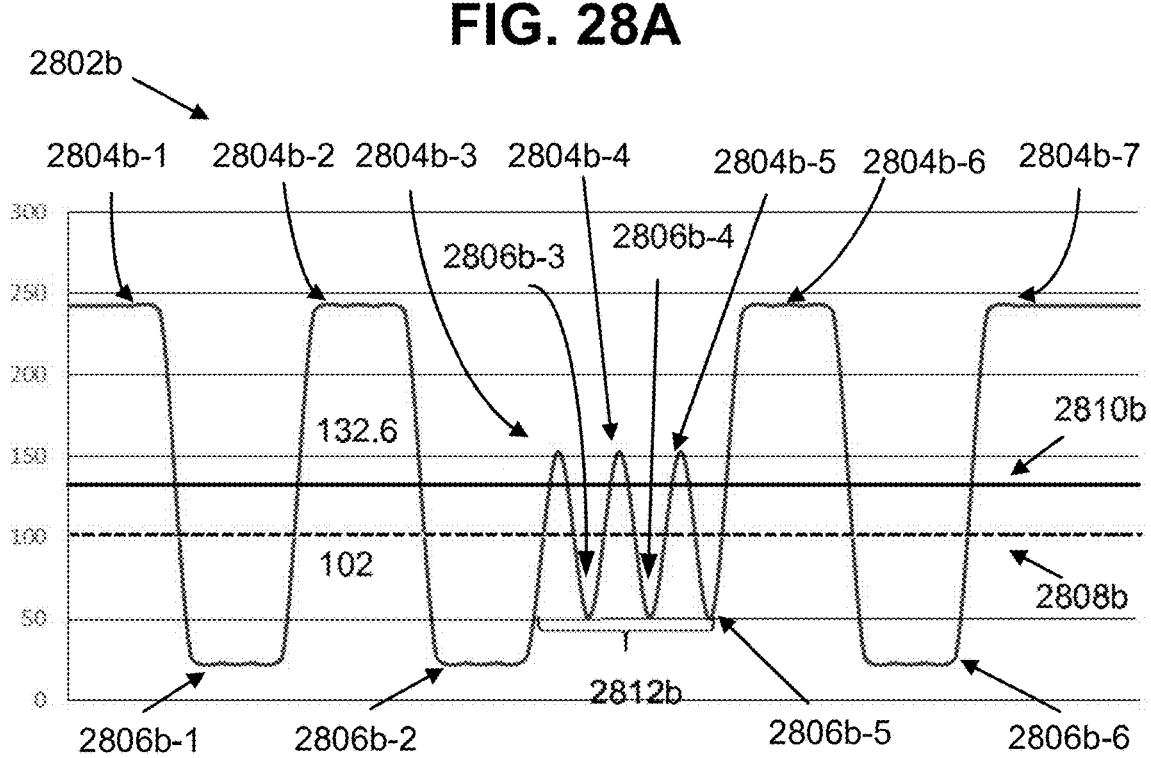
Figure 28C:
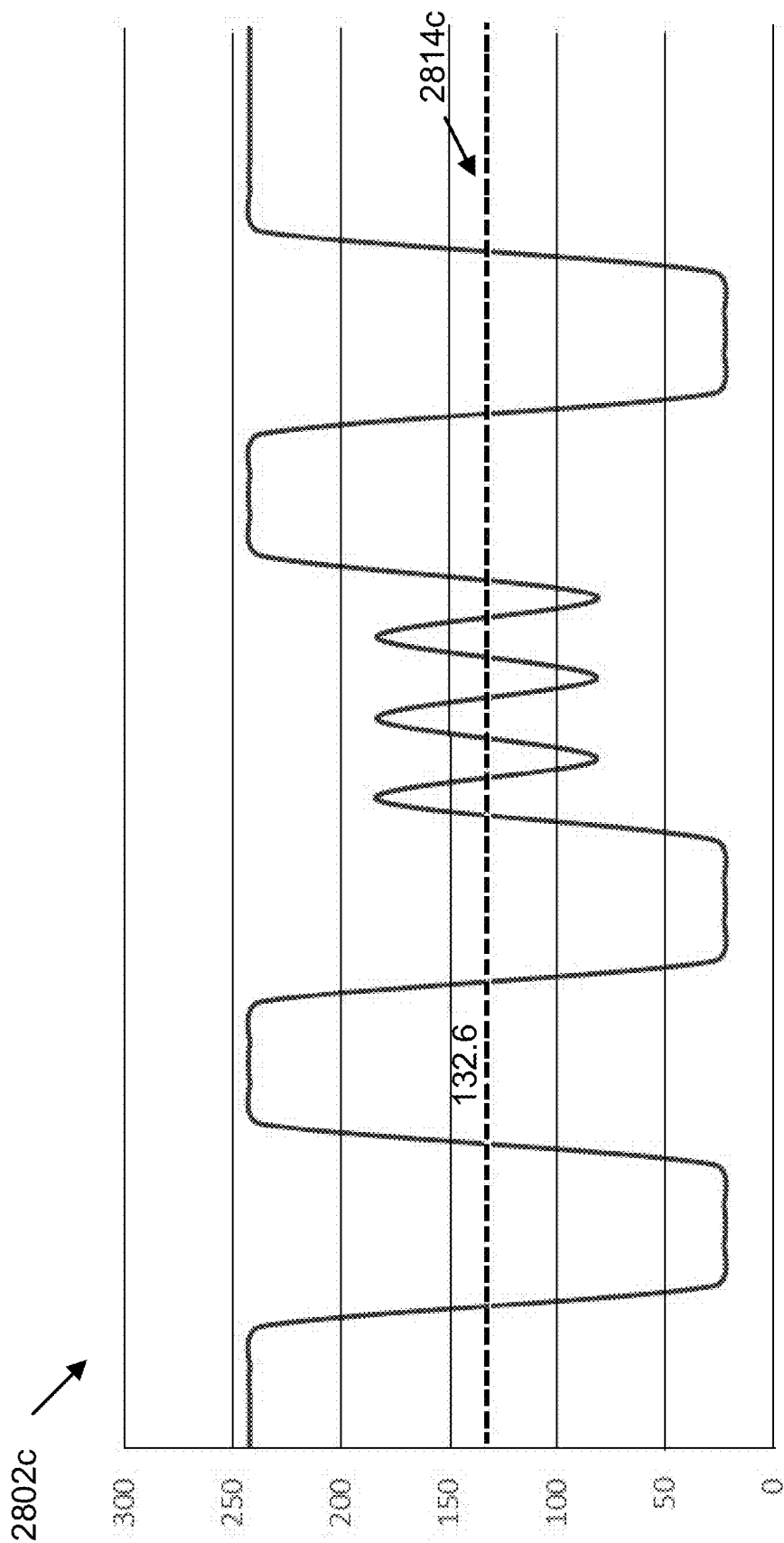

FIGS. 28A, 28B, and 28C also illustrate example SRPs with scanned lines that may be generated by the processing circuitry 304 and/or the processing circuitry 402 upon scanning different test patterns by the optical system 300. The SRP are plots of position versus reflectance, where reflectance is in the units of digital grayscale values where 0 is perfect black, i.e., zero reflectance, and 255 is pure white, e.g., as related to a national reflectance standard. In this aspect, in accordance with some example embodiments, the different test patterns for which the respective SRPs are illustrated in FIGS. 28A, 28B, and 28C are printed at different thermal settings of a printhead of the printer.

Referring to FIG. 28A, in one example embodiment, at step 2706, SRP 2802a may be generated upon scanning the first test pattern 2404, where the first test pattern 2404 is printed at a first thermal setting of the printing subsystem 401. Referring to FIG. 28B, in one example embodiment, at step 2706, SRP 2802b may be generated upon scanning the test pattern 2404, where the first test pattern 2404 is printed at a second thermal setting of the printing subsystem 401.

Illustratively, the SRP 2802a includes multiple crests 2804a-1 to 2804a-7 and multiple troughs 2806a-1 to 2806a-6. Also, as illustrated, the SRP 2802b includes multiple crests 2804b-1, to 2804b-7 and multiple troughs 2806b-1 to 2806b-6. In this aspect, each of the crests 2804a-1 to 2804a-7 and crests 2804b-1 to 2804b-7 represents a maximum value of reflectance sensed by respective optical sensors 302 of the optical system 300, upon a full scan of the test pattern 2404. Accordingly, each of the troughs 2806a-1 to 2806a-6 and the troughs 2806b-1 to 2806b-6 represents a minimum reflectance value sensed by the respective optical sensors 302 of the optical system 300.

In this regard, referring to FIG. 28A, a part of the SRP 2802a, formed by the crests 2804a-1, 2804a-2, 2804a-6, and 2804a-7 and troughs 2806a-1, 2806a-2, and 2806a-6, corresponds to reflectance values sensed by the optical sensors 302 of the optical system 300 upon scanning the wide white elements 2407 and wide black elements 2405 respectively of the test pattern 2404. In accordance with some example embodiments, a wide element center position 2810a represents a midpoint of the reflectance values of the wide white elements 2407 and wide black elements 2405 respectively. Similarly, referring to FIG. 28B, in another example embodiment, a part of the SRP 2802b, formed by the crests 2804b-1, 2804b-2, 2804b-6, and 2804b-7 and troughs 2806b-1, 2806b-2, and 2806b-6, corresponds to reflectance values sensed by the optical sensors 302 of the optical system 300 upon scanning the wide white and black elements 2407 and 2405 respectively of the test pattern 2404 printed at a different heat setting. Similarly, reflectance value 2810b is the midpoint of the reflectance values of the narrow white elements 2408 and the narrow black elements 2406 respectively.

Further, referring to FIG. 28A, a part 2812a of the SRP 2802a is the midpoint in reflectance formed by the crests 2804a-3, 2804a-4, and 2804a-5, and troughs 2806a-3, 2806a-4, and 2806a-5, corresponds to values sensed by the optical sensors 302 of the optical system 300 upon scanning the narrow white elements 2408 and narrow black elements 2406 respectively of the test pattern 2404. Similarly, referring to FIG. 28B, in another example embodiment, a part 2808b of the SRP 2804b, formed by crests 2804b-3, 2804b-4, and 2804b-5 and the troughs 2806b-3, 2806b-4, and 2806b-5, corresponds to values sensed by the optical sensors 302 of the optical system 300 upon scanning the narrow white elements 2408 and narrow black elements 2406 respectively of the test pattern 2404.

Illustratively, the SRP 2802a represents a scan profile of the first test pattern 2404 that is printed as a light printout when compared to the SRP 2802b that represents a scan profile of the first test pattern 2404 that is printed as a dark printout from the printing subsystem 401 (i.e. the first thermal settings at which the first test pattern 2404 is printed by the printing subsystem 401 is lower than the second thermal settings at which the first test pattern 2404 is printed by the printing subsystem 401).

At step 2708 of FIG. 27, the printing and verifying system 400 includes means, such as the processing circuitry 304 and/or the processing circuitry 402, to measure a narrow element center position indicative of a median reflectance value of the narrow elements in the SRP. FIGS. 28A and 28B illustrate a narrow element center reflectance position 2808a and another narrow element center reflectance position 2808b corresponding to the SRPs 2802a and 2802b, respectively.

In this aspect, the narrow element center position 2808a represents a median reflectance value of the part of the SRP 2802a that corresponds to the crests 2804a-3, 2804a-4, and 2804a-5 and troughs 2806a-3, 2806a-4, and 2806a-5, generated upon scanning the narrow black and white elements 2406 and 2408 respectively of the test pattern 2404 printed at the first thermal settings. The narrow element center position 2808b represents a median reflectance value of the part of the SRP 2802b that corresponds to the crests 2804b-3, 2804b-4, and 2804b-5, and troughs 2806b-3, 2806b-4, and 2806b-5, generated upon scanning the narrow black and white elements 2406 and 2408 respectively of the test pattern 2404 printed at the second thermal settings.

At step 2710, the printing and verifying system 400 includes means, such as the processing circuitry 304 and/or the processing circuitry 402, to measure a wide element center position indicative of a median reflectance value of the wide elements in the SRP. For instance, FIGS. 28A and 28B illustrates a wide element center position 2810a and another wide element center position 2810b corresponding to the SRPs 2802a and 2802b, respectively. In this aspect, the wide element center position 2810a represents a median value of the part of the SRP 2802a that corresponds to the crests 2804a-1, 2804a-2, 2804a-6, and 2804a-7, and troughs 2806a-1, 2806a-2, and 2806a-6, generated upon scanning the wide elements 2405 and 2407 of the test pattern 2404 printed at the first thermal settings. Accordingly, the wide element center position 2810*b* represents a median value of the part of the SRP 2802*b* that corresponds to the crests 2804*b*-1, 2804*b*-2, 2804*b*-6, and 2804*b*-7, and troughs 2806*b*-1, 2806*b*-2, and 2806*b*-6, generated upon scanning the wide elements 2405 and 2407 of the test pattern 2404 printed at the second thermal settings.

Moving to step 2712, the printing and verifying system 400 includes means, such as the processing circuitry 304 and/or the processing circuitry 402, to compare a narrow element center reflectance position of a SRP with a wide element center reflectance position of the SRP. For instance, referring to FIG. 28A, step 2712 of FIG. 27 includes comparison of the narrow element center reflectance position 2808*a* with the wide element center reflectance position 2810*a* of the SRP 2802*a*. Accordingly, referring to FIG. 28B, step 2712 of FIG. 27 includes comparison of the narrow element center reflectance position 2808*b* with the wide element center reflectance position 2810*b* of the SRP 2802*b*.

Illustratively, in FIG. 28A, in the SRP 2802*a*, the value of the narrow element center reflectance position 2808*a* is greater than value of the wide element center reflectance position 2810*a*. However, in FIG. 28B, in the SRP 2802*b*, value of the narrow element center reflectance position 2808*b* is lower than value of the wide element center reflectance position 2810*b*. For example, in FIG. 28A, the narrow element center position 2808*a* is a grayscale value of 153 which is greater than the value 132.6 of the wide element center reflectance position 2810*a*. Also, in FIG. 28B, the narrow element center position 2808*b* is a grayscale value of 102 which is lower than the value 132.6 of the wide element center reflectance position 2810*b*.

For printing calibration cards that are used for calibrating an optical system, such as, but not limited to, an indicia verifier of a thermal printer, thermal settings (i.e. heat settings of the resistive elements of printhead of a printing system) are to be set at an optimum level. Here, the optimum level of the thermal settings of the printhead represents heat settings of the printhead at which an indicia printed by the thermal printer includes wide and narrow white spaces and bars. In this regard, where the thermal settings of the printhead are lower than an optimum level, a printout of an indicia including linear white spaces and bars generated by the printing subsystem 401 is lighter, i.e. the average midpoint reflectance of the narrow elements in the indicia is greater than the average midpoint reflectance of the wide elements in the indicia. Accordingly, in another case, where the thermal settings of the printhead is greater than an optimum level, a printout of the indicia generated by the printing subsystem 401 is darker, i.e. an average midpoint of the narrow elements is greater than an average midpoint of the wide elements in the indicia. Thus, if an indicia is printed with identical average midpoint reflectance values of the wide and narrow elements, the thermal settings of the printhead is to be at the optimum level.

For instance, in the SRP 2802*a*, the part 2812*a* corresponding to a scan profile of the narrow black elements 2406 and narrow white elements 2408 is shifted upwards i.e. closer towards reflectance values of the wide space crests 2804*a*-1, 2804*a*-2, 2804-*a*-6, and 2804*a*-7. In comparison, the part 2812*b* of the SRP 2802*b* is shifted downwards, i.e. closer towards reflectance values of the troughs 2806*b*-1, 2806*b*-2, and 2806*b*-6, which are caused by scanning the wide white elements 2407.

In this aspect, in accordance with various example embodiments described herein, at this optimum and repeatable level of the thermal settings of the printhead, the printing subsystem 401 can print an ideal and repeatable calibration pattern. The ideal calibration pattern herein represents a pattern in which: (i) size of each narrow black element is to be identical with size of each narrow white element and (ii) size of each wide black element is to be identical with size of each wide white element. In other words, when the ideal calibration pattern is printed, a printout of the ideal calibration pattern concords with printing of the first three dots 2502 illustrated in FIG. 25A. When the ideal calibration pattern (printed by the printing subsystem 401) is scanned by the optical system 300, a scan result, i.e. scanned pixels' concords with the pixels of the portion 2502*a*, is illustrated in FIG. 25B.

Moving to step 2714, the printing and verifying system 400 includes means, such as the processing circuitry 304 and/or the processing circuitry 402, to validate the scanned first test pattern 2404 in response to determining that a narrow element center position of the SRP is equal to the wide element center position based on the comparison performed at step 2712. In this regard, FIG. 28C illustrates a scenario where a line 2814*c* represents a narrow element center position and a wide element center position that are identical to each other in the SRP 2802*c*. Illustratively, the line 2814*c* represents a median pixel value 132.6 that corresponds to both narrow element center position and the wide element center position of the SRP 2802*c*

At step 2716, the printing and verifying system 400 includes means, such as the processing circuitry 304 and/or the processing circuitry 402, to record thermal settings of the printer based on the validation of the first test pattern 2404. In this regard, the thermal settings of the printhead (i.e. heat settings of the printhead at which the first test pattern is validated) may be stored in the memory 310 or 406 of the optical system 300 and the printing subsystem 401, respectively.

Further, at step 2718, the printing and verifying system 400 includes means, such as the processing circuitry 304 and/or the processing circuitry 402, to initiate printing of a second test pattern. In this regard, in accordance with said example embodiments, the second test pattern is printed at the thermal settings of the printhead recorded at step 2716. Here, in accordance with various embodiments described herein, the second test pattern represents pattern to be printed on a self-printed calibration card for calibrating the optical system 300. In this aspect, the recorded thermal settings are considered optimal because the comparison performed at step 2712 results in determining of the narrow element center position to be equal to the wide element center position. Thus, the second test pattern printed at the step 2716 is printed at a thermal printhead setting that is optimal, reproducible and consistent, regardless of the type of media used to print the test patterns. In accordance with various example embodiments described herein, the second test pattern may include a test element that may be used for calibrating the optical system 300. For instance, in an example, the second test pattern may correspond to the pattern 2400*c* including the test element 2402*c* (e.g., a very skinny bar that is substantially narrower than the smallest elements in the bar code symbol)), as illustrated in FIG. 24C.

At step 2720, the printing and verifying system 400 includes means, such as the processing circuitry 304 and/or the processing circuitry 402, to calibrate the optical system 300 using the second test pattern i.e. a self-printed test pattern. In this regard, the optical system 300 may be calibrated for an effective aperture size and a defined resolution to scan the printed image using the second test pattern.

To this extent, in accordance with said example embodiments, the second test pattern may be analyzed using the techniques described in FIGS. 16-21 for determining an effective aperture size for which the optical system 300 may be calibrated.

In accordance with various example embodiments described herein, at the comparison of step 2712, the processing circuitry 304 and/or the processing circuitry 402 may determine that the narrow element center reflectance position is not equal to the wide element center position, and additional steps may be triggered. For instance, in one example embodiment, a notification such as a visual notification, an audio command, a sound and/or the like may be generated by the processing circuitry 304 and/or the processing circuitry 402 to indicate an adjustment of the thermal settings of the printhead. Alternatively, in another example embodiment, the processing circuitry 304 and/or the processing circuitry 402 may automatically initiate an adjustment of the thermal settings of the printhead of the printing subsystem 401, as described at step 2612 of FIG. 26. In this aspect, in such cases, the thermal settings of the printhead may be adjusted, i.e. increased or decreased, and the steps 2702-2712 may be repeated until a test pattern scanned by the optical system 300 is validated.

Figure 29:
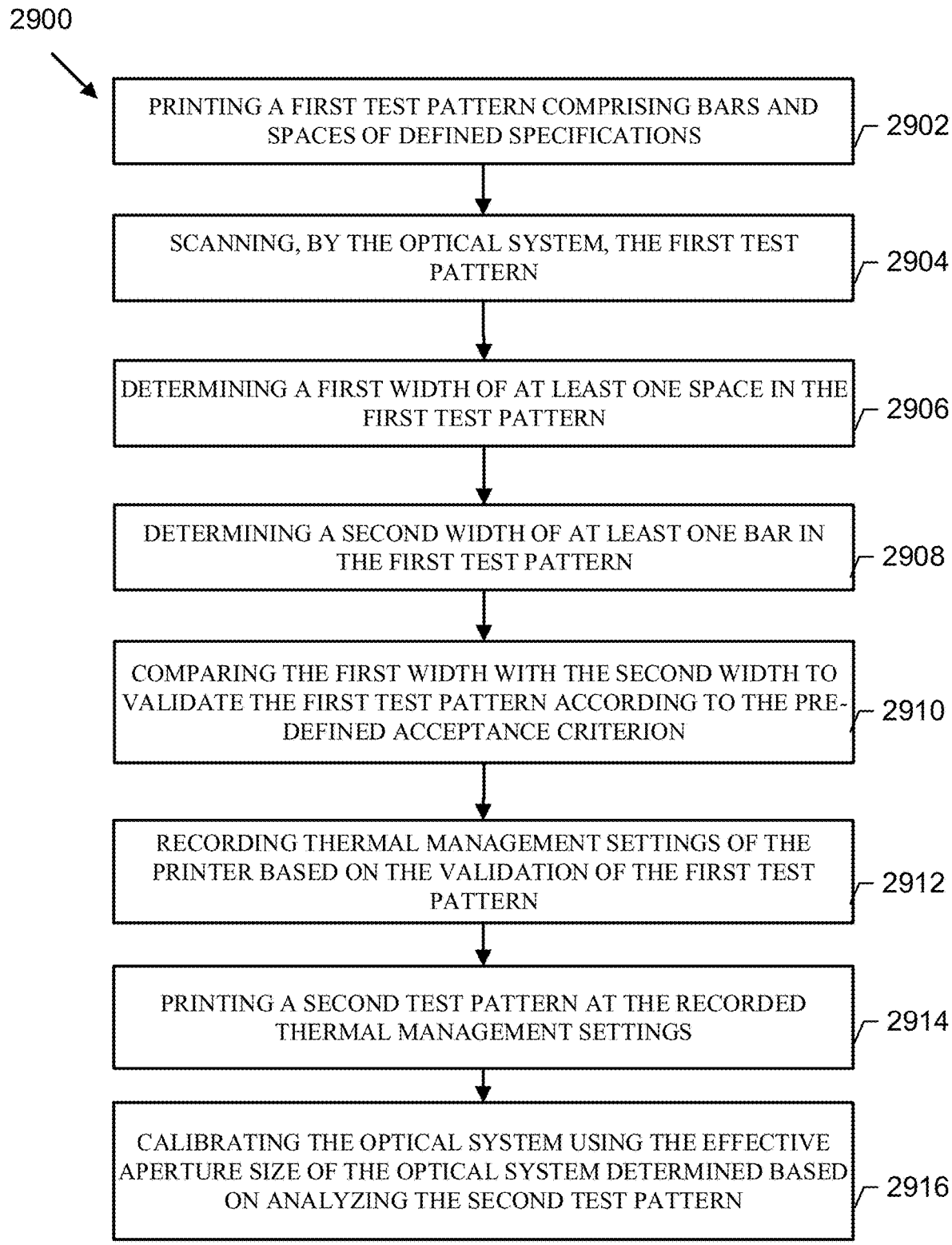
FIG. 29 schematically depicts a flow diagram of a method for characterizing an optical system using self-printed calibration card, in accordance with another example embodiment described herein.

FIG. 29 schematically depicts a flow diagram 2900 of a method for characterizing an optical system, such as the optical system 300, using self-printed calibration card in accordance with another example embodiment described herein.

At step 2902, the printing and verifying system 400 includes means, such as the processing circuitry 304 and/or the processing circuitry 402, to initiate printing of a first test pattern of a defined specification. In one example embodiment, the first test pattern referred herein, may correspond to the pattern 2402 illustrated in FIG. 24A that includes a two-dimensional pattern of alternating black and white squares, e.g., a chessboard pattern. Other similar patterns, e.g., a 2D matrix symbology barcode, can be used. In this pattern, the thermal energy is adjusted so that the white squares and black squares are the same size prior to recording the management settings and creating a second test pattern. In another example embodiment, the first test pattern referred herein, may correspond to the pattern 2404 illustrated in FIG. 24B that includes multiple wide black elements 2405, multiple wide white elements 2407 (or spaces), multiple narrow black elements 2406, and multiple narrow white elements 2408, respectively.

At step 2904, the printing and verifying system 400 includes means, such as the optical system 300, to scan the first test pattern, for instance the test pattern 2404. Moving to step 2906, the printing and verifying system 400 includes means, such as the processing circuitry 304 and/or the processing circuitry 402, to determine a first width of at least one space in the first test pattern. For example, in an embodiment, the processing circuitry 304 and/or the processing circuitry 402 may determine widths of one or more of the wide black elements 2405 in the test pattern 2404. The processing circuitry 304 and/or the processing circuitry 402 may also determine widths corresponding to one or more narrow black elements 2406 in the test pattern 2404.

At step 2908, the processing circuitry 304 and/or the processing circuitry 402 determines a second width of at least one space in the first test pattern. For example, in said embodiment, the processing circuitry 304 and/or the processing circuitry 402 may determine widths of one or more of the wide white elements 2407 in the test pattern 2404. Similarly, in another example, the processing circuitry 304 and/or the processing circuitry 402 may determine widths corresponding to one or more narrow white elements 2408 in the test pattern 2404. Details pertaining to steps 2906 and 2908, i.e. the determination of the first width and the second width of the at least one space and at least one bar in the test pattern respectively, are described in reference to FIGS. 30 and 31.

Moving at step 2910, the processing circuitry 304 and/or the processing circuitry 402 may compare the first width determined from step 2906 with the second width determined from step 2908 to validate the first test pattern according to a pre-defined acceptance criterion. In this regard, in one example embodiment, the pre-defined acceptance criterion may be that width of each wide white space of the first test pattern is to be of an identical size to size of each wide black bar. Additionally or alternatively, in one example embodiment, the pre-defined acceptance criterion may be that width of each narrow white space of the first test pattern is to be of an identical size to size of each narrow black bar. Thus, referring to FIG. 24, in one example, the processing circuitry 304 and/or the processing circuitry 402 may validate the test pattern 2404 if width of each of the wide black elements 2405 is identical to width of wide white elements 2407. Similarly, in another example, the processing circuitry 304 and/or the processing circuitry 402 may validate the test pattern 2404, if width of each of the narrow black elements 2406 is identical to width of narrow white elements 2408.

At step 2912, the printing and verifying system 400 includes means, such as the processing circuitry 304 and/or the processing circuitry 402, to record thermal settings of the printer based on the validation of the first test pattern 2404. In this regard, the thermal settings of the printhead (i.e. heat settings of the printhead at which the first test pattern is validated) may be stored in the memory 310 or 406 of the optical system 300 and the printing subsystem 401, respectively.

Further, at step 2914, the printing and verifying system 400 includes means, such as the processing circuitry 304 and/or the processing circuitry 402, to initiate printing of a second test pattern. In this regard, in accordance with said example embodiments, the second test pattern is printed at the thermal settings of the printhead recorded at step 2716. Here, in accordance with various embodiments described herein, the second test pattern represents a pattern to be printed on a self-printed calibration card for calibrating the optical system 300. In this aspect, in one example, the second test pattern may be printed based on the first test pattern itself, i.e. the second test pattern may include a test element inserted between spaces and bars of the first test pattern. Alternatively, in another example, the second test pattern may be altogether a new pattern having bars and spaces of a specification different than the first test pattern along with a test element. For instance, in an example, the second test pattern may correspond to the pattern 2400c including the test element 2402c, as illustrated in FIG. 24C.

At step 2916, the printing and verifying system 400 includes means, such as the processing circuitry 304 and/or the processing circuitry 402, to calibrate the optical system 300 using the second test pattern. In this regard, the second test pattern may be analyzed using the techniques described in FIGS. 16-21 for determining an effective aperture size for which the optical system 300 may be calibrated.

In accordance with various example embodiments described herein, if at the comparison of step 2910, the processing circuitry 304 and/or the processing circuitry 402 determines that the first width determined at step 2906 is not equal to the second width determined at step 2908, additional steps may be triggered. For instance, in one example embodiment, a notification such as a visual notification, an audio command, a sound and/or the like, may be generated by the processing circuitry 304 and/or the processing circuitry 402 to indicate an adjustment of the thermal settings of the printhead. Alternatively, in another example embodiment, the processing circuitry 304 and/or the processing circuitry 402 may automatically initiate an adjustment of the thermal settings of the printhead of the printing subsystem 401, as described at step 2612 of FIG. 26. In this aspect, in such cases, the thermal settings of the printhead may be adjusted (i.e. increased or decreased), and the steps 2902-2910 may be repeated automatically until a test pattern scanned by the optical system 300 is validated.

Figure 30:
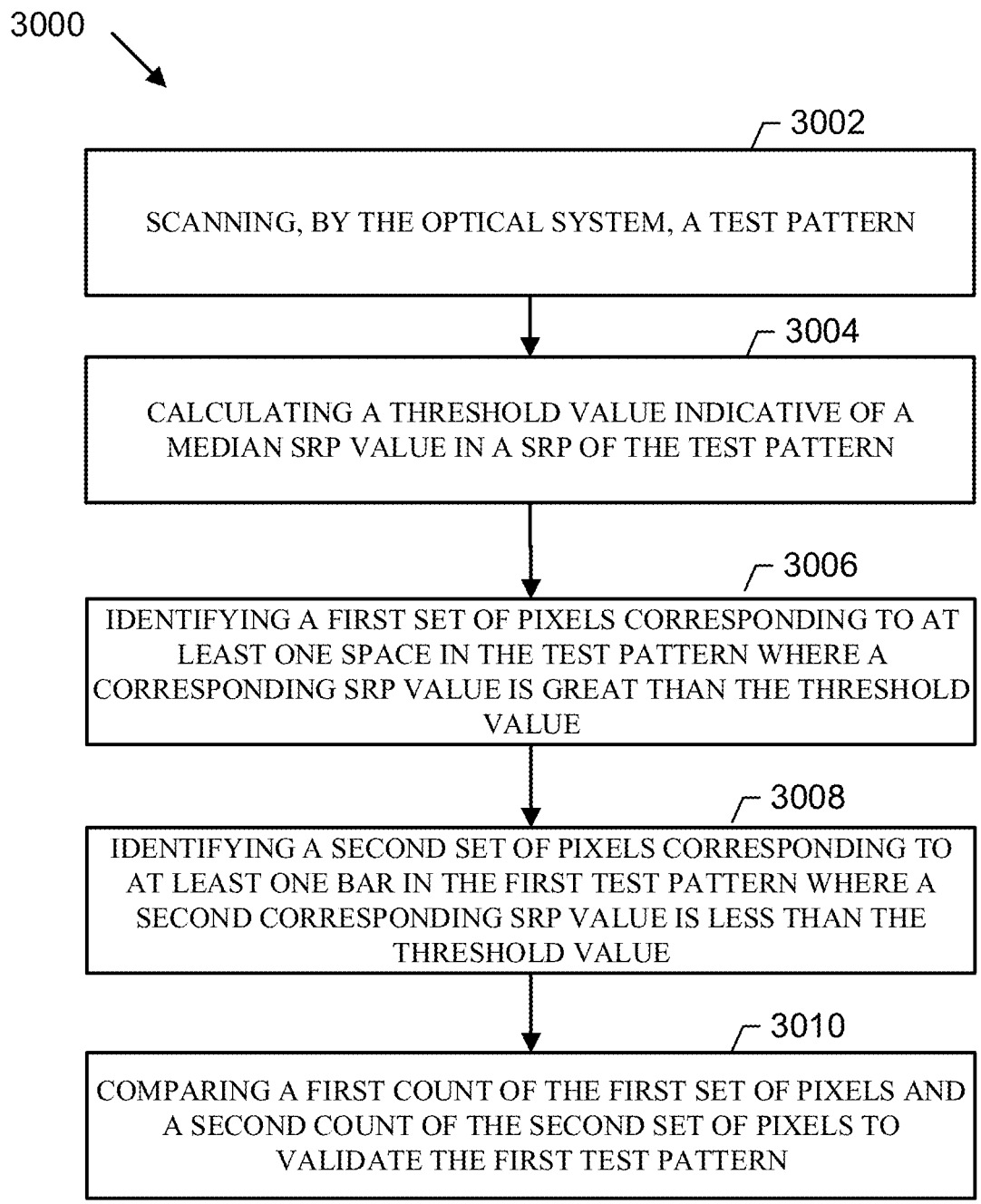
FIG. 30 schematically depicts a flow diagram of a method for determining respective widths of at least one space and at least one bar in a test pattern of a self-printed calibration card used for characterizing an optical system, in accordance with another example embodiment described herein.

FIG. 30 schematically depicts a flow diagram of a method 3000 for determining respective widths of at least one space and at least one bar in a test pattern of a self-printed calibration card used for characterizing an optical system (such as the optical system 300) in accordance with another example embodiment described herein.

At step 3002, the printing and verifying system 400 includes means, such as the optical system 300, to scan a test pattern. For instance, in one example embodiment, the optical system 300 may scan the test pattern 2404 illustrated in FIG. 24.

Figure 31:
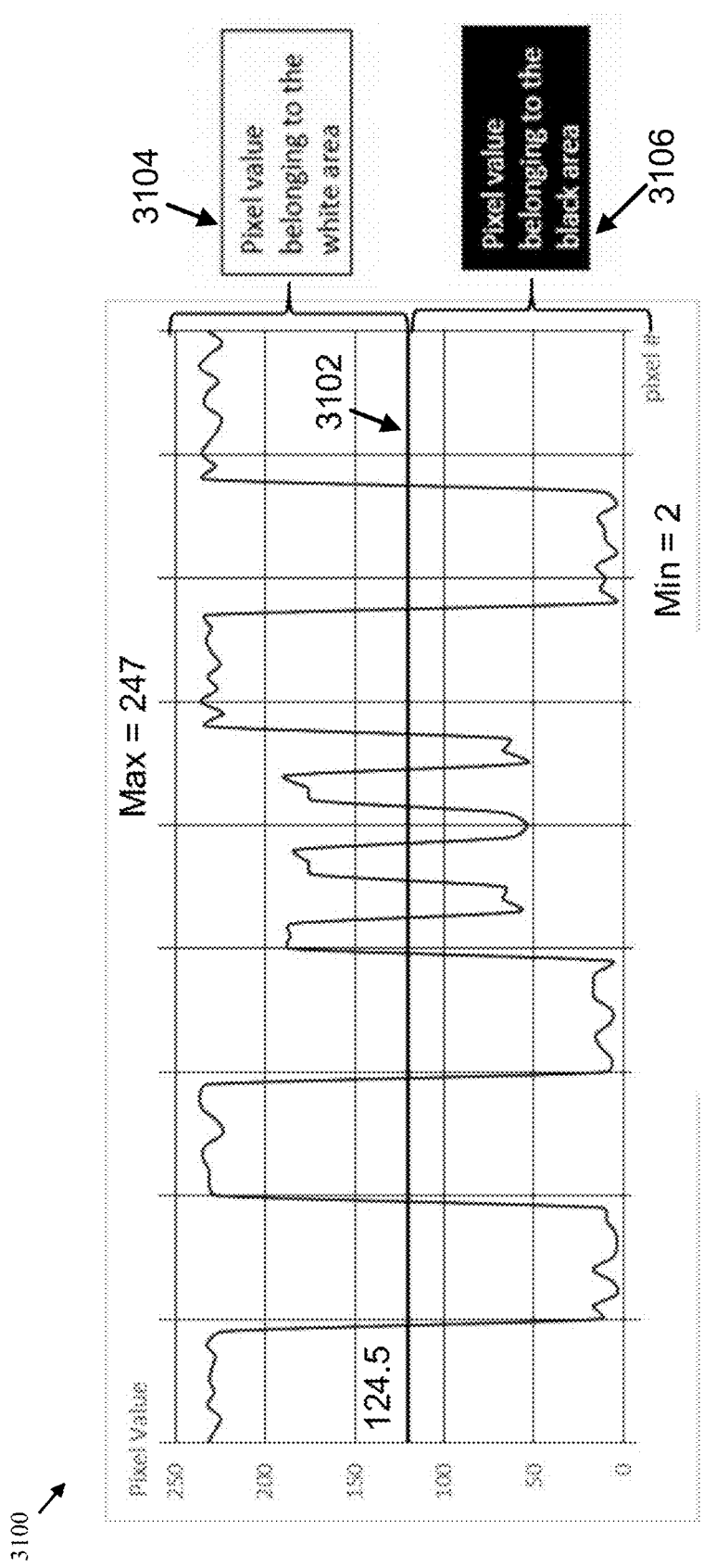
FIG. 31 illustrates another example scan reflectance profile (SRP) generated upon scanning a test pattern by an optical system, in accordance with some example embodiments described herein.

At step 3004, the printing and verifying system 400 includes means, such as the processing circuitry 304 and/or the processing circuitry 402, to calculate a threshold value indicative of a median reflectance value in a SRP of the test pattern scanned from step 3002. Referring to FIG. 31, an example SRP 3100 generated by the processing circuitry 304 and/or the processing circuitry 402 upon scanning the test pattern 2404 is illustrated. The SRP 3100 represents values in pixels corresponding to reflectance from the test pattern 2404 (on the Y axis, in this case with units of 0 to 255) sensed by the one or more optical sensors 302 upon scanning the test pattern 2404 over time or distance (represented on X axis). Illustratively, a midpoint or median SRP 3102 reflectance value is plotted over the SRP 3100. Illustratively, in the SRP 3100, a maximum pixel value 247 is scanned by the optical system 300 and a minimum pixel value 2 is scanned by the optical system 300, therefore the midpoint is 124.5 (e.g., (max+min)/2).

The median SRP 3102, in accordance with said example embodiment, is a threshold representative of values of mid-points between whitest and darkest pixels scanned by the optical system 300. In this aspect, in one example embodiment, a portion 3104 of the SRP 3100 above the median SRP 3102 is representative of pixel values belonging to white area in the test pattern 2404, for example, area belonging to the wide white elements 2407 and/or the narrow white elements 2408 in the test pattern 2404. Accordingly, a portion 3106 of the SRP 3100 below the median SRP 3102 is representative of pixel values belonging to black area in the test pattern 2404, for example, area belonging to the wide black elements 2405 and/or the narrow black elements 2406 in the test pattern 2404.

At step 3006, the processing circuitry 304 and/or the processing circuitry 402 may identify a first set of pixels corresponding to at least one space in the test pattern where a corresponding SRP value is greater than the threshold value, i.e. the median SRP 3102. Accordingly, at step 3008, the processing circuitry 304 and/or the processing circuitry 402 may identify a second set of pixels corresponding to at least one bar in the test pattern where a corresponding SRP value is less than the threshold value, i.e. the median SRP 3102.

In this aspect, referring to SRP 3100 of FIG. 31, all pixel values that are above the median SRP 3102 may correspond to the first set of pixels, and all pixel values that are below the median SRP 3102 may correspond to the second set of pixels. Here, the first set of pixels may represent pixel values corresponding to scanning of white area in the test pattern, such as the wide white elements 2407 and narrow white elements 2408 of the test pattern 2404. Also, the second set of pixels may represent pixel values corresponding to scanning of black area in the test pattern such as, the wide black elements 2405 and the narrow black elements 2406 in the test pattern 2404. In this regard, a count of the first set of pixels and a count of the second set of the pixels may be used for determining a consistent and reproducible heat setting for the white elements and the black elements respectively in the test pattern.

Upon identifying the first and second set of the pixels, at step 3010, the processing circuitry 304 and/or the processing circuitry 402 may compare a first count of the first set of pixels and a second count of the second set of pixels. In this regard, in an example embodiment, upon identifying the first set of pixels corresponding to the white elements, the processing circuitry 304 and/or the processing circuitry 402 may validate the test pattern in an instance when, based on the comparison, it is identified that the first count is identical to the second count. In another example embodiment, the processing circuitry 402 may validate the test pattern if a difference between the first count and the second count is within a pre-defined range.

If, based on the comparison, the test pattern is validated, then steps 2912-2916 of the flow diagram 2900 may be performed. Alternatively, if, based on the comparison, the test pattern is not validated, the thermal settings of the printing subsystem may be adjusted, and steps 2612-2606 may be performed until a test pattern printed by the printing subsystem 401 is validated.

In another example embodiment, to calculate a count of pixels representing the white elements (such as the wide white elements 2407 and narrow white elements 2408 of the test pattern 2404) and a count of pixels representing the black elements (such as the wide black elements 2405 and/or the narrow black elements 2406 in the test pattern 2404) in the test pattern, the processing circuitry 304 and/or the processing circuitry 402 may utilize a table. In this regard, upon scanning the test pattern by the optical system 300, the processing circuitry 304 and/or the processing circuitry 402 may determine a pixel value difference from one pixel and a neighboring pixel in a scan profile from the table. In this regard, the table may store values of pixel 3206 representing reflectance values sensed by each of the one or more optical sensors 302 of the optical system 300 upon scanning a printed image including the test pattern, such as the test pattern 2404.

Figure 32:
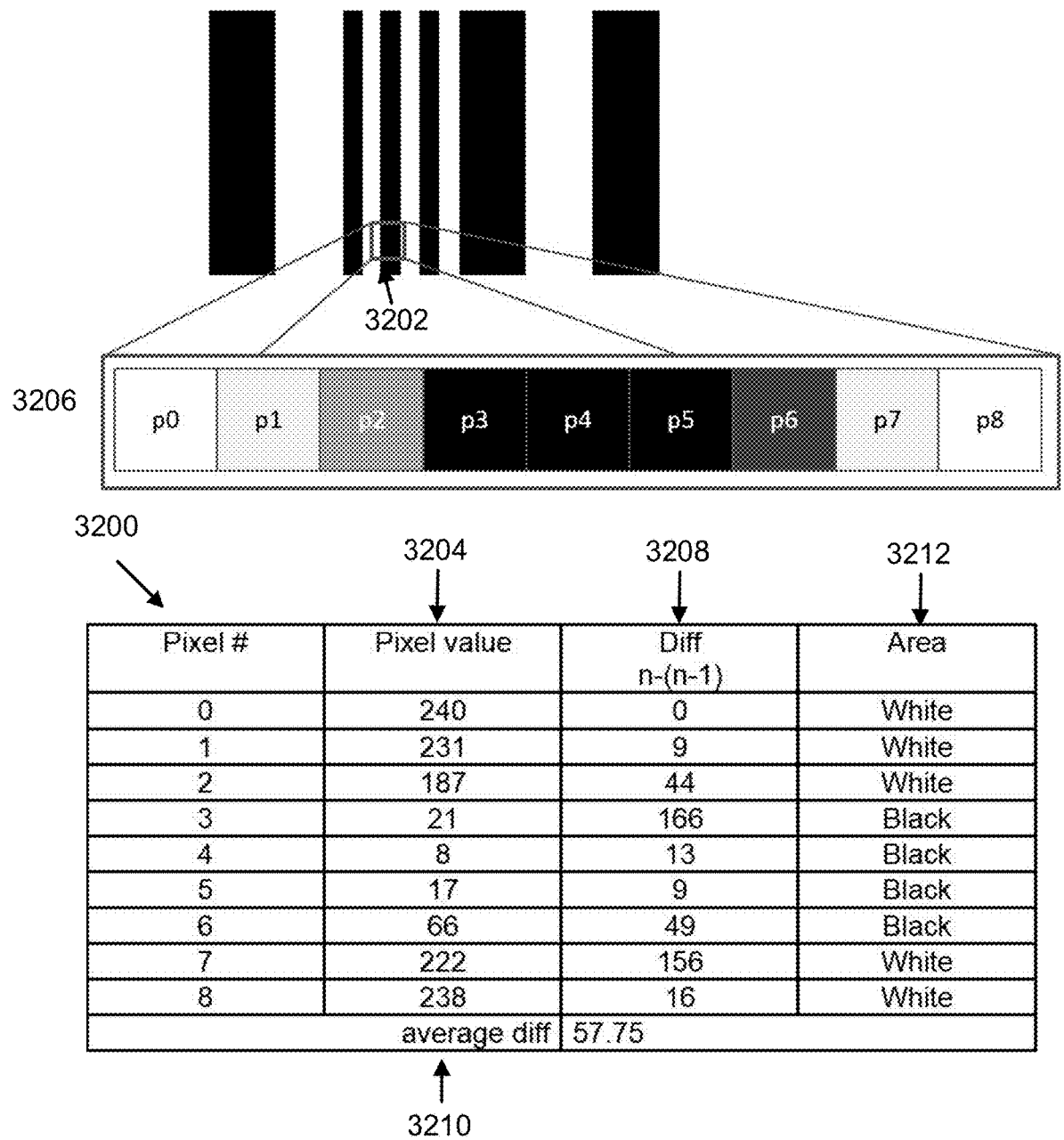
FIG. 32 illustrates an example table accessed by a printing and verifying system for determining count of pixels corresponding to white elements and count of pixels corresponding to black elements upon scanning a test pattern, in accordance with some example embodiments described herein.

For instance, referring to FIG. 32, a table 3200 may be accessed by the processing circuitry 304 and/or the processing circuitry 402 that may include a range of pixel values 3204 of pixels 3206 represented as $P_0, P_1, P_2, \ldots P_n$ for a portion 3202 (and correspondingly for all similar portions of the test pattern). For each pixel in the pixels 3206, the processing circuitry 304 and/or the processing circuitry 402 may determine differences 3208 between the respective pixel and an adjacent pixel, for example differences 3208 such as, $(P_0-P_1), (P_1-P_2) \ldots (P_{n-1}-P_n)$ for the portion 3202 (and all such portions of the test pattern). The differences 3208 between values of neighboring pixels in the table may be used to determine an average value 3210 representing an average of values corresponding to the differences 3208 stored in the table 3200. For example, as illustrated, the average value 3210 "57.75" represents an average computed from the differences 3208 having values 0, 9, 44, 166, 13, 9, . . . , 16.

In this aspect, based on each pixel 3206 ($P_0$, $P_1$, $P_2$, . . . . $P_n$), the processing circuitry 304 and/or the processing circuitry 402 may determine flags 3212 indicating if the respective pixel corresponds to a white element or a black element in the test pattern. The determination of the flags 3212 may be based on identifying if a value of the differences 3208 for respective pixels 3206 is greater than or smaller than the average value 3210.

For instance, a pixel $P_0$ from the pixels 3206 is flagged as either "white" or "black" if the value of the respective difference 3208 is smaller than the average value 3210. Alternatively, a pixel $P_3$ from the pixels 3206 is flagged as changing from "black" to "white" or vice versa if the value of the respective difference 3208 is greater than the average value 3210. As shown in FIG. 32, pixel $P_1$ is flagged as "white" because it has a high reflectance value and $P_1$ remains as "white", as the difference 3208 value "9" is lower than the average value 3210 "57.75." Pixel $P_3$ is flagged as "black" as the difference 3208 value "166" is greater than average value 3210 "57.75." The processing circuitry 304 and/or the processing circuitry 402 may then determine a first count of pixels from the pixels 3206 that are flagged as "white" and a second count of pixels from the pixels 3206 that are flagged as "black." The first count and the second count may then be compared as described at step 3010 of FIG. 30 to validate the test pattern.

2. Verification Requirements

Figure 33:
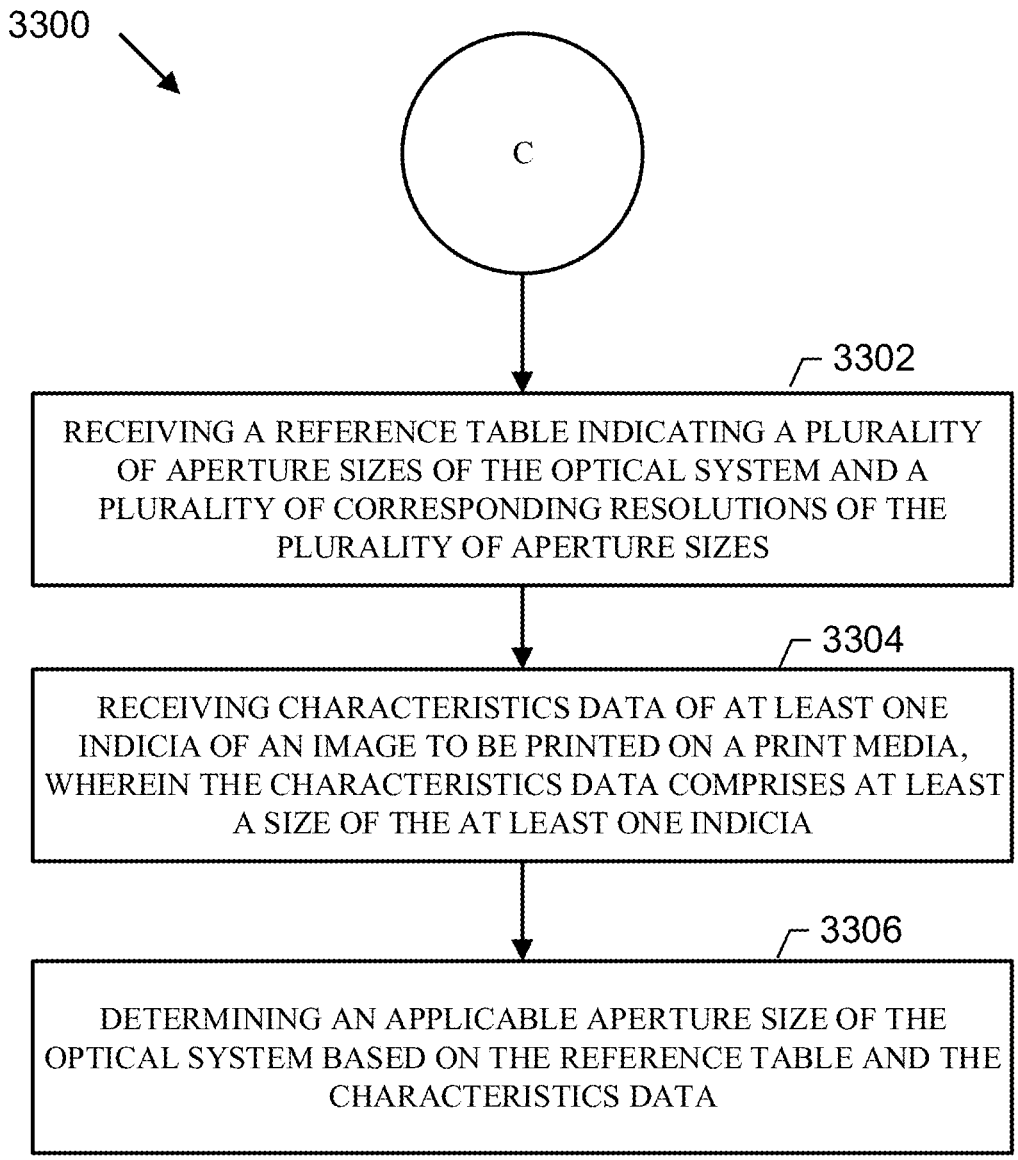
FIG. 33 schematically depicts a flow diagram of a method for characterizing an optical system based on characteristics of an image to be printed, in accordance with some example embodiments described herein.

FIG. 33 schematically depicts a flow diagram of a method 3300 for characterizing an optical system such as the optical system 300 based on characteristics of an image to be printed, in accordance with some example embodiments. In one example embodiment, the method 3300 may start from pointer C that in connection with step 2110 after the step 2108 described in FIG. 21. Referring to the step 2110 of FIG. 21, the processing circuitry 304 and/or the processing circuitry 402 analyzes a printed image or an image to be printed to determine different verification requirements for scanning the printed image by the optical system 300. In this regard, to determine verification requirements with respect to characteristics of at least one indicia to be printed on the image, steps 3302-3306 of the method 3300 may be performed.

Figure 34:
FIG. 34 illustrates an example reference table used by a printing and verifying system for determining an effective aperture size and correspondingly an effective resolution for calibrating an optical system, in accordance with some example embodiments described herein.

Referring to FIG. 33, at step 3302, the processing circuitry 304 and/or the processing circuitry 402 may receive a reference table indicating a plurality of aperture sizes of the optical system 300 and a plurality of corresponding resolutions of the plurality of aperture sizes. FIG. 34 illustrates an example reference table 3400 that may be received by the processing circuitry 304 and/or the processing circuitry 402 at step 3302. Illustratively, the reference table 3400 includes values of aperture sizes such as, 8.8 mils, 4.7 mils, 2.4 mils, respectively applicable for different values of the resolution, i.e. 300 dpi, 600 dpi, 1200 dpi, at which the optical system 300 may scan a printed image. In this regard, according to various embodiments described herein, the different effective aperture sizes in the reference table 3400 can be computed based on techniques described in reference to FIGS. 17-22 (i.e. based on creating a reference graph and utilizing the reference graph to interpolate effective aperture sizes of the optical system 300).

Figure 36A:
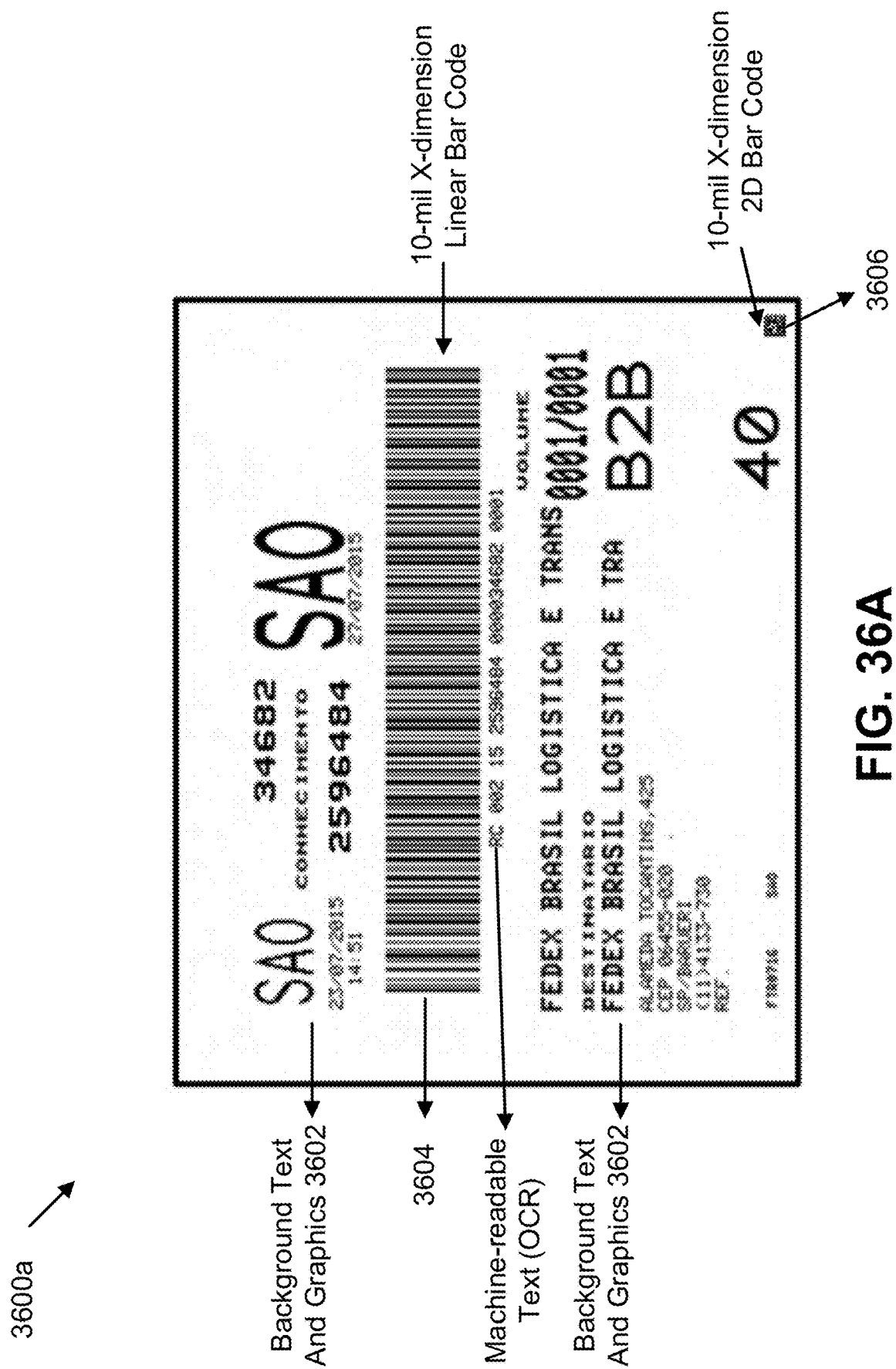
FIG. 36A illustrates an example image to be printed by a printer and scanned by a verifier in a printing and verifying system, in accordance with some example embodiments described herein.

At step 3304, the processing circuitry 304 and/or the processing circuitry 402, may receive characteristics data of at least one indicia to be printed on a print media. FIG. 36A illustrates an example image 3600a that is to be printed by the printing subsystem 401. The image 3600a includes for example, background text and graphics 3602, such as text corresponding to address of logistics, date etc. Illustratively, the image 3600a also include one or more indicia, for example, a linear barcode (e.g., Code 128) 3604, a QR code (e.g., Data Matrix) 3606, text characters 3602 and/or the like. In this regard, in accordance with various example embodiments described herein, the characteristics data of the image may include at least a size of the at least one indicia that is to be printed on a label of the print media. For example, in one embodiment, the characteristics data may correspond to a size of the average narrow bar and space of the linear barcode 3604.

In accordance with said example embodiments, information from the printer's image buffer including one or more print jobs that defines characteristics of items such as, but not limited to, text, barcodes, QR codes, etc. to be printed on the label. These information may be utilized for determining the characteristics data. For example, in one embodiment, a print job defined for printing the image 3600a including the linear barcode 3604 and the QR code 3606, may be analyzed to determine the characteristics data such as, but not limited to, a feature size of the linear barcode 3604 or a size of the QR code 3606, e.g., the X-dimension. Additionally and/or alternatively, the characteristics data may also include determining a type of an indicia to be printed. In this aspect, these characteristics associated with the images to be printed on a label of the print media are known to the printing subsystem 401 (i.e. before printing or at the time of printing) before the optical system 300 scans the printed image because it is what the printer is programmed to print.

In accordance with said example embodiments, these characteristics of a reference image (i.e. a candidate image that is to be printed next) are determined based on accessing information such as, but not limited to, the print job in an image buffer of a thermal printer. For example, in one embodiment, from the memory 406 of the printing subsystem 401, data related to printing of images may be analyzed to determine a size of the indicia that is to be printed next on a label of the print media by the printing subsystem 401. For example, the processing circuitry 304 and/or the processing circuitry 402 may determine that a linear barcode of X-dimension size 3 mils is to be printed on the print media. In accordance with various example embodiments described herein, the determination of the characteristics data associated with the printed image may be performed at a run-time, i.e. at a time of printing a printed image and/or scanning the printed image to determine a required effective aperture size of the optical system 300.

At step 3306, the processing circuitry 304 and/or the processing circuitry 402 may determine an applicable aperture size of the optical system 300 based on the reference table and the characteristics data from step 3304. This determination may be performed using information of the printing subsystem 401 according to an application standard. For example, a 10-mil X-dimension barcode in the image to be printed and scanned by the optical system 300 (in accordance with an application standard) may need a 6-mil aperture size of the optical system 300. Similarly, same barcode, i.e. 10-mil X-dimension barcode in the image without an application standard, may require 8-mil aperture size of the optical system 300.

In accordance with various example embodiments described herein, because a physical aperture size of each of one or more optical sensors 302 of the optical system 300 is always unchanged, the physical aperture size can be increased into a virtual aperture size by changing mathematically a resolution at which the optical system 300 scans the printed image. By using a reference table that includes different effective aperture size values applicable for different resolutions, the physical aperture size of the optical system 300 can be adjusted to different virtual aperture sizes that are greater than the physical aperture at which scanning of the printed image is desired.

In accordance with said example embodiments, an effective aperture size of the optical system 300 may be changed and/or interpolated to another value by changing a resolution such that the optical system 300 may be operated at different virtual aperture sizes irrespective of one physical aperture size of the optical system 300. In this aspect, based on utilizing information such as the characteristics data from a printer's image buffer (i.e. based on the characteristics data such as a size of the barcode to be printed in the printed image), a verifier (for example, the optical system 300) can be configured to operate at a desired resolution and aperture size before scanning the printed image. Since conventional techniques involving mathematical operations that effectively change the resolution, e.g., Gaussian blurring, are always less accurate than capturing an image with the correct physical aperture, it is desired to have a physical aperture of the verifier that is closest but less than or equal to a desired virtual aperture. In this way, while using such conventional techniques, an amount of mathematical adjustment of the physical aperture is minimized and the verifier can be calibrated accurately. Thus, any of the processing circuitry 304 and/or the processing circuitry 402 can automatically select an appropriate resolution for an optimal physical aperture size according the barcode size, and therefore provide a more accurate and repeatable barcode verification grade.

In some example embodiments, upon performing the steps 3302-3306, the processing circuitry 304 and/or the processing circuitry 402 may also utilize other techniques such as "software blurring", "circular blurring" and the like to effect small changes to the aperture size for the closest possible desired aperture size with the least variation from an ideal aperture size.

Figure 35:
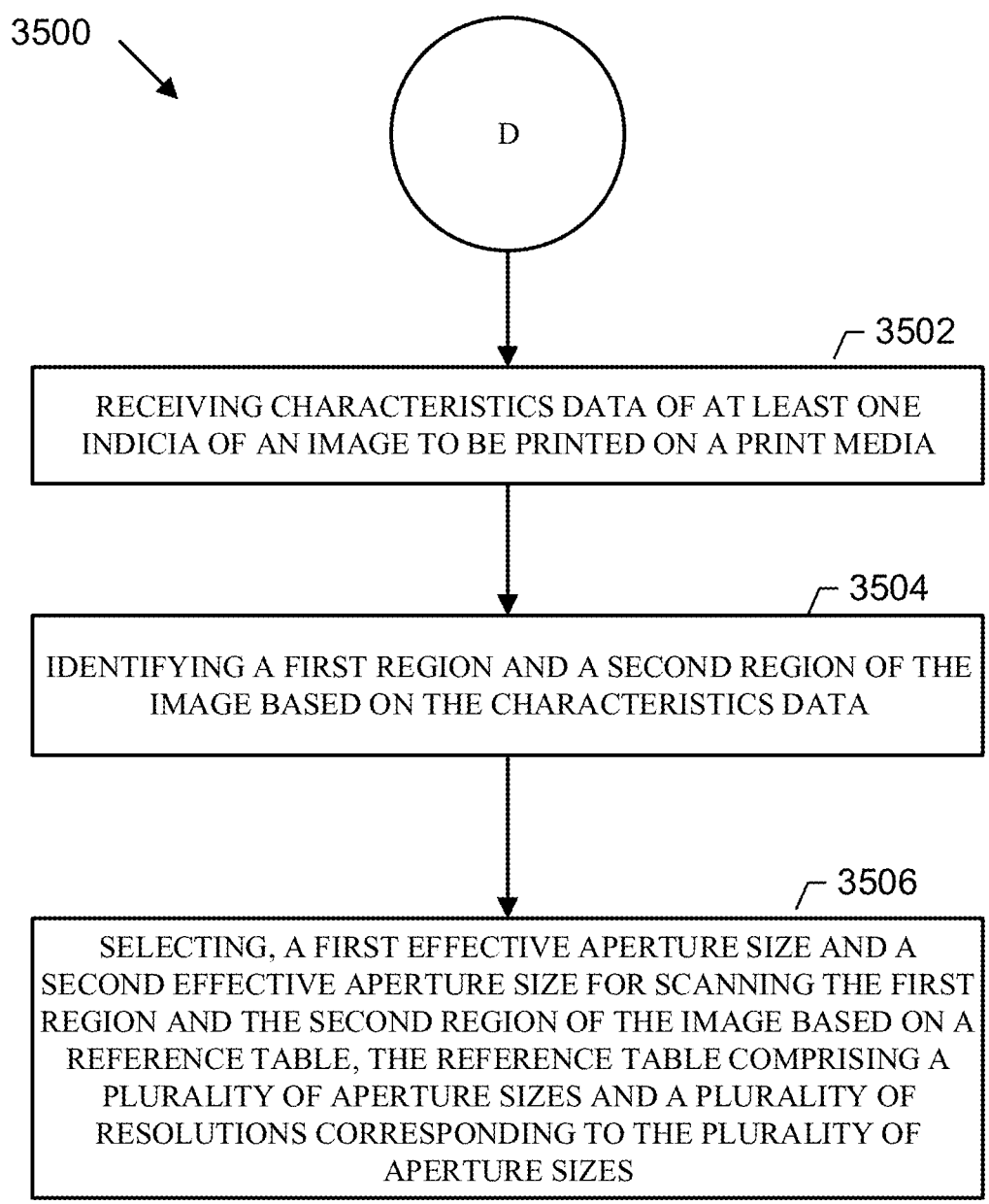
FIG. 35 schematically depicts a flow diagram of a method for characterizing an optical system based on characteristics of an image to be printed, in accordance with some example embodiments described herein.

FIG. 35 schematically depicts a flow diagram of a method 3500 for characterizing an optical system (such as the optical system 300) based on characteristics of an image to be printed, in accordance with some example embodiments. In one example embodiment, the method 3300 may start from pointer D in connection with step 2110 after step 2108 described in FIG. 21. In this regard, referring to the step 2110 of FIG. 21, as described earlier, the processing circuitry 304 and/or the processing circuitry 402 analyzes a printed image and/or an image to be printed to determine different verification requirements for scanning the printed image or the image to be printed by the optical system 300. In this regard, steps 3502-3506 of the method 3500 may be performed to determine verification requirements associated with regions of the printed image.

Referring to FIG. 35, at step 3502, the processing circuitry 304 and/or the processing circuitry 402 may receive characteristics data associated with an image to be printed on a print media. In accordance with said example embodiments, the characteristics data may be associated with at least one indicia on the image, and may be received based on analyzing a reference image. For example, a candidate image in the image buffer of the memory 406 of the printing subsystem 401 (which is to be printed next by the printing subsystem 401) may be analyzed to receive the characteristics data. Thus, in accordance with various example embodiments described herein, the characteristic data may be determined based on accessing information available within the printing subsystem 401 (for example, but not limited to, one or more print jobs defining the image to be printed in an image buffer of a thermal printer).

In another example embodiment, the receiving of the characteristics may also include identifying of a type of information (such as, text, barcode, etc.) present in the image to be printed. For instance, referring to FIG. 36A, the processing circuitry 304 and/or the processing circuitry 402 may identify the to be printed image 3600a that includes different types of information, such as the background text and graphics 3602, the linear barcode 3604, the QR code 3606, and/or other types of content. In another example, the characteristic data may also include different parameters such as, but not limited to, resolutions requirements associated with different regions of the image in order to meet a desired scan quality. For example, the characteristics data may correspond to resolution requirements of the optical system 300 for scanning regions including each type of information, such as the background text and graphics 3602, the linear barcode 3604, the QR code 3606 that is to be printed in the image 3600a. In this regard, while defining an image to be printed on a label of the print media, information about different areas (such as, areas of high resolution activity, medium resolution activity, and low resolution activity of the image) is accessible to at least one of the processing circuitry 304 of the optical system 300 and/or the processing circuitry 402 of the printing subsystem 401.

Moving to step 3504, the processing circuitry 304 and/or the processing circuitry 402, may identify at least, a first region, a second region, a third region, and/or the like of the image based on the characteristics data determined at step 3502. For example, in one embodiment, referring to FIG. 36B, the processing circuitry 304 and/or the processing circuitry 402 may identify a first region 3602b, a second region 3604b, a third region 3606b, and/or the like in the image 3600b. In this aspect, the first region 3602b, the second region 3604b, and the third region 3606b may be identified based on the characteristic data, such as resolution requirements associated with scanning the respective regions or a type of information to be printed in the respective regions.

For verifying a printed label against a desired print quality, the printed image is to be scanned by the optical system 300 having an "effective aperture size" at a "defined resolution." For example, a 10-mil aperture size of an optical system 300 of 300 dpi resolution scan capability may be applicable for scanning the first region 3602b of the image 3600b that includes only text; whereas a 15 mils aperture size of an optical system 300 of a 600 dpi resolution scan capability may be applicable for scanning the second region 3604b of the image 3600b that includes a linear barcode. Similarly, for scanning the third region 3606b, an optical system of resolution capability 1200 dpi may be required.

However, many conventional scanners, can only scan a printed image at one resolution (for instance, at 600 dpi or 1200 dpi) for full scan of the image, irrespective of verifying requirements such as resolution of different portions of the printed image. This results in slowing up of the printing and or verification speed of printer-verifiers, e.g., a 1200 dpi image is much slower to image process than a 300 dpi image, and imposing challenges on syncing up a printing speed of a printer with a verification speed at which the verifier scans the printed labels for quality check.

For scanning effectively by the optical system 300 so as to verify a printed image against a desired print quality standard without impacting a verification and or printing speed, different regions within an image may be identified based on resolution requirements. In this regard, based on a print quality standard and respective verification requirements of a verifier, in the image 3600*b* that is to be printed on the print label, the first region 3602*b* (including the background text and graphics) may be scanned by an optical system 300 at a lower resolution when compared to a resolution required for scanning the second region 3604*b* (including the linear barcode 3604*b* or the third region 3606*b* including the QR code 3606*b*).

Similarly, for effectively scanning the image 3600*b* that is printed on the print label, the second region 3604*b* (including the linear barcode 3604*b*) may be scanned by an optical system 300 at a lower resolution compared to a resolution required for scanning the third region 3606*b* (including the QR code 3606*b*). In this regard, in accordance with said example embodiments, the processing circuitry 304 and/or the processing circuitry 402 may identify various regions such as, but not limited to, the first region 3602*b*, the second region 3604*b*, the third region 3606*b*, based on resolution requirements of scanning the image 3600*b* when printed on the print media. In an example, the first region 3602*b* may be identified to be scanned at a lower resolution by the optical system 300, the second region 3604*b* may be identified to be scanned at a medium resolution by the optical system 300, and the third region 3606*b* may be identified to be scanned at a high resolution by the optical system 300.

Moving to step 3506, the processing circuitry 304 and/or the processing circuitry 402 may select a first effective aperture size and a second effective aperture size of the optical system 300 for scanning different regions in the printed image. The "effective" aperture size referred herein corresponds to an aperture size of the optical system 300 at which an indicia (such as, but not limited to, a barcode, an OCRB or a QR code etc.) on a printed image can be scanned accurately for verification of the printed image according to a print quality standard.

In accordance with some example embodiments, the selection of aperture size may be based on a resolution setting at which the optical system 300 is desired to scan a region of the image. For example, using a reference table, the first effective aperture size may be selected for scanning the first region 3602*b* and the second effective aperture size may be selected for scanning the second region 3604*b*. The reference table referred herein may include multiple effective aperture sizes and multiple resolutions corresponding to the respective aperture sizes.

FIG. 34 illustrates an example reference table 3400 that may be accessed by the processing circuitry 304 and/or the processing circuitry 402 for selecting the first effective aperture size and the second effective aperture size of the optical system 300. In this regard, according to various embodiments described herein, the different effective aperture sizes and different resolutions applicable for each of the respective aperture size in the reference table can be computed based on techniques described earlier in reference to FIGS. 17-22 (i.e. based on creating a reference graph and utilizing the reference graph to interpolate effective aperture sizes of the optical system 300).

In accordance with said example embodiments, upon selecting the first effective aperture size for the first region 3602*b*, the second aperture size for the second region 3604*b*, and the third aperture size for the third region 3606*b*, the processing circuitry 304 and/or the processing circuitry 402 may initiate a characterization of the optical system 300. The characterization of the optical system 300 includes calibrating the optical system 300 for scanning the printed images. In calibration, the optical system 300 can be configured to scan (a) the first region 3602*b* of the printed image 3600*b* at the first aperture size based on a first resolution, (b) the second region 3604*b* of the printed image 3600*b* at the second aperture size based on a second resolution, and (c) the third region 3606*b* of the printed image 3600*b* at the third aperture size based on a third resolution.

Figure 37:
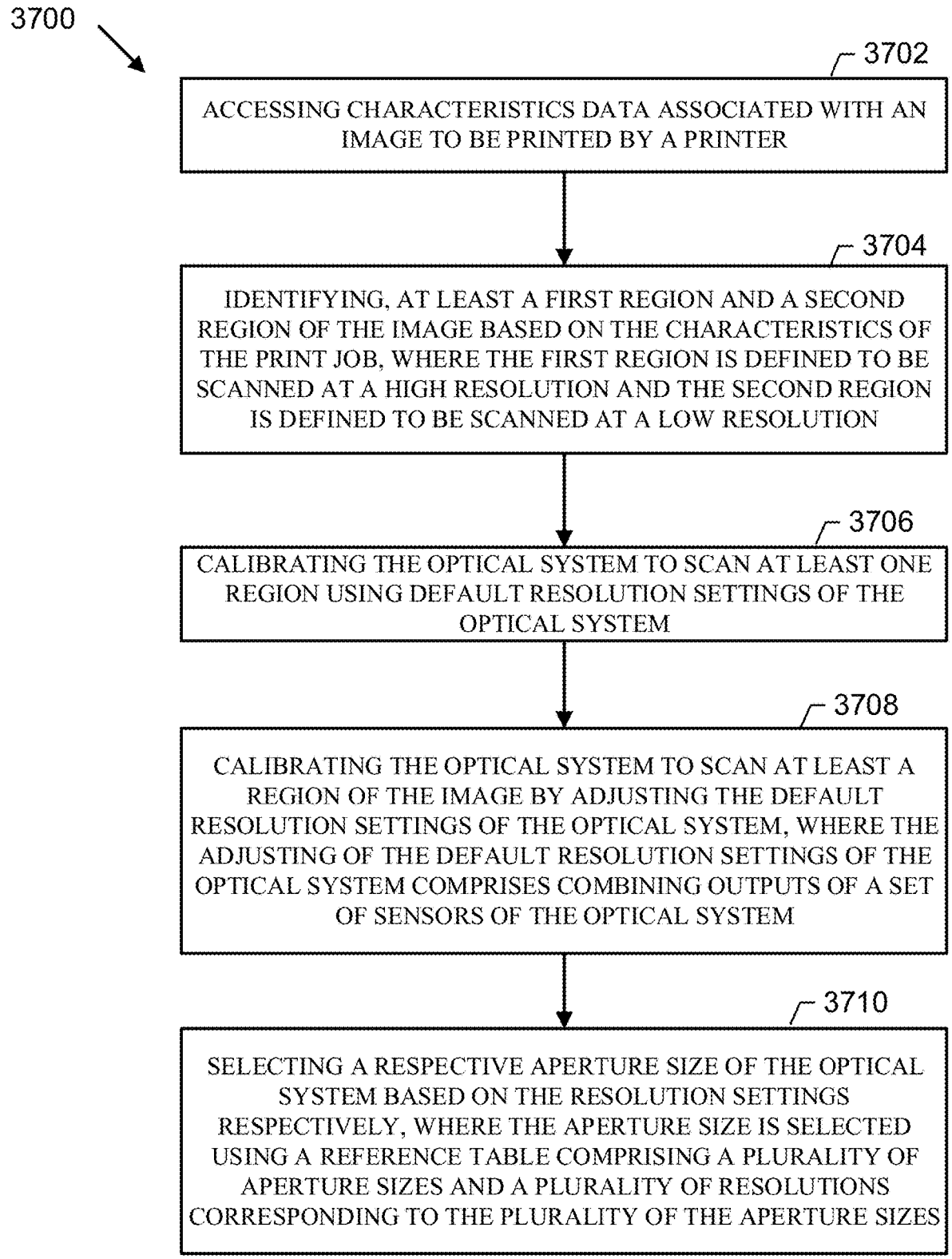
FIG. 37 schematically depicts a flow diagram of a method for characterizing an optical system based on resolution requirements of different regions in a printed image, in accordance with some example embodiments described herein.

Because physical aperture size of each one or more optical sensors 302 of the optical system 300 is always unchanged, the physical aperture size can be changed into another physical aperture size using physical and or software techniques such as "pixel binning," the details of which are further described in reference to FIG. 37. In this aspect, in accordance with some example embodiments, outputs of one or more optical sensors of a verifier (such as the optical system 300) may be combined based on a resolution requirements for scanning a respective region within the printed image. In other words, the optical system 300 configures a physical aperture of the one of more optical sensors 302 such that two or more sensor elements are combined, i.e., averaged, to be a larger desired aperture using techniques such as "pixel binning" so as to minimize a required mathematical image processing requirement in order to produce the relevant print quality analysis and or other printer functional analysis.

In some example embodiments, the processing circuitry 304 of the optical system 300 may itself initiate combination of output signals of the one or more individual optical sensors 302, such that signal values representing a combination of sensor outputs are accessed by the processing circuitry 402 of the printing subsystem 401 and stored in the memory 406. In another example embodiment, the processing circuitry 402 of the printing subsystem 401 may access signal values corresponding to each of the optical sensors 302 of the optical system 300, which may be stored in the memory 406. Further, the processing circuitry 402 may access from the memory 406 the signal values, and thereafter perform combination of the signal values before initiating an image processing operation related to verification of the print media. In other words, prior to verification or other image analysis, an amount of image data to be processed is minimized to be only what is required for each region of the printed label, thereby maximizing printer and verification throughput.

FIG. 37 schematically depicts a flow diagram of a method 3700 for characterizing the optical system 300 and improving image processing efficiency based on resolution requirements of different regions in a printed image, in accordance with some example embodiments.

At step 3702, the processing circuitry 304 and/or the processing circuitry 402 may access characteristics data associated with an image to be printed by the printing subsystem 401. In this regard, the characteristics data may include one or more resolution requirements for scanning different regions of the image to be printed.

Figure 36B:
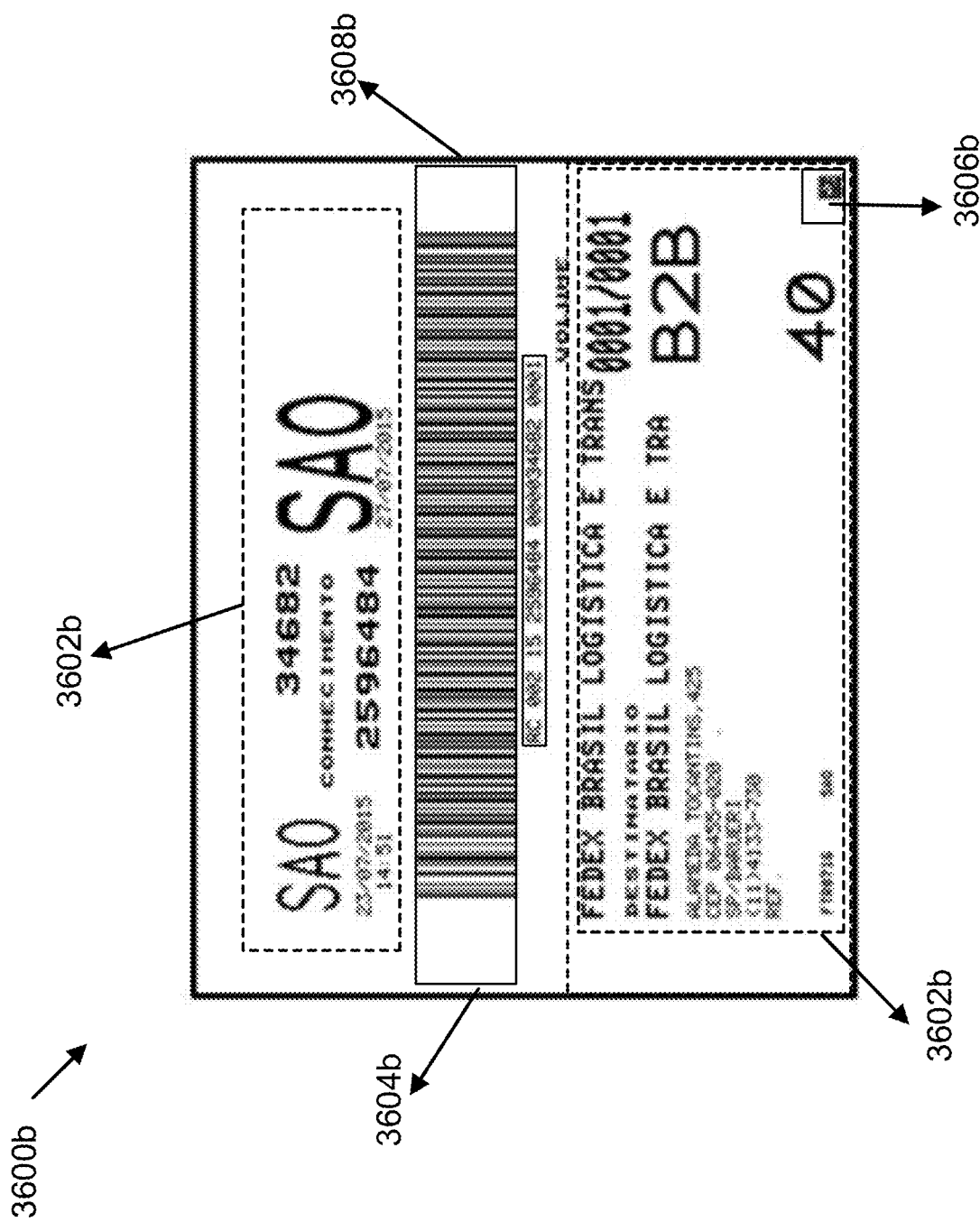
FIG. 36B illustrates identification of one or more regions in the image based on characteristic data associated with respective regions, in accordance with some example embodiments described herein.

For example, referring to FIGS. 36A and 36B, the to-be-printed images 3600*a* and 3600*b* may include one or more regions having different types of information to be printed. In this aspect, the resolution requirements may correspond to a minimum resolution at which the optical system 300 may be operable to effectively scan the respective region. For example, in an effective scanning of the printed image, the first region 3602*b* of the image 3600*b* may be required to be scanned at a low resolution such as, but not limited to, a 300 dpi or 400 dpi configuration for the optical system 300, whereas, the second region 3604*b* may require scanning at a medium resolution like, but not limited to a 600 dpi configuration of the optical system. Similarly, the third region 3606*b* including the 10-mil QR code may require scanning at a high resolution such as a 1200 dpi configuration of the optical system. The processing circuitry 304 and/or the processing circuitry 402 may derive the characteristics data based on analyzing information within the printing subsystem 401 as described above, for instance, by analyzing one or more print jobs defining specification of the image to be printed.

Moving to step 3704, the processing circuitry 304 and/or the processing circuitry 402 may identify different regions of the images 3600*a* and 3600*b* based on the characteristics data associated with the respective regions. For instance, in one example embodiment, the processing circuitry 304 and/or the processing circuitry 402 may identify at least, the first region 3602*b* and the second region 3604*b* of the image 3600*b* based on the characteristics data such as, the resolution requirements described at the step 3702. Additionally and/or alternatively, the processing circuitry 304 and/or the processing circuitry 402 may identify the third region 3606*b* and more such regions of the image 3600*b* based on the characteristics data associated with each of the respective regions.

In some example embodiments, these regions may be boxed on a display associated with the printing subsystem. For example, each of the first region 3602*b*, the second region 3604*b*, the third region 3606*b* may be visually demarcated in the printed image 3600*b*. As these regions are identified, the processing circuitry 304 and/or the processing circuitry 402 may flag each of these regions depending upon a resolution activity associated with the respective regions.

For example, the first region 3602*b* may be flagged as a "low-resolution activity region" as no specific text analysis is required to be performed at such regions and where a lower resolution scan is suitable for printer diagnostics functions. The second region 3604*b* may be flagged as a "medium resolution activity region" as some text processing (such as optical character recognition (OCR)) may be required to be performed at such regions. The third region 3606*b* may be flagged as a "high-resolution activity region" as the small feature size, e.g., X-dimension, requires high resolution image processing and decoding of data upon scanning of such region.

In some examples, the low-resolution activity region of the image 3600*b* may correspond to such regions that include information pertaining to diagnoses functions (such as, information used by a printer's verifier device for determining printhead contamination and various ribbon malfunctions (e.g. ribbon wrinkle)). In some examples, the medium-resolution activity region of the image 3600*b* may correspond to regions that include information such as linear barcode or 2D barcodes with X-dimensions greater than 15 mils. Also, in some examples, high resolution activity region of the image 3600*b* may correspond to regions that include information such as a QR Code or 2D barcodes with X-dimensions smaller than 10 mils or 1D barcodes with X-dimensions less than 7 mils.

In some example embodiments, the processing circuitry 304 and/or the processing circuitry 402 may extend a boundary of a region identified at step 3704 to a full width of a label of the print media when the information pertaining to the identified region meets a threshold. For example, the processing circuitry 304 and/or the processing circuitry 402 may extend the boundary of an identified region to full width of a label of the print media when the information pertaining to the identified region is greater than 80% of a full width of the label. Illustratively, in FIG. 36B, the processing circuitry 304 and/or the processing circuitry 402 may extend the boundary of the initially identified first region 3602*b* to a region 3608*b* which covers a full width of the label.

At step 3706, the optical system 300 may be calibrated to scan at least a region of the image at a default resolution settings of the optical system 300. For instance, if the optical system 300 is by default configured to scan at 1200 dpi resolution settings, instead of scanning the full image at the default resolution settings (i.e. 1200 dpi), the optical system 300 may scan only some regions of the image 3600*b* (for example, only the high-resolution activity regions) at such default resolution settings. Referring to FIG. 36B, in an example embodiment, the optical system 300 may be calibrated to scan at least one of the third region 3606*b* (including the QR code) at a 1200 dpi default resolution settings of the optical system 300. In another example embodiment, the optical system 300 may be calibrated to scan the second region 3604*b* including the linear barcode at 600 dpi by binning two pixels of the sensor, either in the optical sensor itself or after transmission to memory but before image processing occurs.

Moving to step 3708, the optical system 300 may be calibrated to scan at least a region of the printed image by adjusting the resolution settings of the optical system 300. For example, the optical system 300 may scan the first region 3602*b* based on the default resolution settings. In this regard, in accordance with said example embodiments, the default resolution settings of the optical system 300 may be adjusted based on combining outputs of a set of sensors from amongst the optical sensors 302 of the optical system 300. Details of combining outputs of the optical sensors 302 of the optical system 300 are described after the description of the steps of method 3700.

At step 3710, the processing circuitry 304 and/or the processing circuitry 402 may select a respective aperture size at which the optical system 300 scans different regions of the printed image based on the resolution settings associated with different regions identified in the image. For example, a first aperture size of the optical system 300 may be selected based on the default resolution settings described at step 3706, and a second aperture size may be selected based on the adjusted resolution settings described at step 3708. In this aspect, a reference table referred may be utilized by the processing circuitry 304 and/or the processing circuitry 402 to select effective aperture sizes applicable for corresponding resolution.

The reference table referred herein may include multiple effective aperture sizes and multiple resolutions corresponding to the respective aperture sizes. For example, the reference table 3400 illustrated in FIG. 34 may be utilized by the processing circuitry 304 and/or the processing circuitry 402 to select the effective aperture size. The effective aperture size referred herein corresponds to an aperture size at which the optical system 300 is to be configured for scanning a region of the image. To this extent, the effective aperture size may also be computed based on an interpolation of the physical aperture size as described in FIG. 35. In this regard, according to various embodiments described herein, the different effective aperture sizes and different resolutions applicable for each of the respective aperture size in the reference table can be computed based on techniques described in reference to FIGS. 17-22, i.e. based on creating a reference graph and utilizing the reference graph to interpolate effective aperture sizes of the optical system 300.

In accordance with some example embodiments, the optical system 300 may scan a printed image in a row by row fashion, i.e. at an instance of time. The optical system 300 scans one row of the printed image. In other words, upon scanning one row, the optical system 300 generates a scan result, including pixel values for one row in the printed image. These pixel values represent reflectance sensed by each of respective optical sensors in a linear array of the optical sensors 302 of the optical system 300. In accordance with various embodiments described herein, for each row of the printed image, the processing circuitry 304 and/or the processing circuitry 402 may identify a region such as the first region 3602b, the second region 3604b, or the third region 3606b, to which the respective row belongs. In this aspect, when it is identified that a row lies in the first region 3602b (i.e. a low-resolution activity region), the processing circuitry 304 and/or the processing circuitry 402 may configure the optical system 300 to scan the row based on adjusting the resolution settings. In one embodiment, for adjusting the resolution settings, outputs of adjacently positioned optical sensors from amongst the optical sensors 302 of the optical system 300 may be combined. For instance, to achieve a resolution lower than a default resolution of the optical system 300, outputs of every "n" adjacently positioned optical sensors 302 of the optical system 300 may be combined, where n is an integer equal to 2 or more. In this aspect, a number "n" of the optical sensors 302 for which combining the outputs is performed depends on a desired resolution settings.

For example, if the optical system 300 is manufactured to operate at 1200 dpi default resolution settings, in order to achieve a resolution of 300 dpi for scanning a low-resolution activity region, the processing circuitry 304 and/or the processing circuitry 402 may combine outputs of four optical sensors, for example, pixels 1 and 2, 3 and 4 corresponding to adjacently positioned 4 optical sensors for a same scan line. In this way, in accordance with various example embodiments described herein, outputs of sensors for one row may be combined depending on a desired resolution to be achieved.

Additionally and/or alternatively, the optical system 300 may acquire another row of sensor data at the constant print speed, and may combine respective output with outputs for the first row to achieve a lower resolution. In some examples, outputs of a set of optical sensors can be combined. For instance, outputs of optical sensors positioned in a 2×2 matrix array of the optical sensors 302 may be combined. In this regard, in order to produce a lower resolution field that is flat in x and y directions of a printed image, a same number of sensor values (or pixels) need to be added together on both the x and y directions. Combining outputs of the adjacently positioned optical sensors in row (x direction) reduces by half the default resolution settings across a width of the printed image and by half the amount of data that needs to be image processed. Similarly, combining outputs of adjacently positioned optical sensors in column (y direction) reduces by half the default resolution setting across a length of the printed image. In other words, outputs of sensors in a 2×2 block of the optical sensors may be merged to reduce the resolution by half in all directions (for instance, from a 1200 dpi default resolution to create a new 600 dpi resolution portion of the image that may be scanned by the optical system 300). In other words, binning every two pixel sensor values, either in the sensor or in computer memory, creates the equivalent image to scanning with a different image sensor that is manufactured to be 600 dpi as its native default resolution.

Referring to FIG. 36B, in an example embodiment, for scanning the printed image 3600b, the optical system 300 may scan the third region 3606b at default resolution settings of the optical system (for instance, 1200 dpi) and based on a smaller aperture size of the optical system 300 (such as 3 mils). However, for scanning the second region 3604b or the first region 3602b, outputs of the optical sensors 302 of the optical system 300 may be combined by any of the printing subsystem 401 or the optical system 300. For example, for scanning the first region 3602b, outputs of sensors positioned in a 4×4 fashion matrix in an array of the optical sensors 302 (i.e. four adjacently positioned sensors in a row and four adjacently positioned sensors in a column in a sensor array) may be combined to achieve an effective 300 dpi image resolution setting at which the optical system 300 scans the first region 3602b of the printed image 3600b. Similarly, for scanning the second region 3604b of the printed image 3600b, outputs of sensors positioned in a 2×2 fashion may be combined to achieve a 600 dpi resolution setting. Upon adjusting the resolution settings, an effective aperture size of the optical system 300 at 300 dpi resolution settings may be determined by the processing circuitry 304 and/or the processing circuitry 402 using the reference table 3400.

In accordance with various embodiments described herein, combining the outputs of the optical sensors 302 to achieve a lower resolution setting is advantageous and provides technical improvements as it results in an approximately 90% reduction on required memory usage of the printing subsystem 401 and/or the optical system 300, as well as a decrease of image processing speed for typical label formats such as is depicted in FIG. 36A. For example, where the combination of the sensor output is performed in a printer's memory (such as the memory 406 of the printing subsystem 401), a low resolution image of the entire label including the printed image 3600b may be created, thereby saving the memory which would have been otherwise occupied for storing the outputs corresponding to higher resolution regions of the image. In another aspect, combining the sensor outputs and storing reduced sensor data in the memory also has advantage of performing a printer maintenance analysis over a single resolution image without the high resolution "blocks" being removed from the memory. In all cases, whenever at least a second region of a label image comprises a reduced resolution, increased printing and or verification speeds result.

In some example embodiments, if one part of a row of the printed image corresponds to a first region (for example, a high resolution activity region) and another part of the row corresponds to a second region (for example, a low resolution activity region), but which is not integer divisible from the image sensor default manufactured value, combination of sensor outputs may be performed based on mathematically computing a desired resolution settings for the respective region. For example, in one instance, for creating an 800 dpi resolution image from the optical system that operates by default at a 1200 dpi resolution, each pixel value at 1200 dpi resolution can be transformed to a pixel value at 800 dpi resolution as described below:

$$800 \text{ dpi pix } 1 = \text{Average of } [(\tfrac{2}{3}) \times (1200 \text{ dpi pix } 1) \text{ and } (\tfrac{1}{3}) \times (1200 \text{ dpi pix } 2)]$$

Here, "800 dpi pix 1" represents a value of pixel 1 in a scanned image (having pixels 1, 2, 3, 4 . . . n) that can be computed from a value of "1200 dpi pix 1" and "1200 dpi pix 2" (i.e. values of pixels 1 and 2 scanned at 1200 dpi by the optical system 300). Accordingly, pixel 2 at 800 dpi can be computed as:

800 dpi pix 2=Average of [(⅓)×(1200 dpi pix 2) and (⅔)×(1200 dpi pix 3)]

In one example embodiment, for each odd pixel in new 800 dpi resolution, below formula can be used:

800 dpi pix n=Average((⅔)ix(n)1200 dpi,(⅓)pix (n+1)1200 dpi)

Similarly, for even pixel in the new resolution, below formula can be used:

800 dpi pix n=Average((⅔)pi(n+1)1200 dpi,(⅓)pix (n)1200 dpi)

In some example embodiments, the processing circuitry 304 and/or the processing circuitry 402 may combine outputs of the optical sensors 302 for transforming the pixel values at 800 dpi from pixel values obtained in a scan result at 1200 dpi using below stated formula:

800 dpi pix n=Average(((1+mod(n,2))/3)ix(n)1200 dpi,((1−mod(n,2))/3)pix(n+1)1200 dpi)

Here, "800 pix n" represents a nth pixel value in the scanned image at 800 dpi resolution, "pix (n)" represents nth pixel value scanned at 1200 dpi resolution and "pix (n+1) 1200 dpi" represents value of (n+1)th pixel scanned at 1200 dpi resolution by the optical system 300.

Thus, based on above described mathematical transformations, depending on a factor at which a resolution settings are to be adjusted from a default resolution settings, the processing circuitry 304 and/or the processing circuitry 402 may combine partial output values of the optical sensors 302 of the optical system 300. In this regard, in one example embodiment, the above described combination of output values of optical sensors may be performed by the processing circuitry 304 of the optical system 300 itself (i.e. a verifier device may perform the adjustment of resolution settings). One of the technical advantages of aforementioned approach is that a printing speed at which the printing subsystem 401 prints images on the print media remains unaffected, and printer's memory consumption is optimized, as the verifier auto-selects an applicable resolution setting and a corresponding effective aperture size based on performing the steps 3502-3506 and/or the steps 3702-3710 described in FIGS. 35 and 37 respectively.

Alternatively, in another embodiment, outputs from each optical sensor of the optical sensors 302 of the optical system 300 may be transmitted to the printing subsystem 401 and stored in the memory 406. The processing circuitry 402 of the printing subsystem 401 may access individual sensor outputs, i.e. pixel values from the memory 406, and perform desired combinations to achieve a desired resolution for any given region of the printed image. One of the technical advantages of the aforementioned approach is that a printing speed of the printing subsystem 401 is always in sync with a verification speed of the optical system 300 and that the overall throughput of the system is maximized.

Additional Implementation Details

In some example embodiments, certain ones of the operations herein may be modified or further amplified as described above. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A system for calculating and calibrating an effective aperture size of an optical sensor, the system comprising:
    the optical sensor configured to scan a test pattern to generate a scan reflectance profile (SRP), the test pattern comprising at least one test element;
    a processor in electronic communication with the optical sensor, the processor being configured to:
        calculate an element-reflectance value from the SRP, the element-reflectance value being calculated with respect to the at least one test element of the test pattern;
        receive a reference graph associated with the test pattern, the reference graph indicating a plurality of reference SRPs generated by a plurality of reference optical sensors scanning the test pattern, the plurality of reference optical sensors having a plurality of known aperture sizes; and
        calculate the effective aperture size of the optical sensor based at least on interpolating the element-reflectance value on the reference graph.

2. The system of claim 1, wherein the processor is further configured to create the reference graph by using the plurality of reference optical sensors of known optical systems to scan the test pattern to obtain a reference SRP for each of the known optical systems, each optical system of the known optical systems having an aperture size that is different from respective aperture sizes of remaining optical systems from the known optical systems, wherein the reference graph further indicates a plurality of reference element-reflectance values from the plurality of reference optical sensors, the plurality of reference element-reflectance values being calculated with respect to the at least one test element of the test pattern.

3. The system of claim 2, wherein the reference graph comprises a curve showing a relationship between the plurality of reference element-reflectance values and a plurality of aperture diameters corresponding to the plurality of reference optical sensors.

4. The system of claim 1, wherein the system further comprises a printer, wherein the optical sensor and the processor are integrated parts of the printer, wherein the printer is configured to:
print a first test pattern comprising bars and spaces of defined specifications;
scan the first test pattern;
analyze the scanned first test pattern to validate the scanned first test pattern according to a pre-defined acceptance criterion;
record thermal management settings of the printer based on the validation of the scanned first test pattern;
print a second test pattern at the recorded thermal management settings; and
calibrate the optical sensor using the effective aperture size of the optical sensor determined based on analyzing the second test pattern.

5. The system of claim 4, wherein the defined specifications of the bars and spaces comprising narrow elements and wide elements, wherein analyzing the scanned first test pattern further comprises:
generating a SRP of the first test pattern;
measuring a narrow element center position indicative of a median reflectance value of the narrow elements in the SRP;
measuring a wide element center position indicative of a median reflectance value of the wide elements in the SRP;
comparing the narrow element center position with the wide element center position; and
in response to determining that the narrow element center position is equal to the wide element center position, validate the scanned first test pattern.

6. The system of claim 4, wherein analyzing the scanned first test pattern further comprises:
determining a first width of at least one space in the first test pattern;
determining a second width of at least one bar in the first test pattern; and
comparing the first width with the second width to validate the first test pattern according to the pre-defined acceptance criterion.

7. The system of claim 4, wherein analyzing the scanned first test pattern further comprises:
calculating a threshold value indicative of a median SRP value in a SRP of the first test pattern;
identifying a first set of pixels corresponding to at least one space in the first test pattern where a first corresponding SRP value is less than the threshold value;
identifying a second set of pixels corresponding to at least one bar in the first test pattern where a second corresponding SRP value is greater than the threshold value; and
comparing a first count of the first set of pixels and a second count of the second set of pixels to validate the first test pattern.

8. The system of claim 1, wherein the processor is further configured to:

receive a reference table indicating a plurality of aperture sizes of the optical sensor and a plurality of corresponding resolutions of the plurality of aperture sizes;
receive characteristics data of at least one indicia of an image to be printed on a print media, wherein the characteristics data comprises at least a size of the at least one indicia; and
determine an applicable aperture size of the optical sensor based on the reference table and the characteristics data.

9. The system of claim 1, wherein the processor is further configured to:
receive characteristics data of at least one indicia of an image to be printed on a print media;
identify a first region and a second region of the image based on the characteristics data; and
scan the first region in a printed image at a first resolution and the second region in the printed image at a second resolution different from the first resolution.

10. The system of claim 9, wherein the processor is further configured to:
select a first effective aperture size and a second effective aperture size for scanning the first region and the second region of the image based on a reference table, the reference table comprising a plurality of aperture sizes and a plurality of resolutions corresponding to the plurality of aperture sizes.

11. A computer-implemented method for calculating and calibrating an effective aperture size of an optical system, the computer-implemented method comprising:
generating a scan reflectance profile (SRP) by scanning a test pattern using the optical system, the test pattern comprising at least one test element;
calculating an element-reflectance value from the SRP, the element-reflectance value being calculated with respect to the at least one test element of the test pattern;
receiving a reference graph associated with the test pattern, the reference graph indicating a plurality of reference SRPs generated by a plurality of reference optical sensors scanning the test pattern, the plurality of reference optical sensors having a plurality of known aperture sizes; and
calculating the effective aperture size of the optical system based at least on interpolating the element-reflectance value on the reference graph.

12. The computer-implemented method of claim 11, further comprising creating the reference graph by using the plurality of reference optical sensors of known optical systems to scan the test pattern to obtain a reference SRP for each of the known optical systems, each optical system of the known optical systems having an aperture size that is different from respective aperture sizes of remaining optical systems from the known optical systems, wherein the reference graph further indicates a plurality of reference element-reflectance values from the plurality of reference optical sensors, the plurality of reference element-reflectance values being calculated with respect to the at least one test element of the test pattern.

13. The computer-implemented method of claim 12, wherein the reference graph comprises a curve showing a relationship between the plurality of reference element-reflectance values and a plurality of aperture diameters corresponding to the plurality of reference optical sensors.

14. The computer-implemented method of claim 11, wherein the optical system is an integrated part of a printer, wherein the computer-implemented method further comprises:
- printing a first test pattern comprising bars and spaces of defined specifications;
- scanning the first test pattern;
- analyzing the scanned first test pattern to validate the scanned first test pattern according to a pre-defined acceptance criterion;
- recording thermal management settings of the printer based on the validation of the first test pattern;
- printing a second test pattern at the recorded thermal management settings; and
- calibrating the optical system using the effective aperture size of the optical system determined based on analyzing the second test pattern.

15. The computer-implemented method of claim 14, wherein the defined specifications of the bars and spaces comprising narrow elements and wide elements, wherein analyzing the scanned first test pattern further comprises:
- generating a SRP of the first test pattern;
- measuring a narrow element center position indicative of a median reflectance value of the narrow elements in the SRP;
- measuring a wide element center position indicative of a median reflectance value of the wide elements in the SRP;
- comparing the narrow element center position with the wide element center position; and
- in response to determining that the narrow element center position is equal to the wide element center position, validate the scanned first test pattern.

16. The computer-implemented method of claim 14, wherein analyzing the scanned first test pattern further comprises:
- determining a first width of at least one space in the first test pattern;
- determining a second width of at least one bar in the first test pattern; and
- comparing the first width with the second width to validate the first test pattern according to the pre-defined acceptance criterion.

17. The computer-implemented method of claim 14, wherein analyzing the scanned first test pattern further comprises:
- calculating a threshold value indicative of a median SRP value in a SRP of the first test pattern;
- identifying a first set of pixels corresponding to at least one space in the first test pattern where a first corresponding SRP value is less than the threshold value;
- identifying a second set of pixels corresponding to at least one bar in the first test pattern where a second corresponding SRP value is greater than the threshold value; and
- comparing a first count of the first set of pixels and a second count of the second set of pixels to validate the first test pattern.

18. The computer-implemented method of claim 11, further comprising:
- receiving a reference table indicating a plurality of aperture sizes of the optical system and a plurality of corresponding resolutions of the plurality of aperture sizes;
- receiving characteristics data of at least one indicia of an image to be printed on a print media, wherein the characteristics data comprises at least a size of the at least one indicia; and
- determining an applicable aperture size of the optical system based on the reference table and the characteristics data.

19. The computer-implemented method of claim 11, further comprising:
- receiving characteristics data of at least one indicia of an image to be printed on a print media;
- identifying a first region and a second region of the image based on the characteristics data; and
- scanning the first region in a printed image at a first resolution and the second region in the printed image at a second resolution different from the first resolution.

20. The computer-implemented method of claim 19, further comprising:
- selecting a first effective aperture size and a second effective aperture size for scanning the first region and the second region of the image based on a reference table, the reference table comprising a plurality of aperture sizes and a plurality of resolutions corresponding to the plurality of aperture sizes.

* * * * *